United States Patent
Wang

(10) Patent No.: US 12,026,367 B2
(45) Date of Patent: Jul. 2, 2024

(54) SPLIT-SCREEN DISPLAY METHOD AND APPARATUS

(71) Applicant: Honor Device Co., Ltd., Shenzhen (CN)

(72) Inventor: Xiaoyang Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/022,631

(22) PCT Filed: May 13, 2022

(86) PCT No.: PCT/CN2022/092608
§ 371 (c)(1),
(2) Date: Feb. 22, 2023

(87) PCT Pub. No.: WO2023/010940
PCT Pub. Date: Feb. 9, 2023

(65) Prior Publication Data
US 2023/0325072 A1    Oct. 12, 2023

(30) Foreign Application Priority Data

Aug. 3, 2021   (CN) .......................... 202110883902.4

(51) Int. Cl.
*G06F 3/04886*   (2022.01)
*G06F 3/0482*    (2013.01)
(Continued)

(52) U.S. Cl.
CPC ........ *G06F 3/04886* (2013.01); *G06F 3/0482* (2013.01); *G06F 3/04845* (2013.01); *G06F 3/04817* (2013.01); *G06F 2203/04803* (2013.01)

(58) Field of Classification Search
CPC . G06F 2203/04803; G06F 2203/04804; G06F 2203/04805; G06F 2203/04806;
(Continued)

(56) References Cited

U.S. PATENT DOCUMENTS

2014/0325433 A1* 10/2014 Hiroura ................. G06F 3/0488
715/789
2016/0334989 A1   11/2016 Liu et al.
(Continued)

FOREIGN PATENT DOCUMENTS

| CN | 104793839 A | 7/2015 |
| CN | 106200970 A | 12/2016 |

(Continued)

OTHER PUBLICATIONS

Fatty Chat Digital, "The most complete iPad split-screen operation guide, greatly improve efficiency, come to learn," Baidu, URL: https://baijiahao.baidu.com/s?id=1701977451282200085&wfr=spider&for=pc (Jun. 8, 2021).

(Continued)

*Primary Examiner* — Rayeez R Chowdhury
(74) *Attorney, Agent, or Firm* — Leydig, Voit & Mayer, Ltd.

(57) ABSTRACT

Embodiments of this application provide a split-screen display method and an apparatus. The method includes: displaying a first interface; receiving a trigger operation for an identifier of a first application; displaying the identifier of the first application in a first state; receiving a trigger operation for a control used to display a second application in a floating window; displaying content of the first application in full screen and displaying content of the second application in a floating window; and when a trigger operation for moving the floating window to a first split-screen region is received, displaying the content of the second (Continued)

TO
FIG. 1b application in the first split-screen region of a second interface, and displaying the content of the first application in a second split-screen region of the second interface. The terminal device can implement quick screen splitting, so that flexible screen splitting in a plurality of scenarios is implemented.

10 Claims, 60 Drawing Sheets

(51) Int. Cl.
*G06F 3/04845* (2022.01)
*G06F 3/04817* (2022.01)

(58) Field of Classification Search
CPC . G06F 2203/04807; G06F 2203/04808; G06F 2203/04809; G06F 3/04883; G06F 3/0486; G06F 3/0481; G06F 3/04817; G06F 3/0488; G06F 9/451; G06F 3/0416; G06F 3/048; G06F 16/168; G06F 1/1694; G06F 3/0485; G06F 3/0412; G06F 3/1454; G06F 3/0484; G06F 3/04847; G06F 3/0483; G06F 3/04842; G06F 3/04845
See application file for complete search history.

(56) References Cited

U.S. PATENT DOCUMENTS

2019/0339855 A1\* 11/2019 Walkin .................. G06F 3/0485
2020/0183574 A1   6/2020 Chen et al.

FOREIGN PATENT DOCUMENTS

| CN | 106445391 A  | 2/2017 |
| CN | 106200970 B  | 6/2018 |
| CN | 108170333 A  | 6/2018 |
| CN | 109508136 A  | 3/2019 |
| CN | 109508136 B  | 2/2021 |
| CN | 113325996 A  | 8/2021 |
| WO | 2019014859 A1| 1/2019 |

OTHER PUBLICATIONS

Hello Peach, "How does IPad split screen browse? Ipad split-screen browsing with tutorials," Script House, URL: https://www.jb51.net/hardware/pingban/648497.html (Nov. 30, 2018).
HZH's Tech Channel, "[iPadOS] iPadOS15 split screen tutorial," 41-56 seconds, Bilibili, URL: https://www.bilibili.com/video/BV1SV41147bY/?spm_id_from=333.999.0.0&vd_source=92f5f85b12d5f545a04c4c23cf6c3209 (Jun. 8, 2021).
Netizen Contribution, "How to split the ipad screen in half instead of floating (ipad screen split tutorial)," Fan Xiaozuo, URL: https://fanxiaocuo.com/qita/35527.html (Jul. 19, 2021).

\* cited by examiner

TO

CONT.
FROM

TO

SPLIT-SCREEN DISPLAY METHOD AND APPARATUS

CROSS-REFERENCE TO RELATED APPLICATIONS

This application is a national stage of International Application No. PCT/CN2022/092608, filed on May 13, 2022, which claims priority to Chinese Patent Application No. 202110883902.4, filed on Aug. 3, 2021. The disclosures of both of the aforementioned applications are hereby incorporated herein by reference in their entireties.

TECHNICAL FIELD

This application relates to the field of terminal technologies, and in particular, to a split-screen display method and an apparatus.

BACKGROUND

With popularization and development of the Internet, people have increasingly diversified requirements on functions of terminal devices. For example, to meet a requirement of a user for using a plurality of applications in a same time period, many terminal devices may support a split-screen mode. For example, a terminal device may display a plurality of applications in a same display interface.

Usually, a user may open any application, invoke a split-screen application bar by using an operation of sliding inward on a screen of a mobile phone from a left edge or a right edge and pausing, touch and hold an application in the split-screen application bar, and drag the application to the screen, to enable split-screen for the applications.

However, the foregoing split-screen method for applications is relatively cumbersome.

SUMMARY

Embodiments of this application provide a split-screen display method and an apparatus, to implement quick split-screen in a scenario such as an application background or a home screen.

According to a first aspect, an embodiment of this application provides a split-screen display method, including: displaying a first interface, where the first interface includes an identifier of a first application and an identifier of a second application; receiving a first trigger operation for the identifier of the first application; displaying the identifier of the first application in a first state in response to the first trigger operation; receiving a second trigger operation for the identifier of the second application in a process in which the first trigger operation continuously acts on the first application, where a difference between a start time of receiving the second trigger operation and a start time of receiving the first trigger operation is less than a first time threshold; displaying the identifier of the second application in the first state in response to the second trigger operation; and displaying content of the first application in a first split-screen region of a second interface, and displaying content of the second application in a second split-screen region of the second interface. In this way, when a terminal device receives an operation of a user for touching and holding at least two applications and/or dragging the at least two applications to split-screen regions in a scenario such as a home screen or a multi-task background, the terminal device can implement quick screen splitting, so that flexible screen splitting in a plurality of scenarios is implemented.

The first interface may be a background multi-task interface or a home screen. The first application may be understood as a message application in embodiments of this application, and the second application may be understood as a video application in embodiments of this application. The identifier of the first application may be understood as an icon (or a thumbnail) of the first application. The identifier of the second application may be understood as an icon (or a thumbnail) of the second application. The first trigger operation may be understood as an activation operation for the message application. For example, the first trigger operation may be a touch and hold operation or the like. The first state may be understood as an active state, and the active state may be understood as a reduced state of description of the first application. The second trigger operation may be understood as an activation operation for the video application. For example, the second trigger operation may be a touch and hold operation or the like. The first split-screen region may be a region corresponding to the message application, and the second split-screen region may be a region corresponding to the video application.

In a possible implementation, the displaying content of the first application in a first split-screen region of a second interface, and displaying content of the second application in a second split-screen region of the second interface includes: when receiving a trigger operation for the identifier of the first application in the first state and/or a trigger operation for the identifier of the second application in the first state, displaying the content of the first application in the first split-screen region of the second interface, and displaying the content of the second application in the second split-screen region of the second interface. In this way, the terminal device can implement quick screen splitting based on triggering for the first application and the second application.

The trigger operation for the identifier of the first application (or the second application) in the first state may be understood as a drag operation or a slide operation.

In a possible implementation, the receiving a trigger operation for the identifier of the first application in the first state and/or a trigger operation for the identifier of the second application in the first state includes: receiving a third trigger operation for moving the identifier of the first application in the first state to the first split-screen region, where the third trigger operation is a trigger operation following the first trigger operation; and/or receiving a fourth trigger operation for moving the identifier of the second application in the first state to the second split-screen region, where the fourth trigger operation is a trigger operation following the second trigger operation. In this way, in a background multi-task scenario or a home screen scenario, the terminal device can implement quick screen splitting for applications when a user triggers identifiers of applications a plurality of times by using two fingers, so that flexibility of screen splitting for applications is improved.

The third trigger operation may be understood as an operation of dragging a message application to a split-screen region, and the fourth trigger operation may be understood as an operation of dragging a video application to a split-screen region.

In a possible implementation, the receiving a trigger operation for the identifier of the first application in the first state and/or a trigger operation for the identifier of the second application in the first state includes: receiving a fifth trigger operation for sliding the identifier of the first application in the first state in a first direction, where the fifth trigger operation is a trigger operation following the first trigger operation; and/or receiving a sixth trigger operation for sliding the identifier of the second application in the first state in a second direction, where the sixth trigger operation is a trigger operation following the second trigger operation. In this way, in a background multi-task scenario or a home screen scenario, the terminal device can implement quick screen splitting for applications when a user triggers identifiers of applications a plurality of times by using two fingers, so that flexibility of screen splitting for applications is improved.

The fifth trigger operation may be understood as an operation of sliding a message application leftward (or rightward), and the fourth trigger operation may be understood as an operation of sliding a video application rightward (or leftward).

In a possible implementation, before the displaying content of the first application in a first split-screen region of a second interface, and displaying content of the second application in a second split-screen region of the second interface, the method further includes: displaying a third interface, where the third interface includes the content of the second application and the identifier of the first application; and receiving, in the third interface, a trigger operation for moving the identifier of the first application to the first split-screen region. In this way, the user can implement quick split-screen display by triggering the identifier of the first application.

In a possible implementation, before the displaying content of the first application in a first split-screen region of a second interface, and displaying content of the second application in a second split-screen region of the second interface, the method further includes: displaying the identifier of the first application in the first split-screen region, and displaying the identifier of the second application in the second split-screen region.

In a possible implementation, the displaying a first interface includes: receiving a trigger operation for opening a background running application; and displaying the first interface in response to the trigger operation for opening the background running application. In this way, in a case in which a background multi-task scenario is enabled, the terminal device can implement quick screen splitting for a plurality of applications based on a plurality of trigger operations performed by a user on the applications.

The trigger operation for opening the background running application may be understood as an operation of sliding upward from a bottom edge of a screen.

In a possible implementation, the identifier of the first application includes at least one of the following: an icon of the first application, a thumbnail of the first application, and a control for displaying the first application in a floating window; and the identifier of the second application includes at least one of the following: an icon of the second application, a thumbnail of the second application, and a control for displaying the second application in a floating window.

In a possible implementation, an identifier of an application in the first state is displayed in a floating manner, a highlighted manner, or a reduced manner.

In a possible implementation, the first split-screen region further displays one or more of the following: a control for minimizing displayed content in the first split-screen region, a control for triggering full-screen display of displayed content in the first split-screen region, or a control for triggering closing of displayed content in the first split-screen region; and the second split-screen region further displays one or more of the following: a control for minimizing displayed content in the second split-screen region, a control for triggering full-screen display of displayed content in the second split-screen region, or a control for triggering closing of displayed content in the second split-screen region.

According to a second aspect, an embodiment of this application provides a split-screen display method, including: displaying a first interface, where the first interface includes an identifier of a first application; receiving a first trigger operation for the identifier of the first application; displaying the identifier of the first application in a first state in response to the first trigger operation; receiving a seventh trigger operation for moving the identifier of the first application in the first state in the first interface, where the seventh trigger operation is a trigger operation following the first trigger operation; continuing to display the identifier of the first application in response to the seventh trigger operation; receiving an eighth trigger operation for an identifier of a second application; displaying a third interface in response to the eighth trigger operation, where the third interface includes content of the second application and the identifier of the first application; and when a trigger operation for moving the identifier of the first application to a first split-screen region is received in the third interface, displaying content of the first application in a first split-screen region of a second interface, and displaying the content of the second application in a second split-screen region of the second interface; or when a trigger operation for moving the identifier of the first application to a first region is received in the third interface, displaying the content of the second application in full screen in a fourth interface, and displaying content of the first application in a floating window in the fourth interface, where a region occupied by the floating window in the third interface is smaller than a full-screen region of the third interface, and the first region is located between a first split-screen region and a second split-screen region; or when a trigger operation for moving the identifier of the first application to a second region is received in the third interface, displaying the content of the second application in full screen in a fourth interface, and exiting the first application, where the second region is located at the bottom of a first split-screen region and/or the bottom of a second split-screen region. In this way, when a terminal device receives an operation of a user for touching and holding at least two applications and/or dragging the at least two applications to split-screen regions in a scenario such as a home screen or a multi-task background, the terminal device can implement quick screen splitting, so that flexible screen splitting in a plurality of scenarios is implemented.

The eighth trigger operation may be understood as an operation of tapping the identifier of the second application or an operation of dragging the identifier of the second application to a region corresponding to full-screen display. The first region may be a middle region of a tablet. The second region may be understood as a region for cancelling split-screen display of an application operated by the user.

In a possible implementation, the receiving an eighth trigger operation for an identifier of a second application includes: receiving the eighth trigger operation for the identifier of the second application in a third region of the first interface. In this way, in a background multi-task scenario, the terminal device can implement quick screen splitting for applications when a user triggers identifiers of applications and/or applications in a fixed bar a plurality of times by using two fingers, so that flexibility of screen splitting for applications is improved.

The third region may be a region in which a fixed bar in a background multi-task interface is located.

In a possible implementation, before the receiving the eighth trigger operation for the identifier of the second application in a third region of the first interface, the method further includes: receiving a slide operation in the third region, where the slide operation is used to update an identifier of an application displayed in the third region, and the seventh trigger operation is interrupted in a process of receiving the slide operation in the third region; and receiving, in the third region, a ninth trigger operation for moving the identifier of the first application out of the third region, where the ninth trigger operation continuously acts on the identifier of the first application. In this way, a user can flexibly remove the first application from the task bar or add the first application to the task bar according to a requirement. This avoids touching and holding the first application.

The ninth trigger operation may be understood as an operation of removing a message application from a fixed bar.

In a possible implementation, the receiving an eighth trigger operation for an identifier of a second application includes: receiving the eighth trigger operation for the identifier of the second application in a fifth interface, where the fifth interface further includes the identifier of the second application. In this way, the terminal device can implement quick screen splitting for applications when a user triggers an identifier of an application in a background multi-task interface and an identifier of an application on a home screen a plurality of times, so that flexibility of screen splitting for applications is improved.

The fifth interface may be understood as a home screen.

In a possible implementation, the receiving an eighth trigger operation for an identifier of a second application includes: receiving the eighth trigger operation for the identifier of the second application in a split-screen task bar in a fifth interface, where the fifth interface further includes the identifier of the second application. In this way, the terminal device can implement quick screen splitting for applications when a user triggers an identifier of an application in a background multi-task interface and an application in a split-screen task bar a plurality of times, so that flexibility of screen splitting for applications is improved.

The fifth interface may be an interface that includes the split-screen task bar.

In a possible implementation, the identifier of the second application is thumbnail identifiers of a plurality of applications for which screen splitting is performed, and specific display in the third interface includes: displaying, in a split-screen manner, content of the plurality of applications for which screen splitting is performed and displaying the identifier of the first application in a floating manner. In a background multi-task scenario, the terminal device can implement quick screen splitting for a plurality of applications when a user triggers identifiers of an application for which screen splitting is performed and another application a plurality of times by using two fingers, so that flexibility of screen splitting for applications is improved.

According to a third aspect, an embodiment of this application provides a split-screen display method, including: displaying a first interface, where the first interface includes an identifier of a first application; receiving a first trigger operation for the identifier of the first application; displaying the identifier of the first application in a first state in response to the first trigger operation; receiving a seventh trigger operation for moving the identifier of the first application in the first state in the first interface, where the seventh trigger operation is a trigger operation following the first trigger operation; continuing to display the identifier of the first application in response to the seventh trigger operation; receiving a tenth trigger operation for a control used to display a second application in a floating window; in response to the tenth trigger operation, displaying content of the first application in full screen and displaying content of the second application in a floating window; and when a trigger operation for moving the floating window to a first split-screen region is received, displaying the content of the second application in the first split-screen region of a second interface, and displaying the content of the first application in a second split-screen region of the second interface. In this way, when a terminal device receives an operation of a user for touching and holding at least two applications and/or dragging the at least two applications to split-screen regions in a scenario such as a multi-task background, the terminal device can implement quick screen splitting, so that flexible screen splitting in a plurality of scenarios is implemented.

According to a fourth aspect, an embodiment of this application provides a split-screen display apparatus, including: a display unit, configured to display a first interface, where the first interface includes an identifier of a first application and an identifier of a second application; and a processing unit, configured to receive a first trigger operation for the identifier of the first application. The processing unit is further configured to display the identifier of the first application in a first state in response to the first trigger operation. The processing unit is further configured to receive a second trigger operation for the identifier of the second application in a process in which the first trigger operation continuously acts on the first application, where a difference between a start time of receiving the second trigger operation and a start time of receiving the first trigger operation is less than a first time threshold. The display unit is further configured to display the identifier of the second application in the first state in response to the second trigger operation. The display unit is further configured to display content of the first application in a first split-screen region of a second interface, and display content of the second application in a second split-screen region of the second interface.

In a possible implementation, when a trigger operation for the identifier of the first application in the first state is received and/or a trigger operation for the identifier of the second application in the first state is received, the display unit is specifically configured to display the content of the first application in the first split-screen region of the second interface, and display the content of the second application in the second split-screen region of the second interface.

In a possible implementation, the processing unit is specifically configured to: receive a third trigger operation for moving the identifier of the first application in the first state to the first split-screen region, where the third trigger operation is a trigger operation following the first trigger operation; and/or receive a fourth trigger operation for moving the identifier of the second application in the first state to the second split-screen region, where the fourth trigger operation is a trigger operation following the second trigger operation.

In a possible implementation, the processing unit is specifically configured to: receive a fifth trigger operation for sliding the identifier of the first application in the first state in a first direction, where the fifth trigger operation is a trigger operation following the first trigger operation; and/or receive a sixth trigger operation for sliding the identifier of the second application in the first state in a second direction, where the sixth trigger operation is a trigger operation following the second trigger operation.

In a possible implementation, the display unit is further configured to display a third interface, where the third interface includes the content of the second application and the identifier of the first application; and the processing unit is further configured to receive, in the third interface, a trigger operation for moving the identifier of the first application to the first split-screen region.

In a possible implementation, the display unit is further configured to display the identifier of the first application in the first split-screen region, and display the identifier of the second application in the second split-screen region.

In a possible implementation, the processing unit is specifically configured to receive a trigger operation for opening a background running application; and the display unit is specifically configured to display the first interface in response to the trigger operation for opening the background running application.

In a possible implementation, the identifier of the first application includes at least one of the following: an icon of the first application, a thumbnail of the first application, and a control for displaying the first application in a floating window; and the identifier of the second application includes at least one of the following: an icon of the second application, a thumbnail of the second application, and a control for displaying the second application in a floating window.

In a possible implementation, an identifier of an application in the first state is displayed in a floating manner, a highlighted manner, or a reduced manner.

In a possible implementation, the first split-screen region further displays one or more of the following: a control for minimizing displayed content in the first split-screen region, a control for triggering full-screen display of displayed content in the first split-screen region, or a control for triggering closing of displayed content in the first split-screen region; and the second split-screen region further displays one or more of the following: a control for minimizing displayed content in the second split-screen region, a control for triggering full-screen display of displayed content in the second split-screen region, or a control for triggering closing of displayed content in the second split-screen region.

According to a fifth aspect, an embodiment of this application provides a split-screen display apparatus, including: a display unit, configured to display a first interface, where the first interface includes an identifier of a first application; and a processing unit, configured to receive a first trigger operation for the identifier of the first application. The display unit is further configured to display the identifier of the first application in a first state in response to the first trigger operation. The processing unit is further configured to receive a seventh trigger operation for moving the identifier of the first application in the first state in the first interface, where the seventh trigger operation is a trigger operation following the first trigger operation. The display unit is further configured to continue to display the identifier of the first application in response to the seventh trigger operation. The processing unit is further configured to receive an eighth trigger operation for an identifier of a second application. The display unit is further configured to display a third interface in response to the eighth trigger operation, where the third interface includes content of the second application and the identifier of the first application. When a trigger operation for moving the identifier of the first application to a first split-screen region is received in the third interface, the display unit is further configured to display content of the first application in a first split-screen region of a second interface, and display the content of the second application in a second split-screen region of the second interface. Alternatively, when a trigger operation for moving the identifier of the first application to a first region is received in the third interface, the display unit is further configured to display the content of the second application in full screen in a fourth interface, and display content of the first application in a floating window in the fourth interface, where a region occupied by the floating window in the third interface is smaller than a full-screen region of the third interface, and the first region is located between a first split-screen region and a second split-screen region. Alternatively, when a trigger operation for moving the identifier of the first application to a second region is received in the third interface, the display unit is further configured to display the content of the second application in full screen in a fourth interface, and exit the first application, where the second region is located at the bottom of a first split-screen region and/or the bottom of a second split-screen region.

In a possible implementation, the processing unit is specifically configured to receive the eighth trigger operation for the identifier of the second application in a third region of the first interface.

In a possible implementation, the processing unit is specifically configured to receive a slide operation in the third region, where the slide operation is used to update an identifier of an application displayed in the third region, and the seventh trigger operation is interrupted in a process of receiving the slide operation in the third region; and the processing unit is further specifically configured to receive, in the third region, a ninth trigger operation for moving the identifier of the first application out of the third region, where the ninth trigger operation continuously acts on the identifier of the first application.

In a possible implementation, the processing unit is specifically configured to receive the eighth trigger operation for the identifier of the second application in a fifth interface, where the fifth interface further includes the identifier of the second application.

In a possible implementation, the processing unit is specifically configured to receive the eighth trigger operation for the identifier of the second application in a split-screen task bar in a fifth interface, where the fifth interface further includes the identifier of the second application.

In a possible implementation, the identifier of the second application is thumbnail identifiers of a plurality of applications for which screen splitting is performed, and specific display in the third interface includes: displaying, in a split-screen manner, content of the plurality of applications for which screen splitting is performed and displaying the identifier of the first application in a floating manner.

According to a sixth aspect, an embodiment of this application provides a split-screen display apparatus, including: a display unit, configured to display a first interface, where the first interface includes an identifier of a first application; and a processing unit, configured to receive a first trigger operation for the identifier of the first application. The display unit is further configured to display the identifier of the first application in a first state in response to the first trigger operation. The processing unit is further configured to receive a seventh trigger operation for moving the identifier of the first application in the first state in the first interface, where the seventh trigger operation is a trigger operation following the first trigger operation. The display unit is further configured to continue to display the identifier of the first application in response to the seventh trigger operation. The processing unit is further configured to receive a tenth trigger operation for a control used to display a second application in a floating window. In response to the tenth trigger operation, the display unit is further configured to display content of the first application in full screen and display content of the second application in a floating window. When a trigger operation for moving the floating window to a first split-screen region is received, the display unit is further configured to display the content of the second application in the first split-screen region of a second interface, and display the content of the first application in a second split-screen region of the second interface.

According to a seventh aspect, an embodiment of this application provides a split-screen display apparatus, including a processor and a memory. The memory is configured to store code instructions. The processor is configured to run the code instructions, so that an electronic device performs the split-screen display method described in any one of the first aspect or the implementations of the first aspect, the split-screen display method described in any one of the first aspect or the implementations of the second aspect, or the split-screen display method described in any one of the third aspect or the implementations of the third aspect.

According to an eighth aspect, an embodiment of this application provides a computer-readable storage medium. The computer-readable storage medium stores instructions. When the instructions are executed, a computer is enabled to perform the split-screen display method described in any one of the first aspect or the implementations of the first aspect, the split-screen display method described in any one of the second aspect or the implementations of the second aspect, or the split-screen display method described in any one of the third aspect or the implementations of the third aspect.

According to a ninth aspect, a computer program product is provided, including a computer program. When the computer program is run, a computer is enabled to perform the split-screen display method described in any one of the first aspect or the implementations of the first aspect, the split-screen display method described in any one of the second aspect or the implementations of the second aspect, or the split-screen display method described in any one of the third aspect or the implementations of the third aspect.

It should be understood that, the fourth aspect to the ninth aspect of this application correspond to the technical solutions of the first aspect to the third aspect of this application, and beneficial effects achieved in the aspects and corresponding feasible implementations are similar. Details are not described again.

DESCRIPTION OF EMBODIMENTS

For ease of clearly describing the technical solutions in embodiments of this application, the words such as "first" and "second" are used to distinguish between same or similar items whose functions are basically the same in embodiments of this application. For example, a first value and a second value are merely used to distinguish between different values, but not limit a sequence thereof. A person skilled in the art may understand that the words such as "first" and "second" do not limit a quantity or an execution order, and the words such as "first" and "second" do not necessarily indicate a specific difference.

It should be noted that, in this application, words such as "example" or "for example" are used to represent giving examples, illustrations, or descriptions. Any embodiment or design solution described as "example" or "for example" in this application should not be construed as being more preferred or advantageous than other embodiments or design solutions. Specifically, the words such as "example" or "for example" are used to present related concepts in a specific manner.

In this application, "at least one" refers to one or more, and "a plurality of" refers to two or more. The term "and/or" describes an association relationship of associated objects, and indicates that three relationships may exist. For example, A and/or B may indicate the following three cases: Only A exists, both A and B exist, and only B exists. A and B may be singular or plural. The character "/" usually indicates an "or" relationship between the associated objects. "At least one of the following items (pieces)" or a similar expression thereof refers to any combination of these items, including a single item (piece) or any combination of a plurality of items (pieces). For example, at least one of a, b, or c may represent a, b, c, a and b, a and c, b and c, or a, b, and c, where a, b, and c may be singular or plural.

With a user requirement for using a plurality of applications (APPs) (or may also be referred to as application programs), many terminal devices may support a split-screen mode. For example, a user may open a video APP and a message APP at the same time, so as to implement synchronization between watching a video and sending a message. In a possible implementation, a terminal device may also implement split-screen display of a plurality of APPs.

For example, FIG. 1a to FIG. 1d are a schematic diagram of a scenario according to an embodiment of this application. In the embodiment corresponding to FIG. 1a to FIG. 1d, an example in which a terminal device is a tablet computer (Pad) (or may also be referred to as a tablet) is used for description. This example does not constitute a limitation on this embodiment of this application.

Figure 1A:
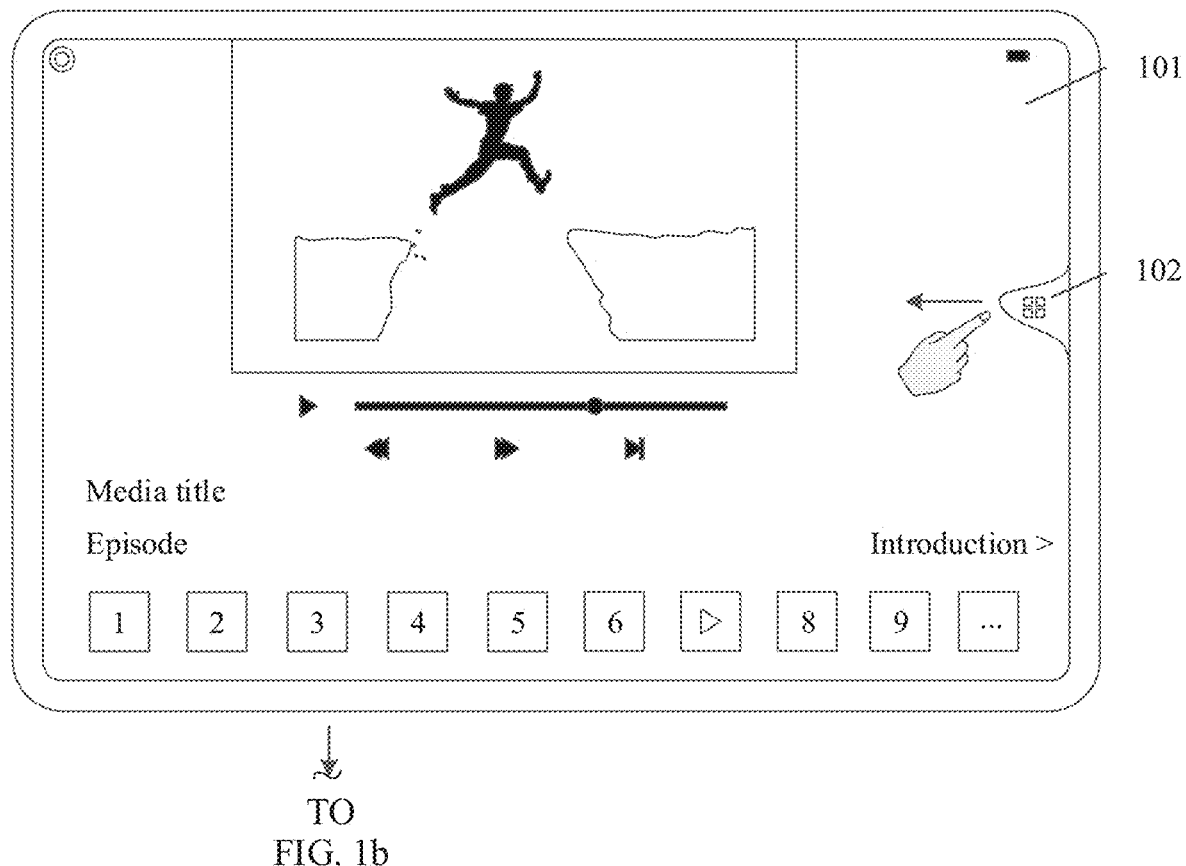
FIG. 1a to FIG. 1d are a schematic diagram of a scenario according to an embodiment of this application.

When the tablet receives a trigger of a user for a video resource in a video APP, the tablet may display an interface shown in FIG. 1a, and the interface may be an interface corresponding to Video 101 for watching the video resource. The interface shown in FIG. 1a may include one or more of the following: a play interface of the video resource, a control used to adjust play progress, a control used to select an episode of the video, a control used to view a video introduction, or the like.

Figure 1B:
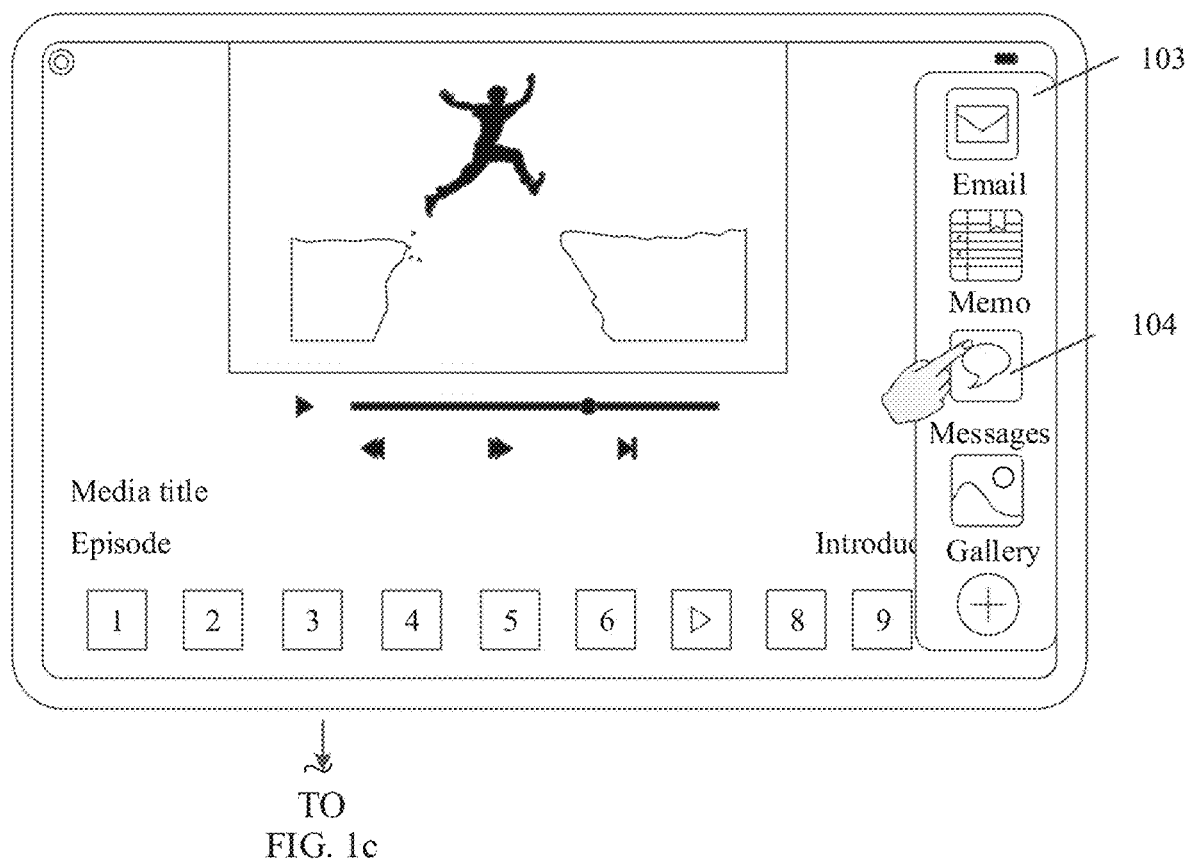

In the interface shown in FIG. 1a, when the tablet receives an operation performed by the user to slide inward from an edge of the tablet, the tablet may transitorily display an icon 102 shown in FIG. 1a, and then jump to an interface shown in FIG. 1B. The interface shown in FIG. 1B may include a split-screen task bar 103, and the split-screen task bar 103 may include one or more of the following: Email, Memo, Messages 104, Gallery, or the like.

Figure 1C:
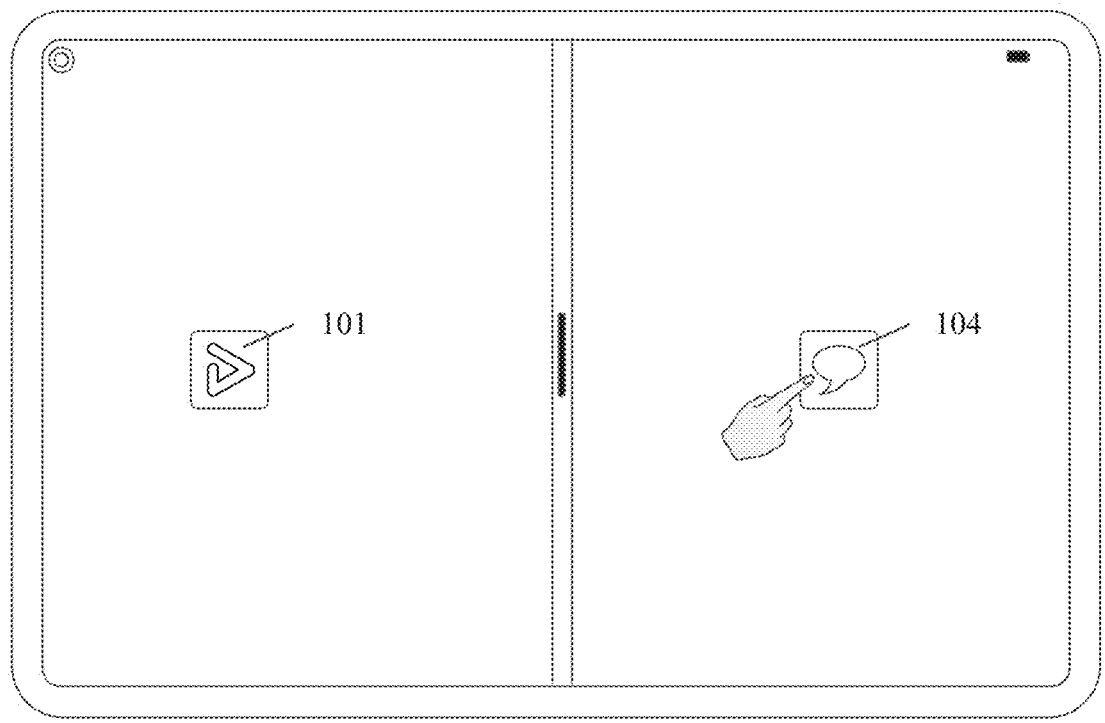

In the interface shown in FIG. 1B, when the tablet receives an operation that the user touches and holds Messages 104 and drags Messages 104 to a split-screen region on a right side on the tablet, the tablet may transitorily display an interface shown in FIG. 1c. In the interface, an icon corresponding to Video 101 and an icon corresponding to Messages 104 may be displayed on the left and right in a split-screen manner. Then, the tablet may jump to an interface shown in FIG. 1d.

Figure 1D:
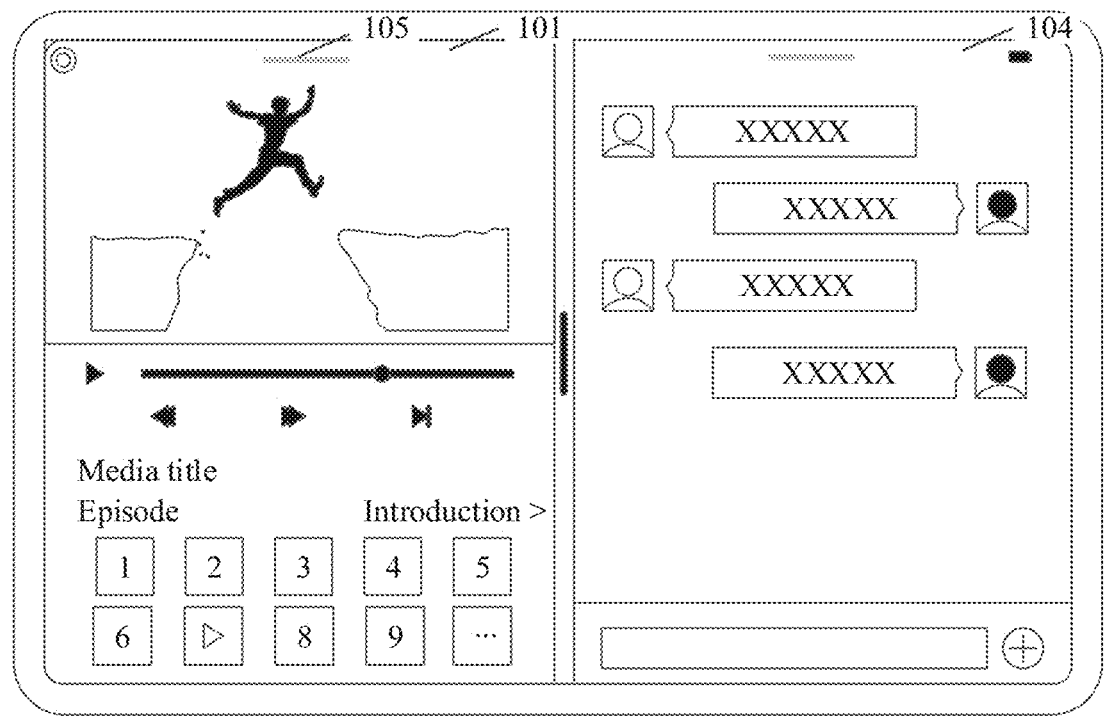

In the interface shown in FIG. 1d, a split-screen interface corresponding to Video 101 and a split-screen interface corresponding to Messages 104 may be displayed on the left and right in the interface. The split-screen interface corresponding to Video 101 and the split-screen interface corresponding to Messages 104 each may include a slide bar, for example, a slide bar 105 in the split-screen interface corresponding to Video 101. Further, the user may drag the slide bar 105 to move the split-screen interface corresponding to Video 101, for example, move the split-screen interface corresponding to Video 101 to the right side on the tablet.

However, steps of the foregoing split-screen display method are cumbersome, and the split-screen method is single. Therefore, it is difficult to implement flexible screen splitting in a plurality of scenarios.

In view of this, an embodiment of this application provides a split-screen display method. When a terminal device receives an operation of a user for touching and holding at least two applications and/or dragging the at least two applications to split-screen regions in a scenario such as a home screen or a multi-task background, the terminal device can implement quick screen splitting, so that flexible screen splitting in a plurality of scenarios is implemented.

It may be understood that the terminal device may also be referred to as a terminal, a user equipment (UE), a mobile station (MS), a mobile terminal (MT), or the like. The terminal device may be a mobile phone with a touchscreen, a smart TV, a wearable device, a tablet computer, a computer with wireless sending and receiving functions, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. Neither of a specific technology and a specific device form used for the terminal device is limited in embodiments of this application.

Figure 2:
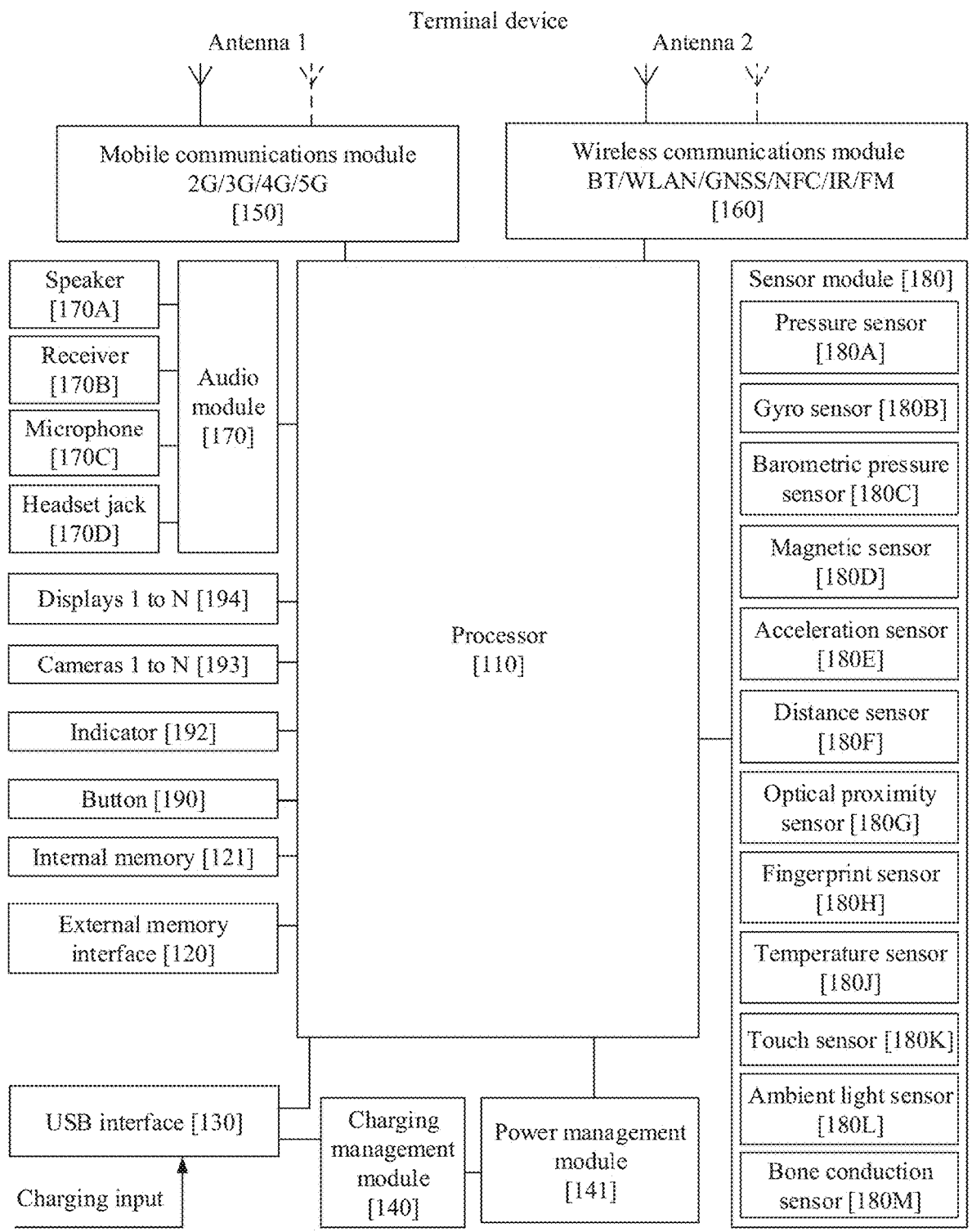
FIG. 2 is a schematic diagram of a hardware structure of a terminal device according to an embodiment of this application.

Therefore, to better understand embodiments of this application, the following describes a structure of the terminal device in embodiments of this application. For example, FIG. 2 is a schematic diagram of a structure of a terminal device according to an embodiment of this application.

The terminal device may include a processor 110, an external memory interface 120, an internal memory 121, a universal serial bus (USB) interface 130, a charging management module 140, a power management module 141, an antenna 1, an antenna 2, a mobile communications module 150, a wireless communications module 160, an audio module 170, a speaker 170A, a receiver 170B, a microphone 170C, a headset jack 170D, a sensor module 180, a button 190, an indicator 192, a camera 193, a display 194, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal device. In some other embodiments of this application, the terminal device may include more or fewer components than those shown in the figure, or combine some components, or split some components, or have different component arrangements. The components shown in the figure may be implemented by hardware, software, or a combination of software and hardware.

The processor 110 may include one or more processing units. Different processing units may be independent components, or may be integrated into one or more processors. A memory may further be disposed in the processor 110, to store instructions and data.

The USB interface 130 is an interface conforming to a USB standard specification, and may be specifically a mini USB interface, a micro USB interface, a USB Type-C interface, or the like. The USB interface 130 may be configured to connect to a charger to charge the terminal device, or may be configured to transmit data between the terminal device and a peripheral device, or may be configured to connect to a headset to play audio by using the headset. The interface may alternatively be configured to connect to another electronic device, such as an AR device.

The charging management module 140 is configured to receive charging input from a charger. The charger may be a wireless charger, or may be a wired charger. The power management module 141 is configured to connect the charging management module 140 and the processor 110.

A wireless communication function of the terminal device may be implemented by using the antenna 1, the antenna 2, the mobile communications module 150, the wireless communications module 160, a modem processor, a baseband processor, and the like.

The antenna 1 and the antenna 2 are configured to transmit and receive electromagnetic wave signals. The antenna in the terminal device may be configured to cover one or more communication bands. Different antennas may be multiplexed to improve antenna utilization.

The mobile communications module 150 may provide a solution for wireless communication, including 2G/3G/4G/5G and the like, that is applied to the terminal device. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and send a processed electromagnetic wave to the modem processor for demodulation.

The wireless communications module 160 may provide a wireless communication solution that is applied to the terminal device and includes a wireless local area network (WLAN) (such as a wireless fidelity (Wi-Fi) network), Bluetooth (BT), a global navigation satellite system (GNSS), frequency modulation (FM), and the like.

The terminal device implements a display function by using the GPU, the display 194, an application processor, and the like. The GPU is a microprocessor for image processing, and is connected to the display 194 and the application processor. The GPU is configured to perform mathematical and geometric calculation and render graphics.

The display 194 is configured to display an image, a video, and the like. The display 194 includes a display panel. In some embodiments, the terminal device may include one or N displays 194, where N is a positive integer greater than 1.

The terminal device may implement a photographing function by using the ISP, the camera 193, the video codec, the GPU, the display 194, the application processor, and the like.

The camera 193 is configured to capture a still image or a video. In some embodiments, the terminal device may include one or N cameras 193, where N is a positive integer greater than 1.

The external memory interface 120 may be configured to connect to an external memory card, such as a micro SD card, to extend a storage capability of the terminal device. The external memory card communicates with the processor 110 by using the external memory interface 120, to implement a data storage function. For example, files such as music or videos are stored in the external memory card.

The internal memory 121 may be configured to store computer executable program code, where the executable program code includes instructions. The internal memory 121 may include a program storage area and a data storage area.

The terminal device may implement an audio function, such as music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The speaker 170A, also referred to as a "horn", is configured to convert an audio electrical signal into a sound signal. The terminal device may be used to listen to music or answer a call in a hands-free mode over the speaker 170A. The receiver 170B, also referred to as an "earpiece", is configured to convert an audio electrical signal into a sound signal. When a call is answered or audio information is listened to by using the terminal device, the receiver 170B may be put close to a human ear to listen to a voice. The headset jack 170D is configured to connect to a wired headset. The microphone 170C, also referred to as a "mike" or a "mic", is configured to convert a sound signal into an electrical signal. In this embodiment of this application, the terminal device may have one microphone 170C.

The pressure sensor 180A is configured to sense a pressure signal, and may convert the pressure signal into an electrical signal. In some embodiments, the pressure sensor 180A may be disposed on the display 194. The gyro sensor 180B may be configured to determine a motion gesture of the terminal device. The barometric pressure sensor 180C is configured to measure barometric pressure. The magnetic sensor 180D includes a Hall sensor. The acceleration sensor 180E may detect values of acceleration of the terminal device in all directions (usually on three axes). The distance sensor 180F is configured to measure a distance. The optical proximity sensor 180G may include, for example, a light-emitting diode (LED) and a light detector such as a photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch device". The bone conduction sensor 180M may obtain a vibration signal.

The touch sensor 180K may be disposed on the display 194. The touch sensor 180K and the display 194 form a touchscreen, which is alternatively referred to as a "touch screen". In this embodiment of this application, a capacitive sensing node grid (which is briefly referred to as a capacitive sensor below) may be disposed on the touchscreen. When determining that a value of a capacitance in at least one grid that is received by the capacitive sensor exceeds a capacitance threshold, the terminal device may determine that a touch operation occurs. Further, the terminal device may determine a touch region corresponding to the touch operation based on a region occupied by the at least one grid that exceeds the capacitance threshold.

The button 190 includes a power button, a volume button, and the like. The button 190 may be a mechanical button, or may be a touch button. The terminal device may receive button input, and generate button signal input related to user settings and function control of the terminal device. The indicator 192 may be an indicator light, and may be used to indicate a charging status or a power change, or may be used to indicate a message, a missed call, a notification, or the like.

A software system of the terminal device may use a layered architecture, an event-driven architecture, a micro-kernel architecture, a micro-service architecture, a cloud architecture, or the like. Details are not described herein.

The following describes, by using specific embodiments, in detail the technical solutions of this application and how the technical solutions of this application resolve the foregoing technical problems. The following several specific embodiments may be implemented independently, or may be combined with each other. For same or similar concepts or processes, details may not be described in some embodiments.

In embodiments of this application, in a specific scenario of implementing split-screen display, a terminal device may implement split-screen display based on a background multi-task scenario (embodiments corresponding to FIG. 3a and FIG. 3b to FIG. 9a to FIG. 9f), or a terminal device may implement split-screen display based on a home screen scenario (an embodiment corresponding to FIG. 10a to FIG. 10f).

Figure 3A:
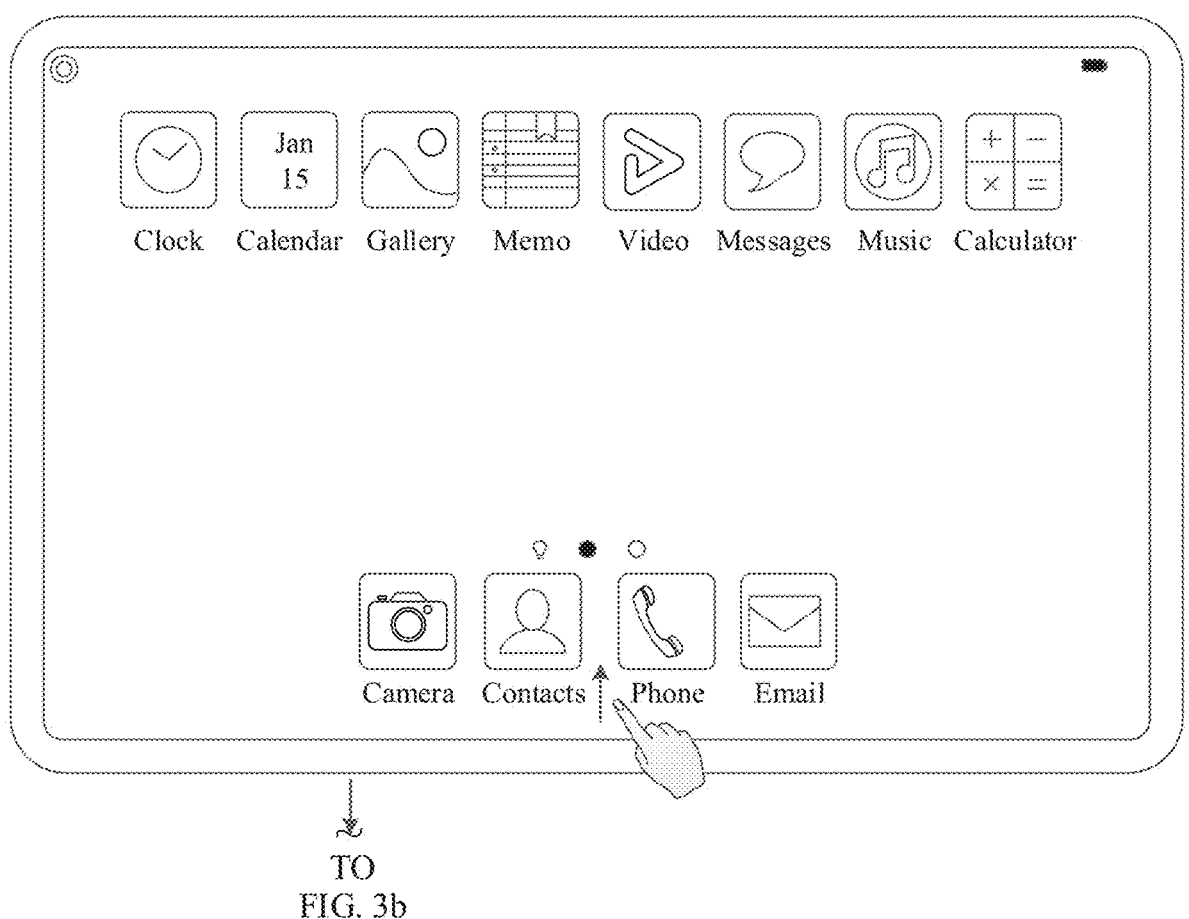
FIG. 3a and FIG. 3b are a schematic diagram of an interface of triggering an application to enter an active state in a plurality of background tasks according to an embodiment of this application.
Figure 3B:
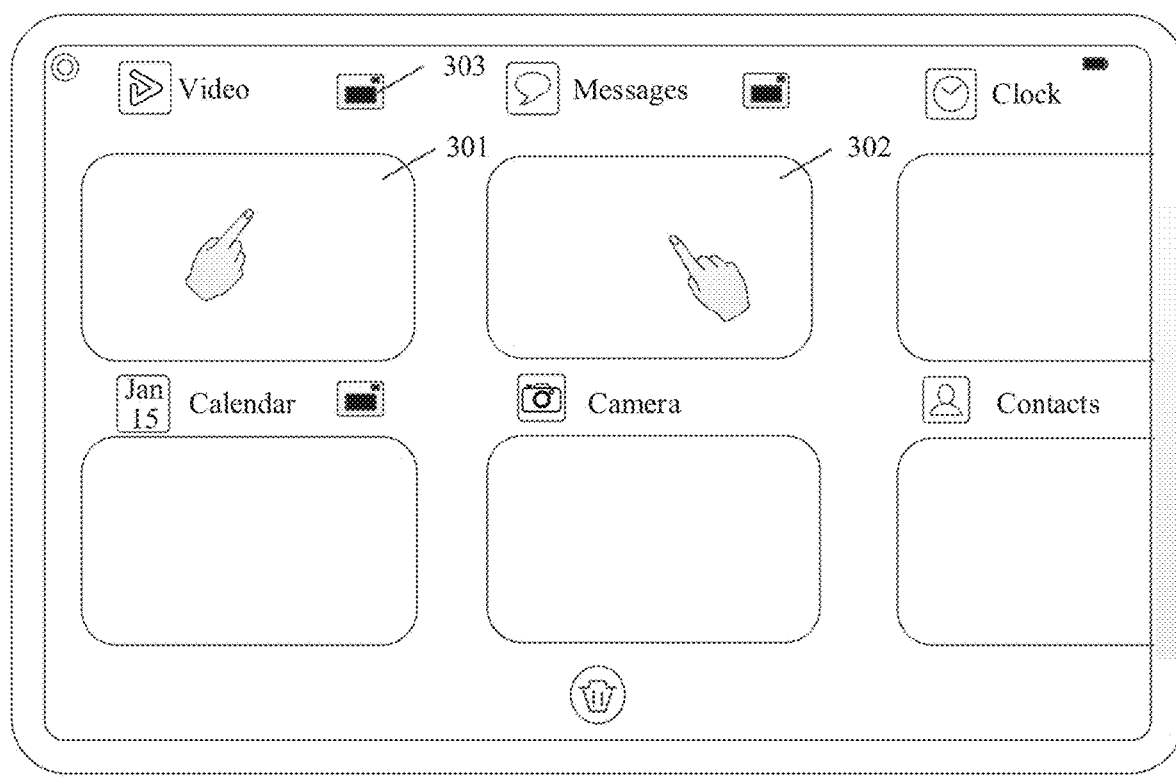

In an embodiment in which the terminal device implements a split-screen display method based on the background multi-task scenario, FIG. 3a and FIG. 3b show a process of triggering entry into the background multi-task scenario. Based on the embodiment corresponding to FIG. 3a and FIG. 3b, FIG. 4a to FIG. 4c and FIG. 5a to FIG. 5c each show a process in which a plurality of fingers simultaneously trigger split-screen display in the background multi-task scenario. Based on the embodiment corresponding to FIG. 3a and FIG. 3b, FIG. 6a to FIG. 6f to FIG. 9a to FIG. 9f each show a process in which a plurality of fingers successively trigger split-screen display in the background multi-task scenario. In the embodiments corresponding to FIG. 3a and FIG. 3b to FIG. 9a to FIG. 9f, an example in which a terminal device is a tablet is used for description. This example does not constitute a limitation on embodiments of this application.

For example, FIG. 3a and FIG. 3b are a schematic diagram of an interface of triggering an application to enter an active state in a plurality of background tasks according to an embodiment of this application.

An interface shown in FIG. 3a may include one or more of the following: Clock, Calendar, Gallery, Memo, Video, Messages, Music, Calculator, or the like. The interface may further include Camera, Contacts, Phone, Email, and the like in a dock region.

In the interface shown in FIG. 3a, when the tablet receives an operation that a user slides upward from a bottom edge of the tablet, the tablet may display an interface shown in FIG. 3b. A background multi-task interface may be displayed in the interface. The background multi-task interface may include thumbnails of a plurality of applications, for example, including one or more of the following: Video 301, Messages 302, Clock, Calendar, Camera, or Contacts. The interface may further include an application cleanup control used to clean up a background application. A floating window control 303 corresponding to Video 301 may be displayed around Video 301, a floating window control corresponding to Messages 302 may be displayed around Messages 302, and a floating window control corresponding to Calendar may be displayed around Calendar. For example, when the tablet receives an operation that the user triggers the floating window control 303, the tablet may display an interface that includes a floating window of Video 301.

In the interface shown in FIG. 3b, when the tablet receives an operation that the user touches and holds a thumbnail corresponding to Video 301 and/or a thumbnail corresponding to Messages 302, Video 301 and/or Messages 302 may be in an active state of waiting for screen splitting. For example, in the active state, an icon corresponding to Video 301 (or the thumbnail corresponding to Video 301) may be displayed in the background multi-task interface in a floating state, a highlighted state, a reduced state, or the like. Further, after Video 301 and/or Messages 302 are/is in the active state, the terminal device may implement a split-screen display process on the basis that the user continues to trigger Video 301 and/or Messages 302 in the active state.

For example, on the basis of triggering an application to enter an active state, FIG. 4a to FIG. 4c and FIG. 5a to FIG. 5c each show a process in which a plurality of fingers simultaneously trigger split-screen display in a background multi-task scenario. In this embodiment of this application, a trigger scenario in which a user touches and holds an application B within a first time threshold in which the user touches and holds an application A is understood as multi-finger simultaneous triggering. A value of the first time threshold is usually small. It may be understood that, because it is difficult for the user to simultaneously touch and hold two applications, when the tablet receives, within a short time period in which the user touches and holds the application A, an operation that the user touches and holds the application B, the tablet may perform split-screen display on at least two applications in the foregoing trigger process according to a split-screen display method in the embodiment corresponding to FIG. 4a to FIG. 4c (or FIG. 5a to FIG. 5c).

Figures 4A, 4B:
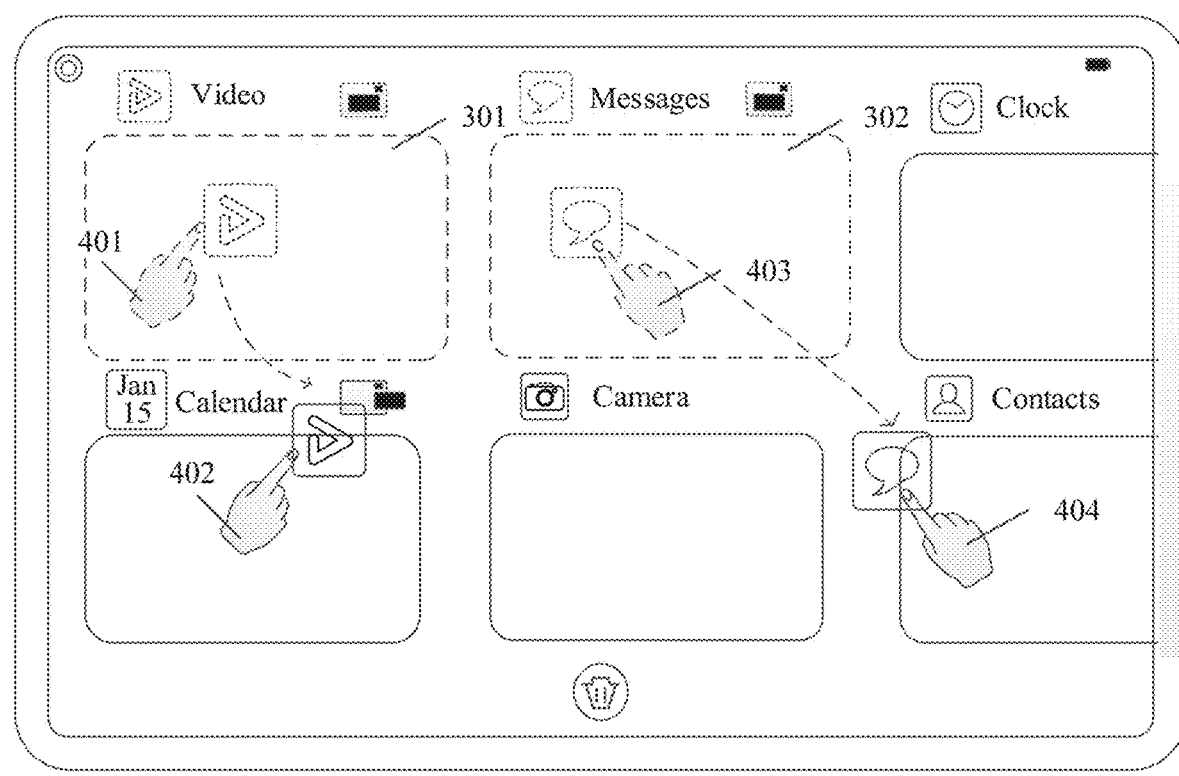
FIG. 4a to FIG. 4c are a schematic diagram of an interface in which two fingers simultaneously trigger split-screen display according to an embodiment of this application.
Figures 4A, 4B, 4C:
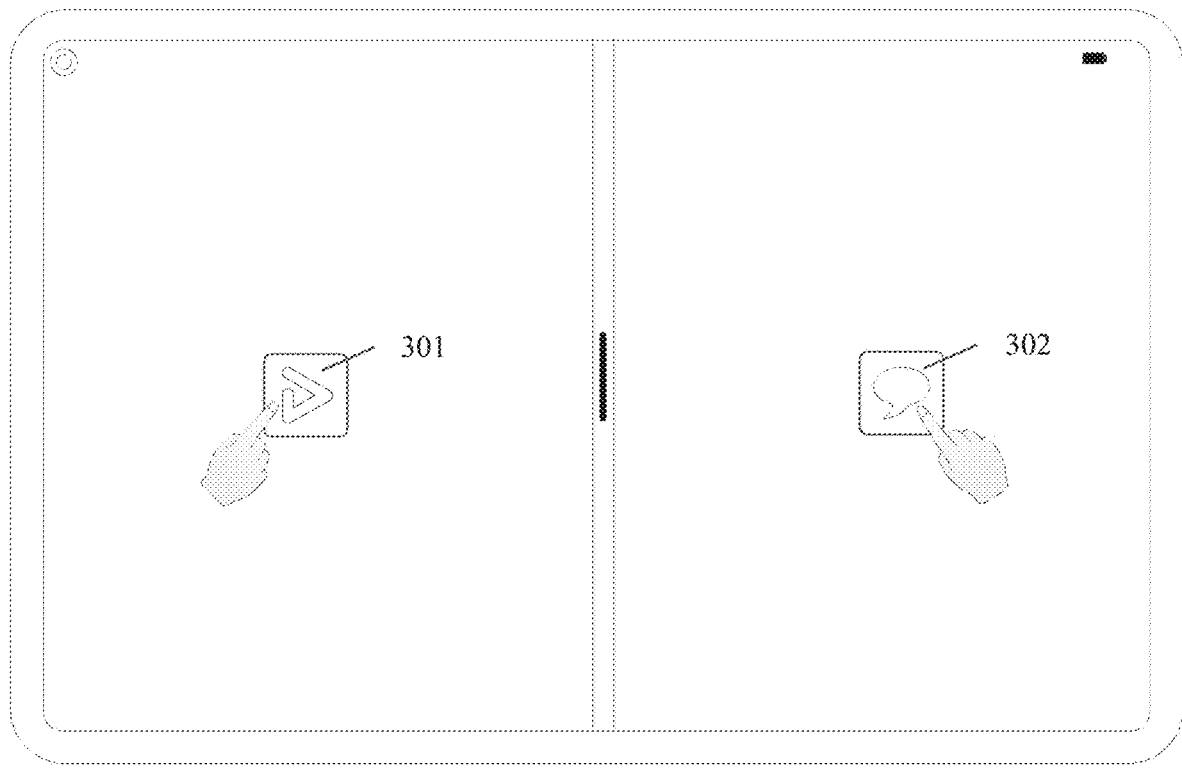
Figure 4C:
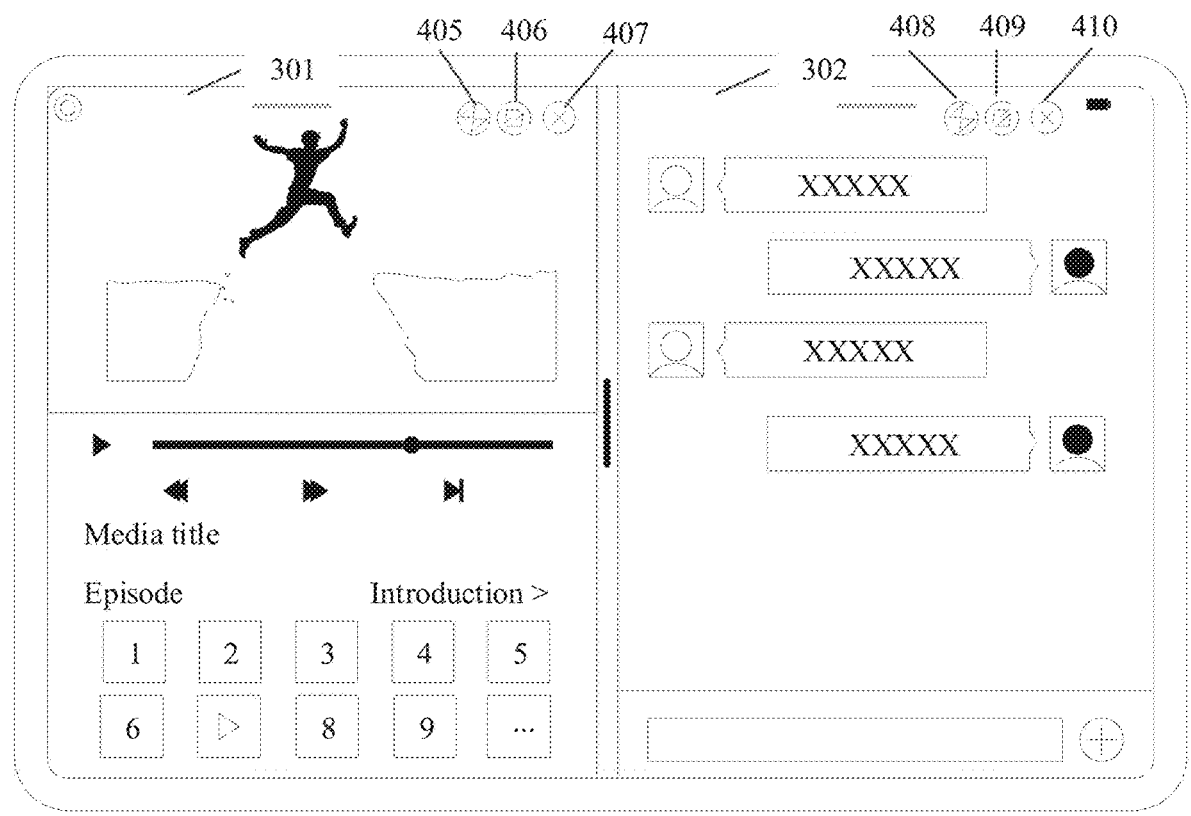

For example, FIG. 4a to FIG. 4c are a schematic diagram of an interface in which two fingers simultaneously trigger split-screen display according to an embodiment of this application.

In an interface shown in FIG. 4a, when the tablet receives an operation that the user touches and holds the thumbnail corresponding to Video 301 (or the icon corresponding to Video 301) and touches and holds the thumbnail corresponding to Messages 302 (or the icon corresponding to Messages 302), both Video 301 and Messages 302 may be in an active state. The active state may refer to a reduced icon. For example, icons in the active state may be a reduced icon of Video 301 and a reduced icon of Messages 302.

Further, when the tablet receives an operation that the user continues to touch and hold Video 301 and Messages 302 in the active state and drags Video 301 and Messages 302 to split-screen regions, for example, touches and holds Video 301 and drags Video 301 from a location of a finger 401 to a location of a finger 402 (the location of the finger 402 may be understood as a left split-screen region on the tablet) and touches and holds Messages 302 and drags Messages 302 from a location of a finger 403 to a location of a finger 404 (the location of the finger 404 may be understood as a right split-screen region on the tablet), the tablet may transitorily display an interface shown in FIG. 4b.

The icon corresponding to Video 301 and the icon corresponding to Messages 302 may be displayed in a left-right split-screen manner in the interface shown in FIG. 4b, and then the tablet may jump to an interface shown in FIG. 4c. In the interface shown in FIG. 4c, a split-screen interface corresponding to Video 301 and a split-screen interface corresponding to Messages 302 may be displayed in a left-right split-screen manner in the interface. The split-screen interface corresponding to Video 301 may include one or more of the following: for example, a control 405 used to minimize the split-screen display interface, a control 406 used to display the split-screen display interface in full screen, or a control 407 used to exit the split-screen display interface. Similarly, the split-screen interface corresponding to Messages 302 may include one or more of the following: for example, a control 408, a control 409, or a control 410.

In a possible implementation, in the interface shown in FIG. 4c, when the tablet receives an operation that the user triggers the control 405, the split-screen interface corresponding to Video 301 may be minimized to be displayed in the background, or may be displayed in another region used to place a minimized application. Correspondingly, in this case, the split-screen interface corresponding to Video 301 in the tablet may be blank, or display a thumbnail of a home screen of the tablet. Alternatively, when the tablet receives an operation that the user triggers the control 406, the split-screen interface corresponding to Video 301 may be displayed in full screen. Alternatively, when the tablet receives an operation that the user triggers the control 407, split-screen display of the split-screen interface corresponding to Video 301 may be exited. Correspondingly, in this case, the tablet may display, in full screen, the interface corresponding to Messages 302.

It may be understood that the control used to minimize the split-screen display interface, the control used to display the split-screen display interface in full screen, the control used to exit the split-screen display interface, and the like in the split-screen interface may be displayed at any location in the split-screen interface. For example, the three controls are placed in an upper right part of the split-screen interface (as shown in the interface shown in FIG. 4c), or may be placed in a direct upper part of the split-screen interface, or may be placed in an upper left part of the split-screen interface. This is not limited in this embodiment of this application.

Based on this, in a background multi-task scenario, the terminal device can implement quick screen splitting for a plurality of applications based on simultaneous trigger and drag operations performed by the user on the applications.

Figure 5A:
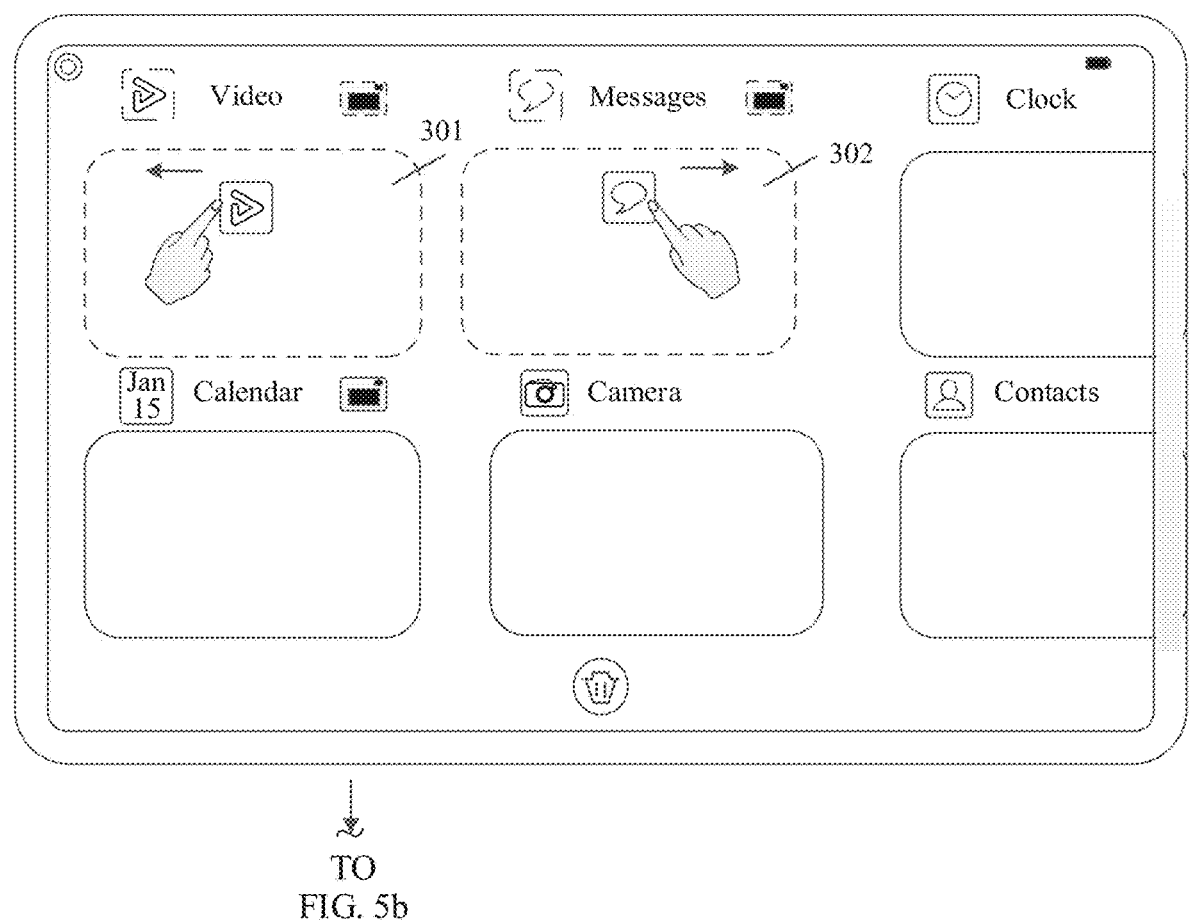
FIG. 5a to FIG. 5c are a schematic diagram of another interface in which two fingers simultaneously trigger split-screen display according to an embodiment of this application.
Figure 5B:
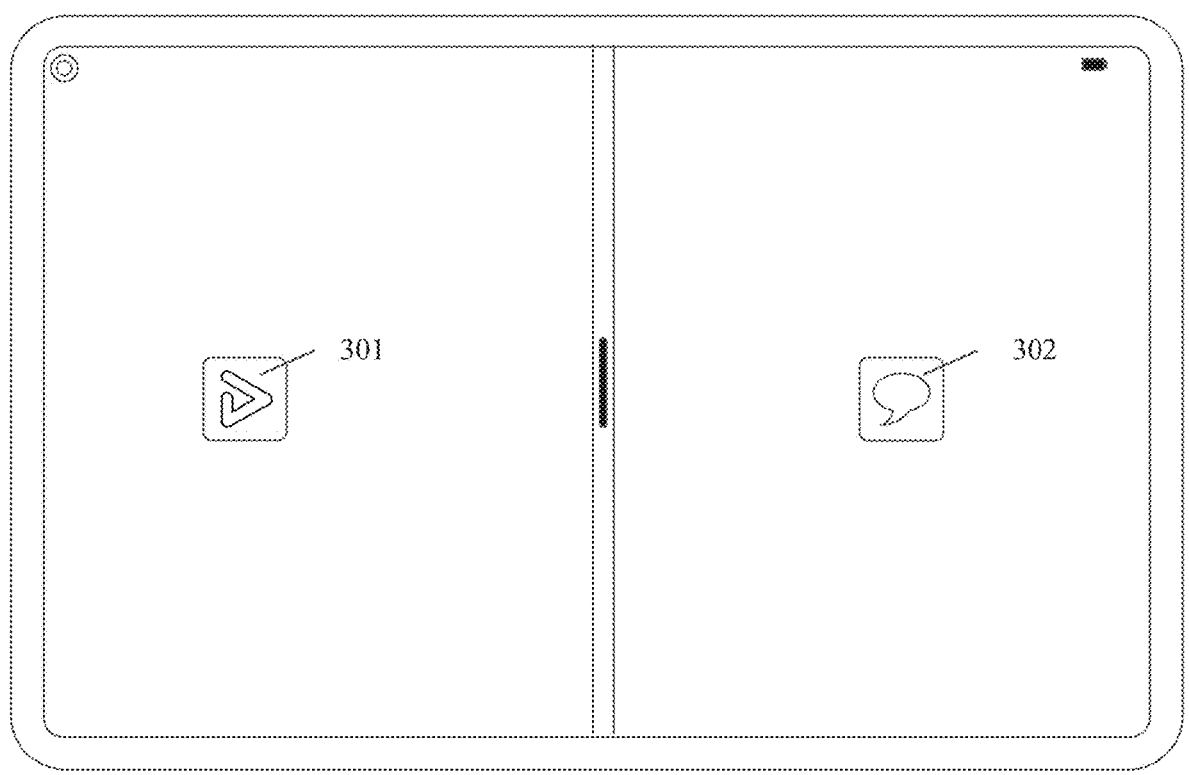
Figure 5C:
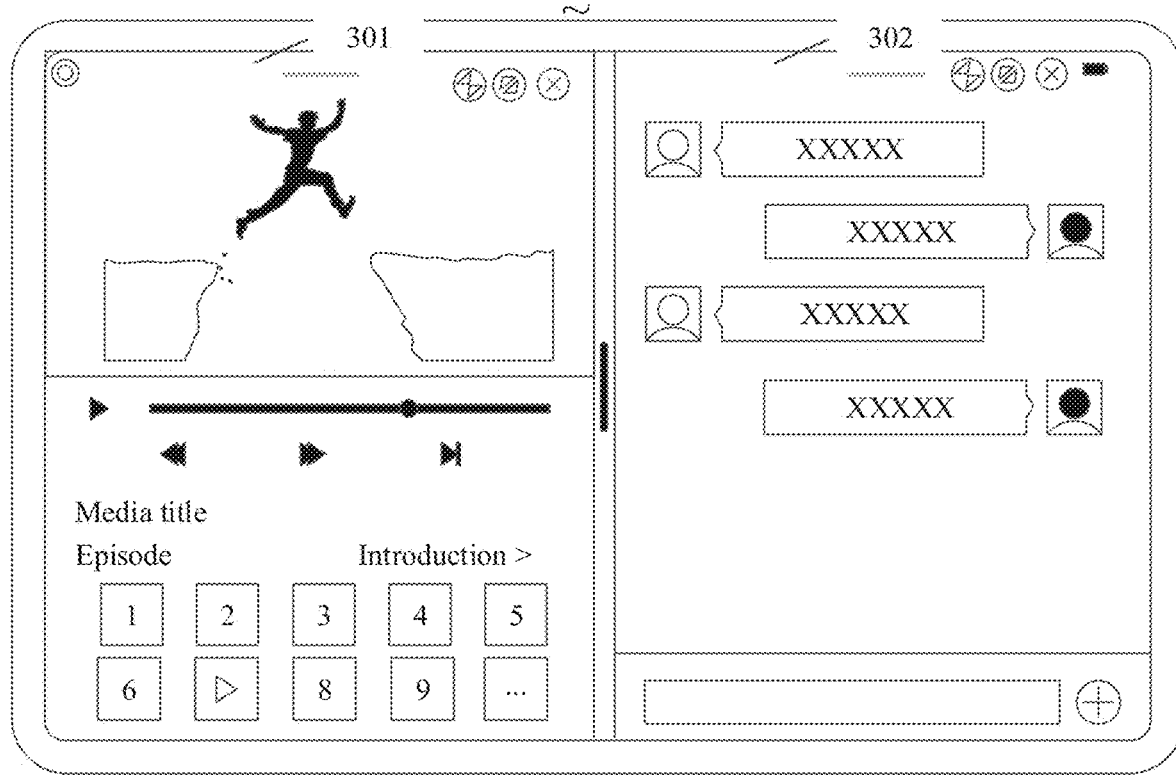

For example, FIG. 5a to FIG. 5c are a schematic diagram of another interface in which two fingers simultaneously trigger split-screen display according to an embodiment of this application.

In an interface shown in FIG. 5a, when the tablet receives an operation that the user touches and holds the thumbnail corresponding to Video 301 (or the icon corresponding to Video 301) and touches and holds the thumbnail corresponding to Messages 302 (or the icon corresponding to Messages 302), both Video 301 and Messages 302 may be in an active state.

Further, when the tablet receives an operation that the user continues to touch and hold Video 301 and Messages 302 in the active state and slides in a left-right direction, for example, touches and holds Video 301 in the active state and slides leftward, and touches and holds Messages 302 in the active state and slides rightward, the tablet may transitorily display an interface shown in FIG. 5b. In the interface, the icon corresponding to Video 301 and the icon corresponding to Messages 302 may be displayed in a left-right split-screen manner, and then the tablet may jump to an interface shown in FIG. 5c. The interface shown in FIG. 5a is the same as the interface shown in FIG. 4b, and the interface shown in FIG. 5c is the same as the interface shown in FIG. 4c. Details are not described herein again.

In a possible implementation, in the interface shown in FIG. 5a, when the tablet receives an operation that the user touches and holds the thumbnail corresponding to Video 301 and slides rightward, and touches and holds the thumbnail corresponding to Messages 302 and slides leftward, the tablet may transitorily display the icon corresponding to Messages 302 and the icon corresponding to Video 301 in a left-right split-screen manner, and jump to the split-screen interface corresponding to Messages 302 and the split-screen interface corresponding to Video 301. The icon corresponding to Messages 302 and the split-screen interface corresponding to Messages 302 may be a left split-screen region on the tablet, and the icon corresponding to Video 301 and the split-screen region corresponding to Video 301 may be a right split-screen region on the tablet.

In a possible implementation, in the interface shown in FIG. 5a, when the tablet receives an operation that the user touches and holds the thumbnail corresponding to Video 301 and slides upward (or downward), and touches and holds the thumbnail corresponding to Messages 302 and slides downward (or upward), the tablet may present an up-down split-screen display interface. A sliding direction is not limited in this embodiment of this application.

Based on this, in a background multi-task scenario, the terminal device can implement quick screen splitting for a plurality of applications based on simultaneous trigger and slide operations performed by the user on the applications.

In the foregoing split-screen display method in the embodiments corresponding to FIG. 3a and FIG. 3b to FIG. 5a to FIG. 5c, the terminal device may also implement screen splitting for three, four, or more applications based on simultaneous operations performed by the user by using a plurality of fingers. A specific operation method is similar to the foregoing, and details are not described herein.

On the basis of triggering an application to enter an active state in the embodiment corresponding to FIG. 3a and FIG. 3b, FIG. 6a to FIG. 6f to FIG. 9a to FIG. 9f each show a process in which a plurality of fingers successively trigger split-screen display in a background multi-task scenario. Multi-finger successive triggering may be understood as that a time interval for multi-finger successive triggering exceeds a second time threshold.

For example, FIG. 6a to FIG. 6f are a schematic diagram of an interface in which two fingers successively trigger split-screen display according to an embodiment of this application.

Figure 6A:
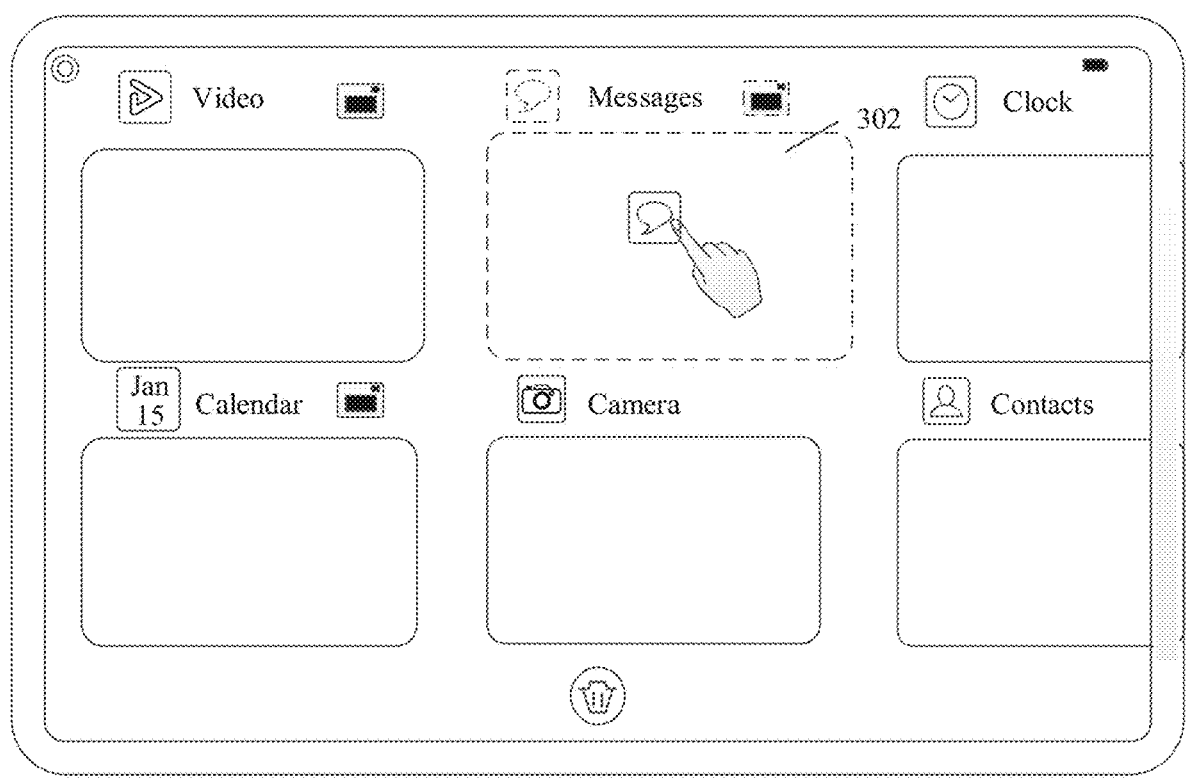
FIG. 6a to FIG. 6f are a schematic diagram of an interface in which two fingers successively trigger split-screen display according to an embodiment of this application.

In an interface shown in FIG. 6a, when the tablet receives an operation that the user touches and holds the thumbnail corresponding to Messages 302 (or the icon corresponding to Messages 302), Messages 302 may be in an active state.

Figure 6B:
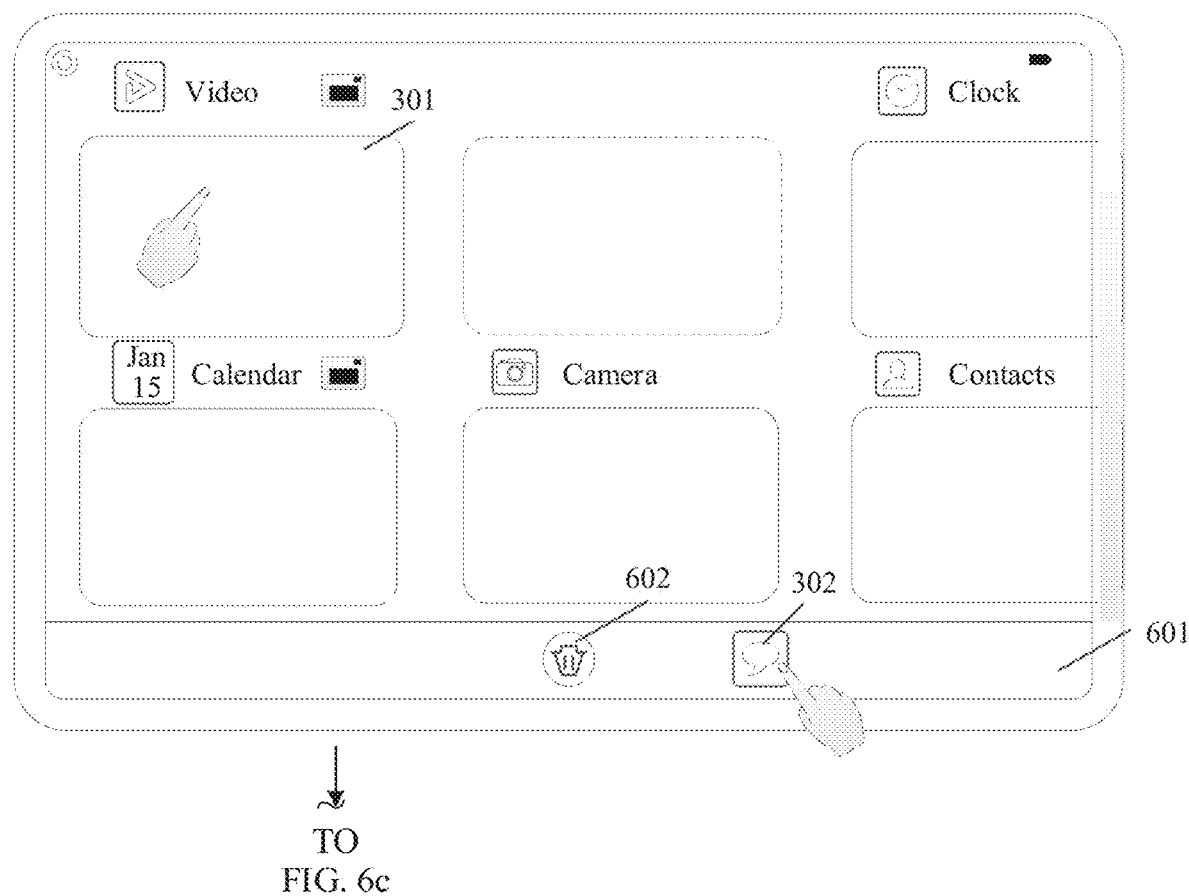

In an interface shown in FIG. 6b, when the tablet receives an operation that the user touches and holds Messages 302 in the active state and drags Messages 302 to a lower region of the tablet (for example, a region in which a fixing bar 601 is located), the tablet may fix Messages 302 in the fixing bar 601, to prevent the user from dragging the application all the time. The fixing bar 601 may further include an application cleanup control 602. In a possible implementation, when the user does not drag Messages 302 to the fixing bar 601, the user may continue to touch and hold Messages 302 in the active state at a current location. Alternatively, to avoid a case in which when the user continues to touch and hold Messages 302 in the active state at a current location, a location of Messages 302 affects the user in viewing other content at the location, the user may continue to touch and hold Messages 302 in the active state and drag Messages 302 to another blank region. This is not limited in this embodiment of this application.

Figure 6C:
Figure 6D:
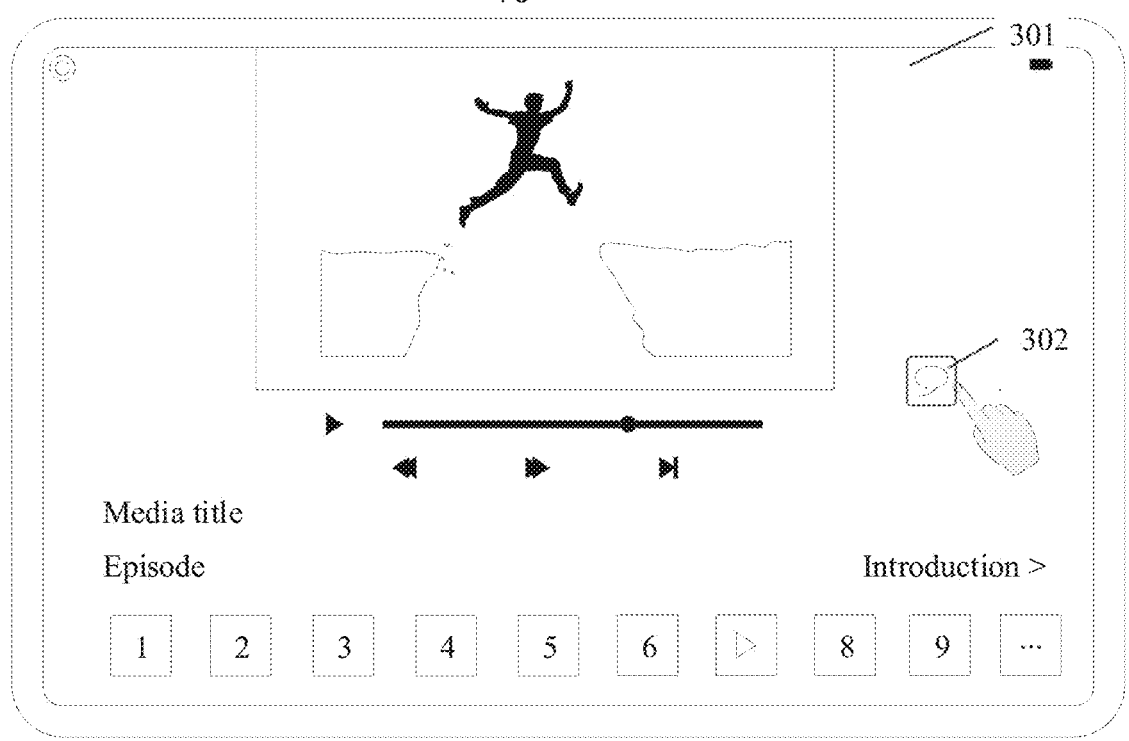

In an interface shown in FIG. 6c, when the tablet receives an operation that the user touches and holds Video 301 and drags Video 301 to a middle region of the tablet (or taps Video 301) when the user continues to touch and hold Messages 302, the tablet may display an interface corresponding to Video 301 in full screen, for example, an interface shown in FIG. 6d. The interface may further include the icon corresponding to Messages 302. In a process of triggering full-screen display of Video 301, the user continues to touch and hold Messages 302.

Figure 6E:
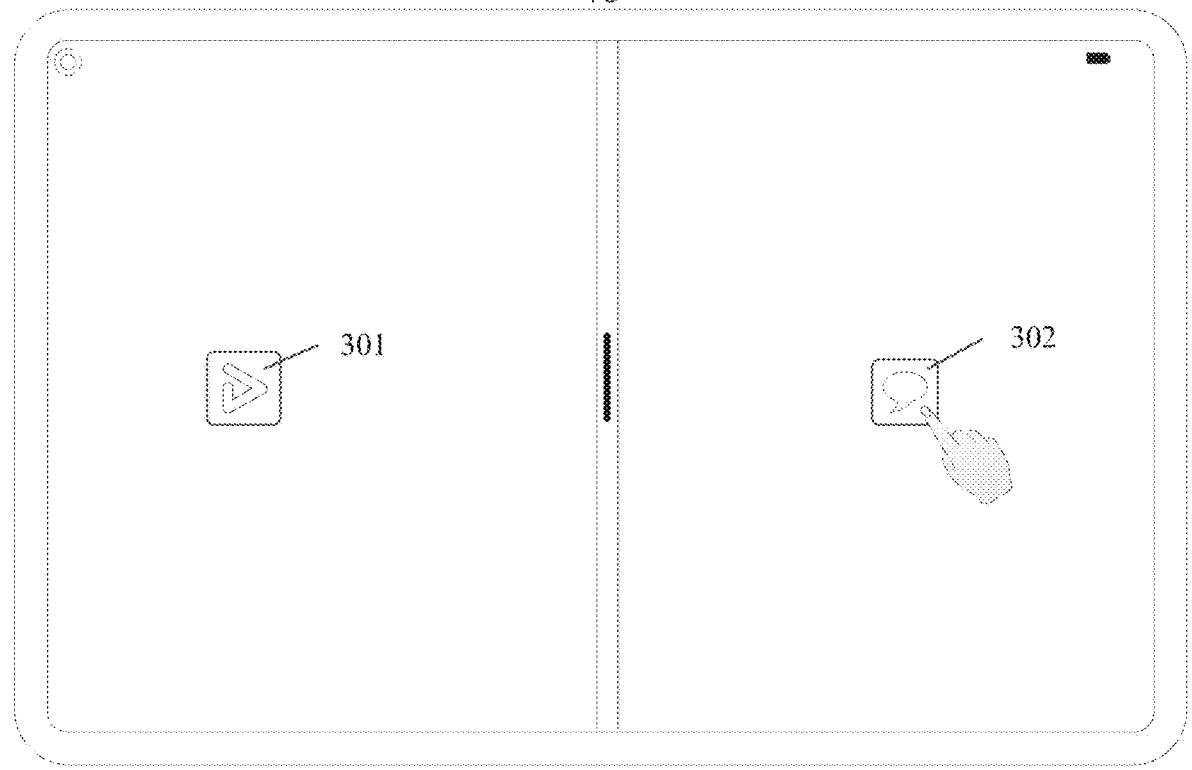
Figure 6F:
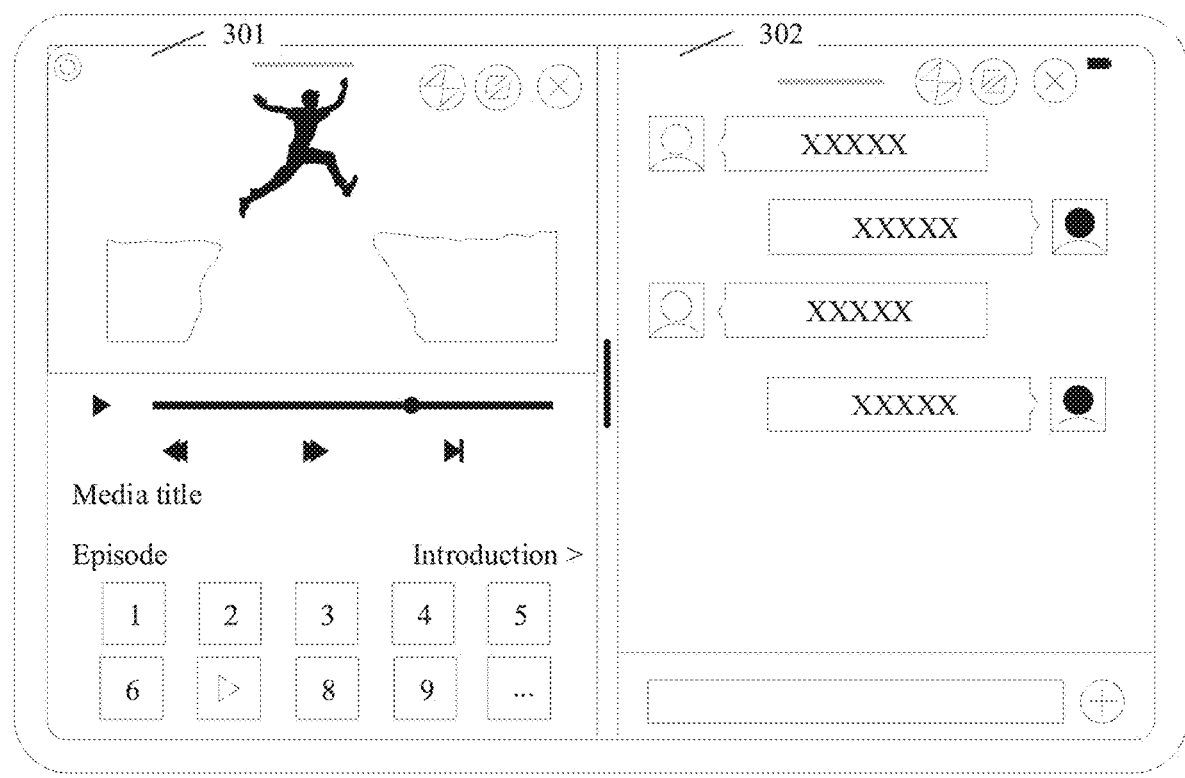

Further, in the interface shown in FIG. 6d, when the tablet receives an operation that the user drags Messages 302 to a split-screen region such as a right split-screen region on the tablet, the tablet may transitorily display an interface shown in FIG. 6e. In the interface, the icon corresponding to Video 301 and the icon corresponding to Messages 302 may be displayed in a left-right split-screen manner. Then, the tablet may jump to an interface shown in FIG. 6f. The interface shown in FIG. 6e is the same as the interface shown in FIG. 4b, and the interface shown in FIG. 6f is the same as the interface shown in FIG. 4c. Details are not described herein again.

It may be understood that, in the interface shown in FIG. 6b, when the user touches and holds an application and drags the application to the fixing bar 601, the tablet may fix the application to the fixing bar 601. Alternatively, when the user touches and holds an application in the fixing bar 601 and moves the application out of the fixing bar 601, the tablet may remove the application from the fixing bar 601.

In a possible implementation, in the interface shown in FIG. 6b, the user may trigger a plurality of applications in the fixing bar 601 to implement split-screen display of the applications. Alternatively, the user may separately trigger thumbnails corresponding to applications (or icons corresponding to the applications) in the fixing bar 601 and a region other than the fixing bar 601 in the background multi-task interface, to implement split-screen display of the applications.

In a possible implementation, in the interface shown in FIG. 6b, when the tablet receives an operation that the user triggers the application cleanup control 602, the tablet may clean up a thumbnail corresponding to an application in a region other than the fixing bar 601 in the background multi-task interface, and the tablet may retain a plurality of applications in the fixing bar 601. Alternatively, in the interface shown in FIG. 6b, when the tablet receives an operation that the user triggers the application cleanup control 602, the tablet may clean up a plurality of applications in the fixing bar 601, and the tablet may retain a thumbnail corresponding to an application in a region other than the fixing bar 601 in the background multi-task interface. It may be understood that when the background multi-task interface includes the fixing bar 601, a function of the application cleanup control 602 in the fixing bar 601 may include other content according to an actual scenario. This is not limited in this embodiment of this application.

Based on this, in a background multi-task scenario, the terminal device can implement quick screen splitting for applications when the user triggers thumbnails of applications and/or icons of applications in the fixing bar a plurality of times by using two fingers, so that flexibility of screen splitting for applications is improved.

For example, FIG. 7a to FIG. 7f are a schematic diagram of another interface in which two fingers successively trigger split-screen display according to an embodiment of this application.

Figure 7A:
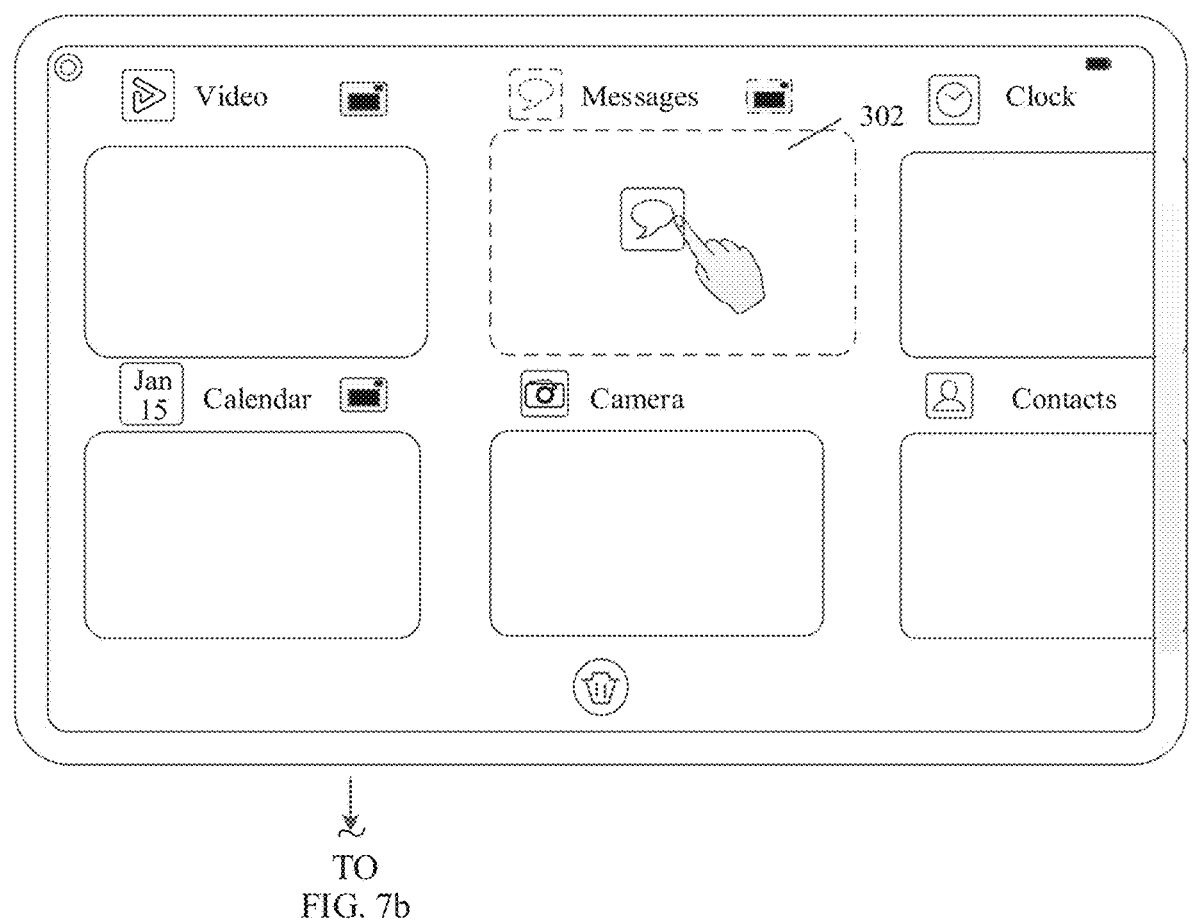
FIG. 7a to FIG. 7f are a schematic diagram of another interface in which two fingers successively trigger split-screen display according to an embodiment of this application.

In an interface shown in FIG. 7a, when the tablet receives an operation that the user touches and holds the thumbnail corresponding to Messages 302 (or the icon corresponding to Messages 302), Messages 302 may be in an active state.

Figure 7B:
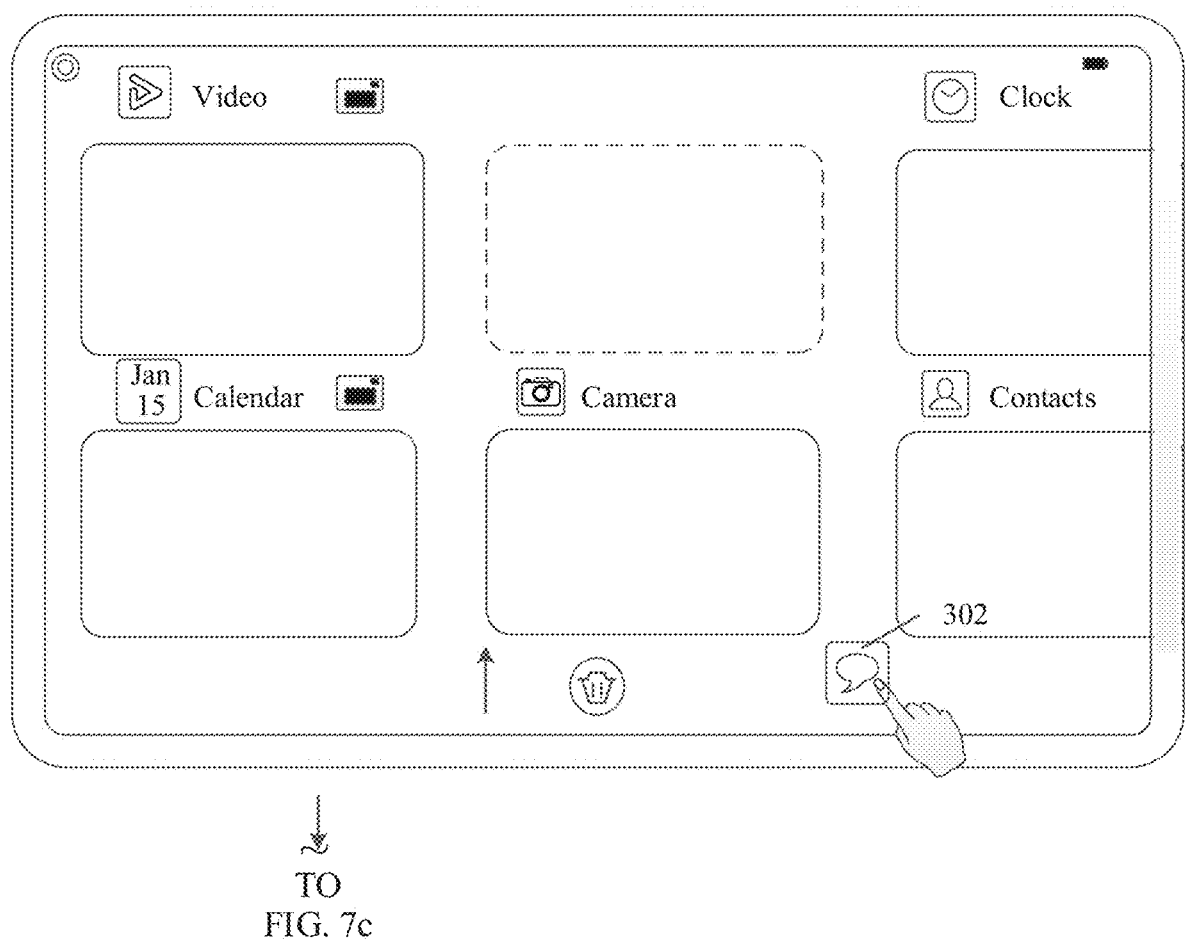
Figure 7C:
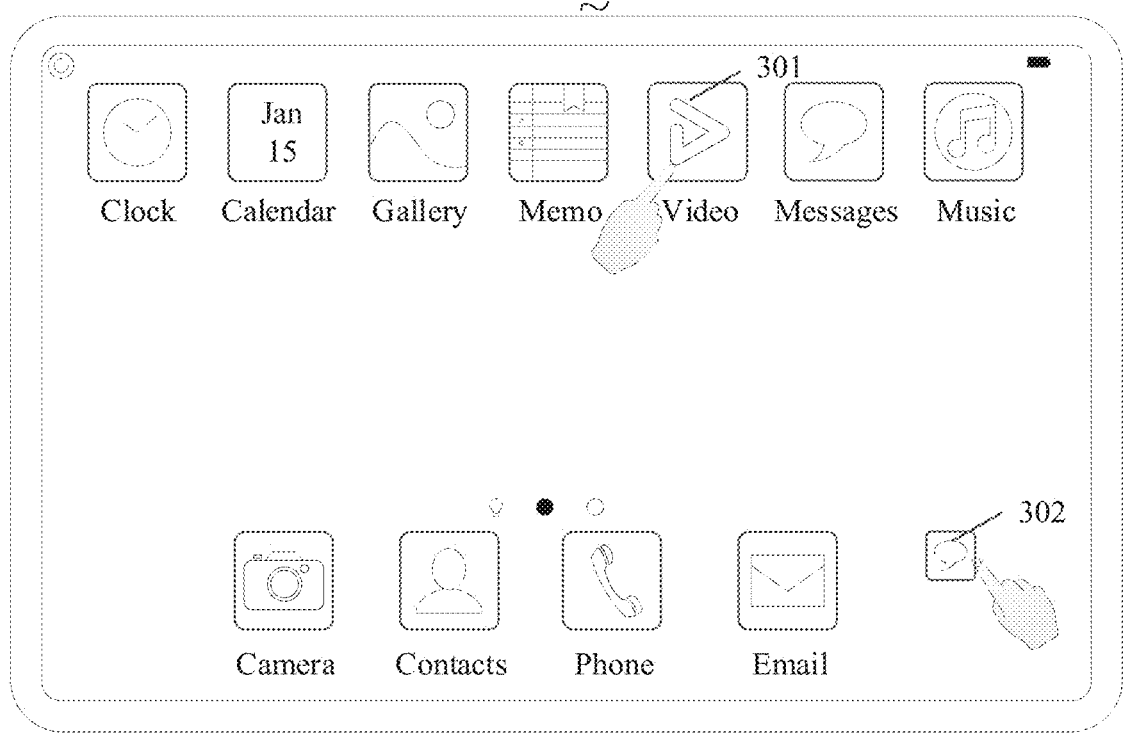

In an interface shown in FIG. 7b, when the tablet receives an operation that the user continues to touch and hold Messages 302 and slides upward from a bottom edge of the tablet, the tablet may display an interface shown in FIG. 7c. The interface may include at least one or more of the following: for example, Clock, Calendar, Gallery, Memo, Video 301, Messages, Music, Camera, Contacts, Phone, or Email. The interface may further include an icon corresponding to Messages 302 (which may be understood as Messages 302 that the user continues to touch and hold).

Figure 7D:
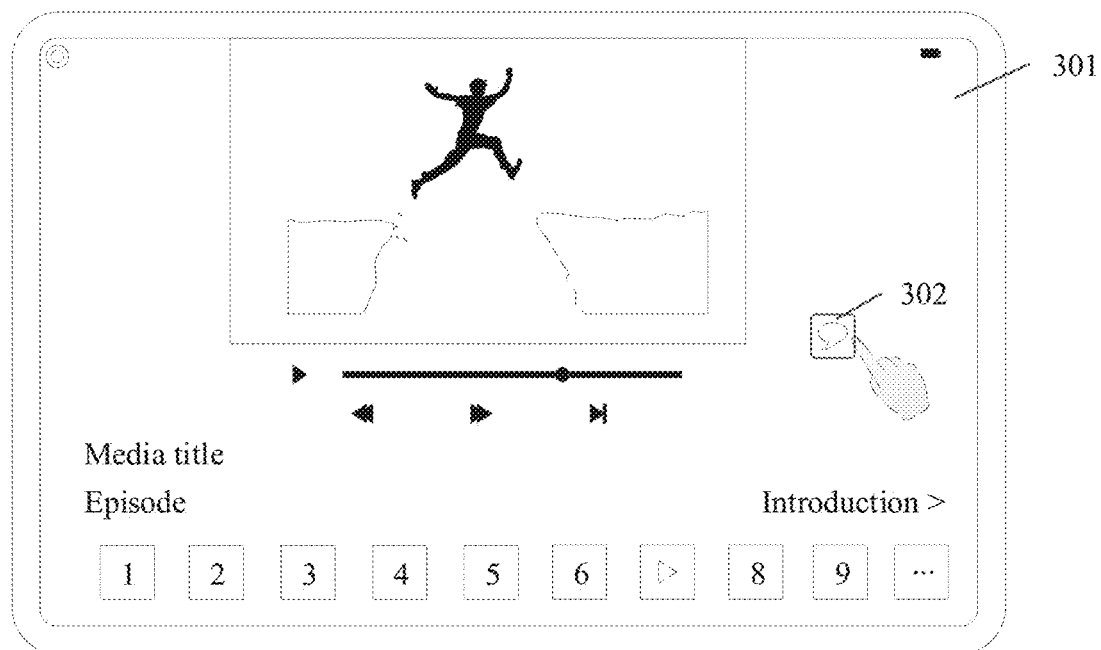

In the interface shown in FIG. 7c, when the tablet receives an operation that the user continues to drag Messages 302 and drags Video 301 to a middle region of the tablet (or the user taps Video 301), the tablet may display the interface corresponding to Video 301 in full screen, for example, an interface shown in FIG. 7d. The interface may further include the icon corresponding to Messages 302.

Figure 7E:
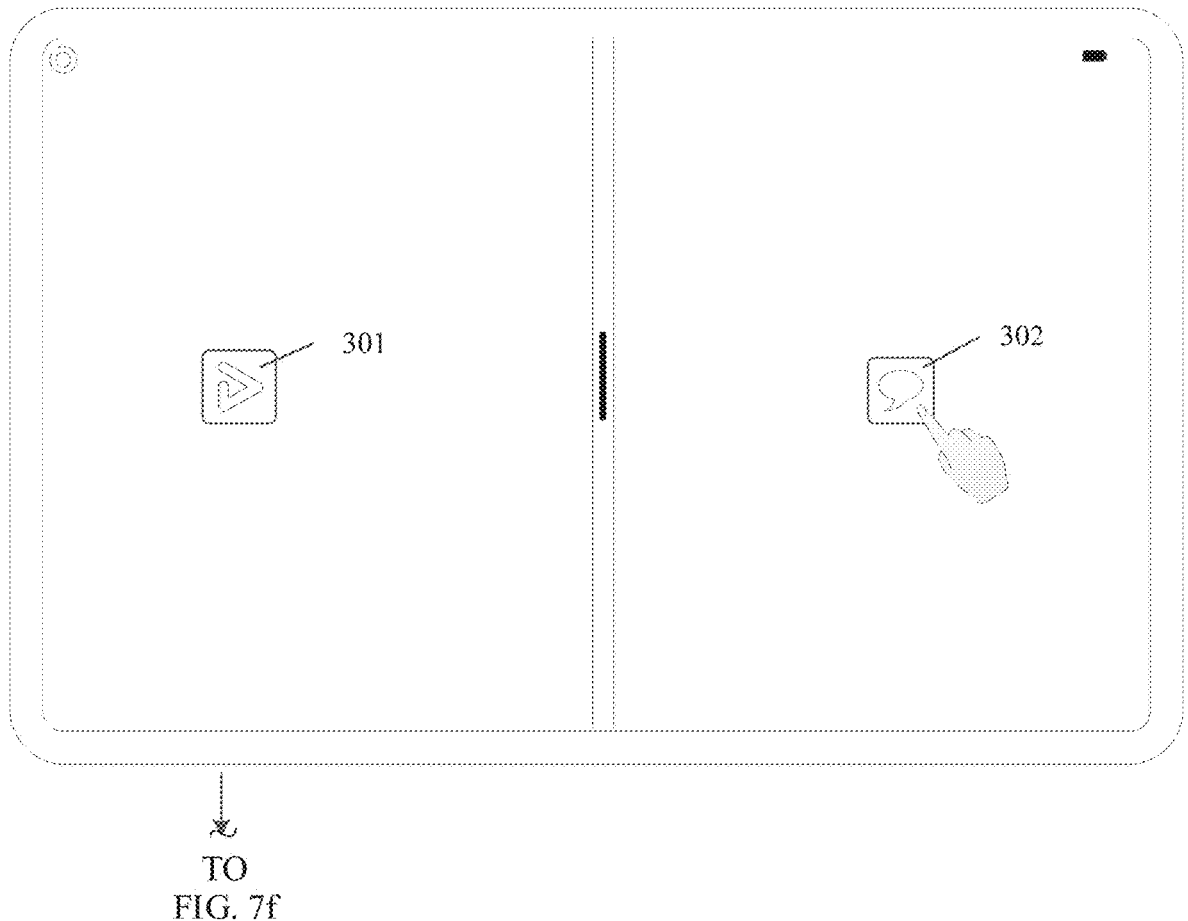
Figure 7F:
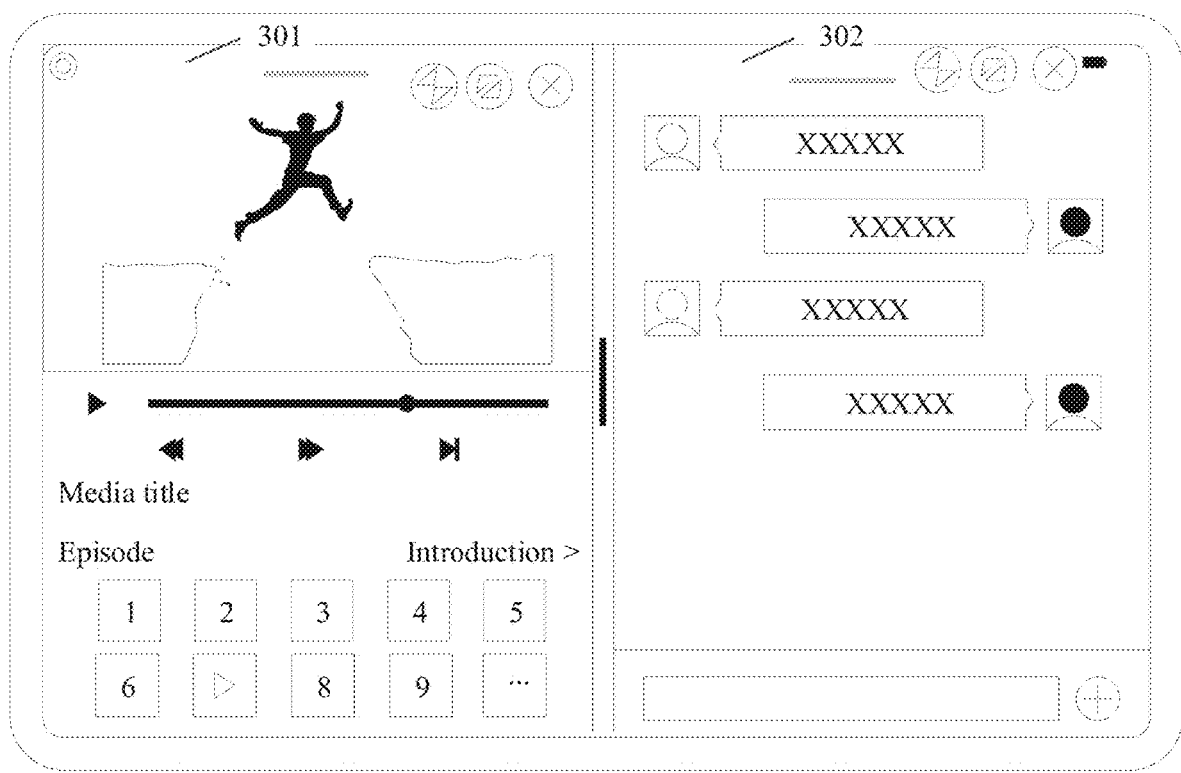

In the interface shown in FIG. 7d, when the tablet receives an operation that the user drags Messages 302 to a split-screen region such as a right split-screen region on the tablet, the tablet may transitorily display an interface shown in FIG. 7e. In the interface, the icon corresponding to Video 301 and the icon corresponding to Messages 302 may be displayed in a left-right split-screen manner. Then, the tablet may jump to an interface shown in FIG. 7f. The interface shown in FIG. 7e is the same as the interface shown in FIG. 4b, and the interface shown in FIG. 7f is the same as the interface shown in FIG. 4c. Details are not described herein again.

Based on this, the terminal device can implement quick screen splitting for applications when the user triggers a thumbnail of an application in a background multi-task interface and an icon of an application on a home screen a plurality of times, so that flexibility of screen splitting for applications is improved.

For example, FIG. 8a to FIG. 8f are a schematic diagram of still another interface in which two fingers successively trigger split-screen display according to an embodiment of this application.

Figure 8A:
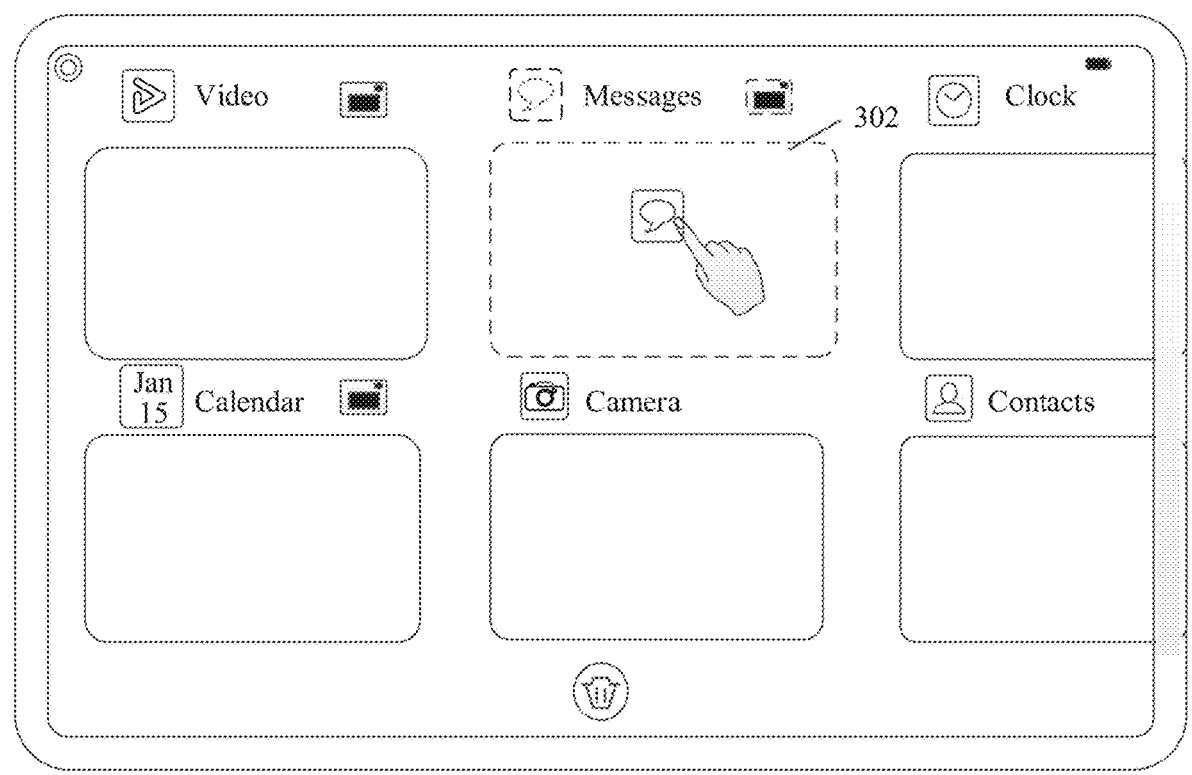
FIG. 8a to FIG. 8f are a schematic diagram of still another interface in which two fingers successively trigger split-screen display according to an embodiment of this application.

In an interface shown in FIG. 8a, when the tablet receives an operation that the user touches and holds the thumbnail corresponding to Messages 302 (or the icon corresponding to Messages 302), Messages 302 may be in an active state.

Figure 8B:
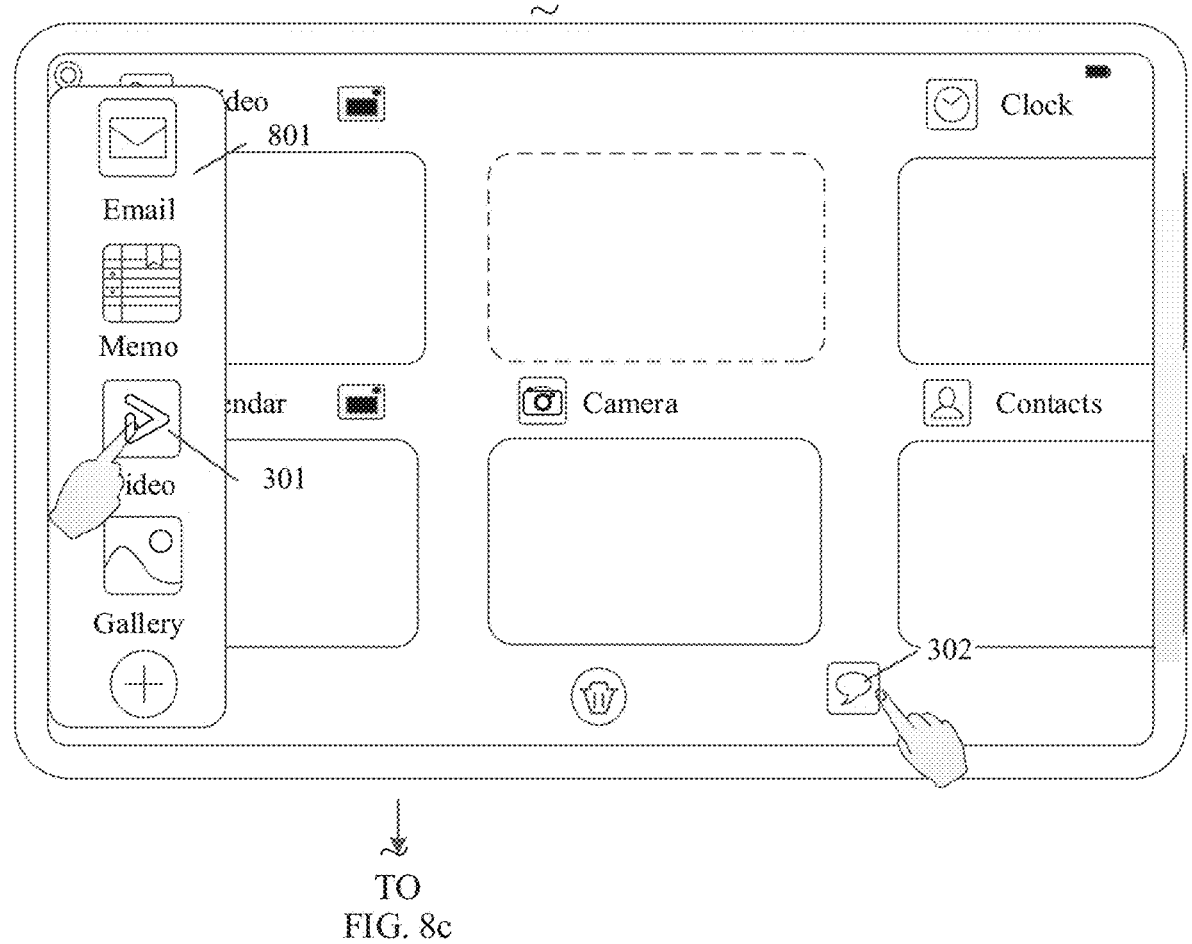
Figure 8C:

In the interface shown in FIG. 8a, when the tablet receives an operation that the user continues to touch and hold Messages 302 and slides inward from an edge of the tablet, the tablet may display an interface shown in FIG. 8b. The interface may include a split-screen task bar 801, and the split-screen task bar 801 may include one or more of the following: for example, Email, Memo, Video 301, or Gallery. Further, in the interface shown in FIG. 8b, when the tablet receives an operation that the user continues to touch and hold Video 301 and drags Video 301 to the middle of the tablet, the tablet may transitorily display an interface shown in FIG. 8c, and jump to an interface shown in FIG. 8d. The interface shown in FIG. 8d may include Video 301 displayed in full screen, and the interface may further include the icon corresponding to Messages 302.

Figure 8D:
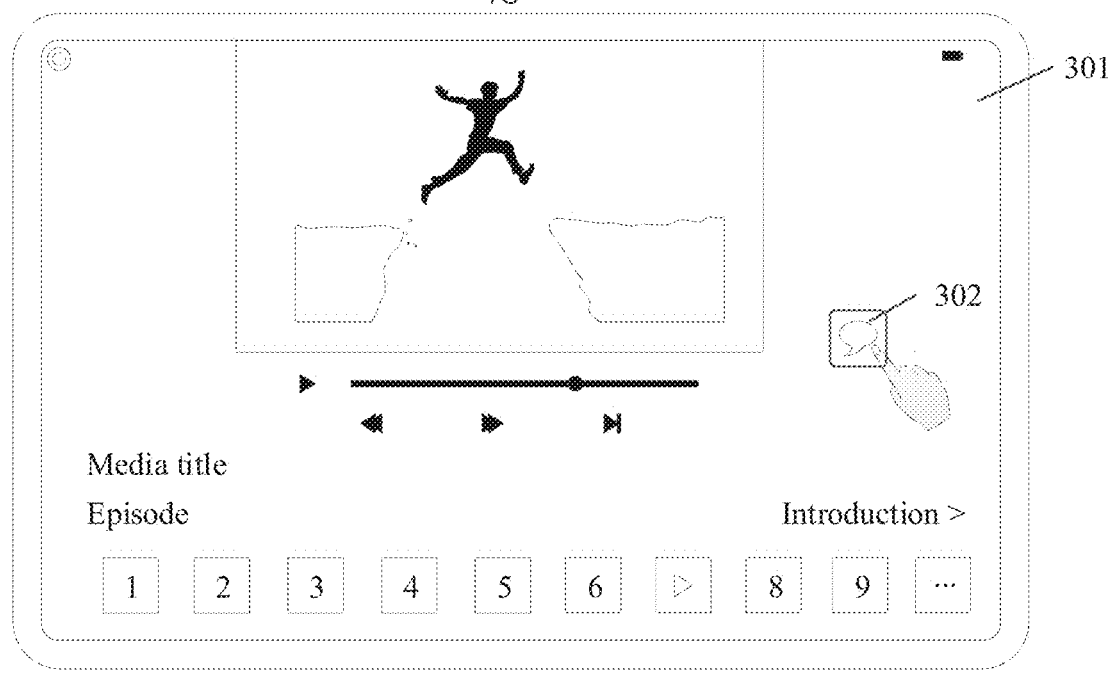
Figure 8E:
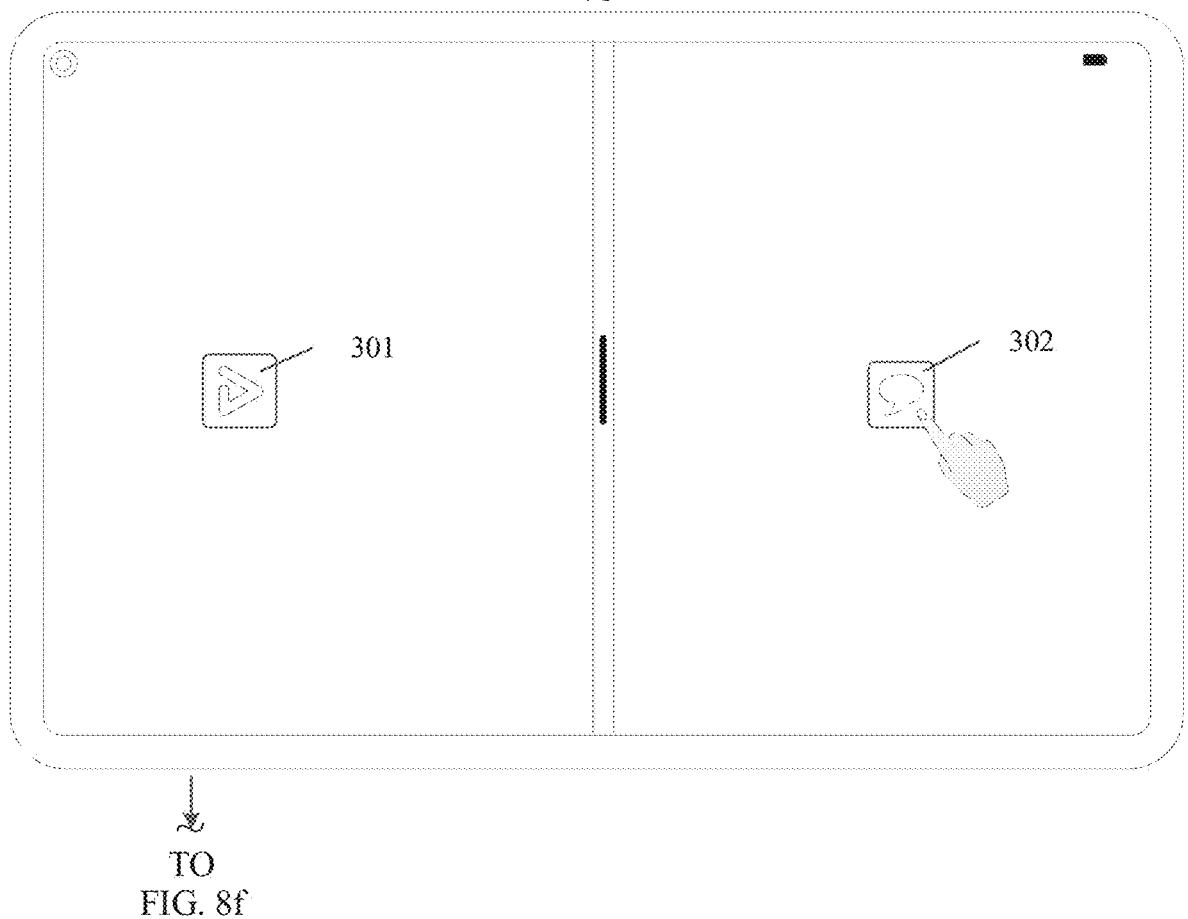
Figure 8F:
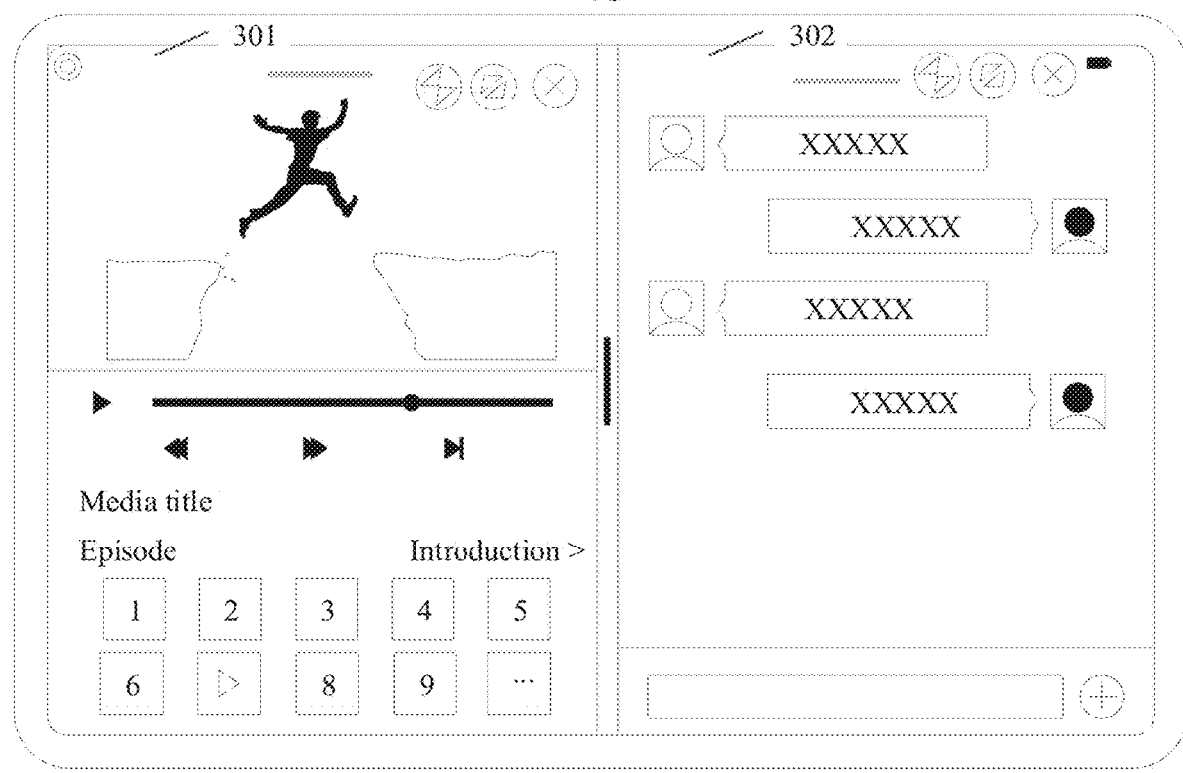

In the interface shown in FIG. 8d, when the tablet receives an operation that the user drags Messages 302 to a split-screen region such as a right split-screen region on the tablet, the tablet may transitorily display an interface shown in FIG. 8e. In the interface, the icon corresponding to Video 301 and the icon corresponding to Messages 302 may be displayed in a left-right split-screen manner. Then, the tablet may jump to an interface shown in FIG. 8f. The interface shown in FIG. 8e is the same as the interface shown in FIG. 4b, and the interface shown in FIG. 8f is the same as the interface shown in FIG. 4c. Details are not described herein again.

Based on this, the terminal device can implement quick screen splitting for applications when the user triggers a thumbnail of an application in a background multi-task interface and an application in a split-screen task bar a plurality of times, so that flexibility of screen splitting for applications is improved.

For example, FIG. 9a to FIG. 9f are a schematic diagram of yet another interface in which two fingers successively trigger split-screen display according to an embodiment of this application.

Figure 9A:
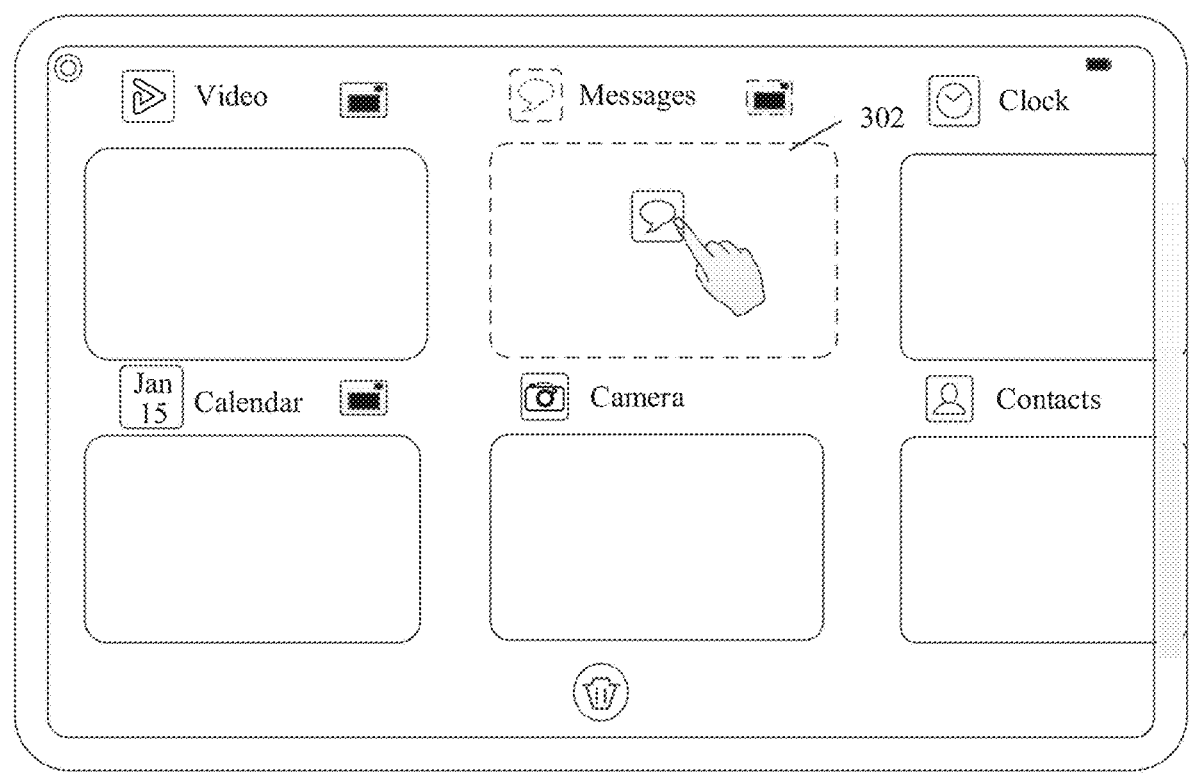
FIG. 9a to FIG. 9f are a schematic diagram of yet another interface in which two fingers successively trigger split-screen display according to an embodiment of this application.

In an interface shown in FIG. 9a, when the tablet receives an operation that the user touches and holds the thumbnail corresponding to Messages 302 (or the icon corresponding to Messages 302), Messages 302 may be in an active state.

Figure 9B:
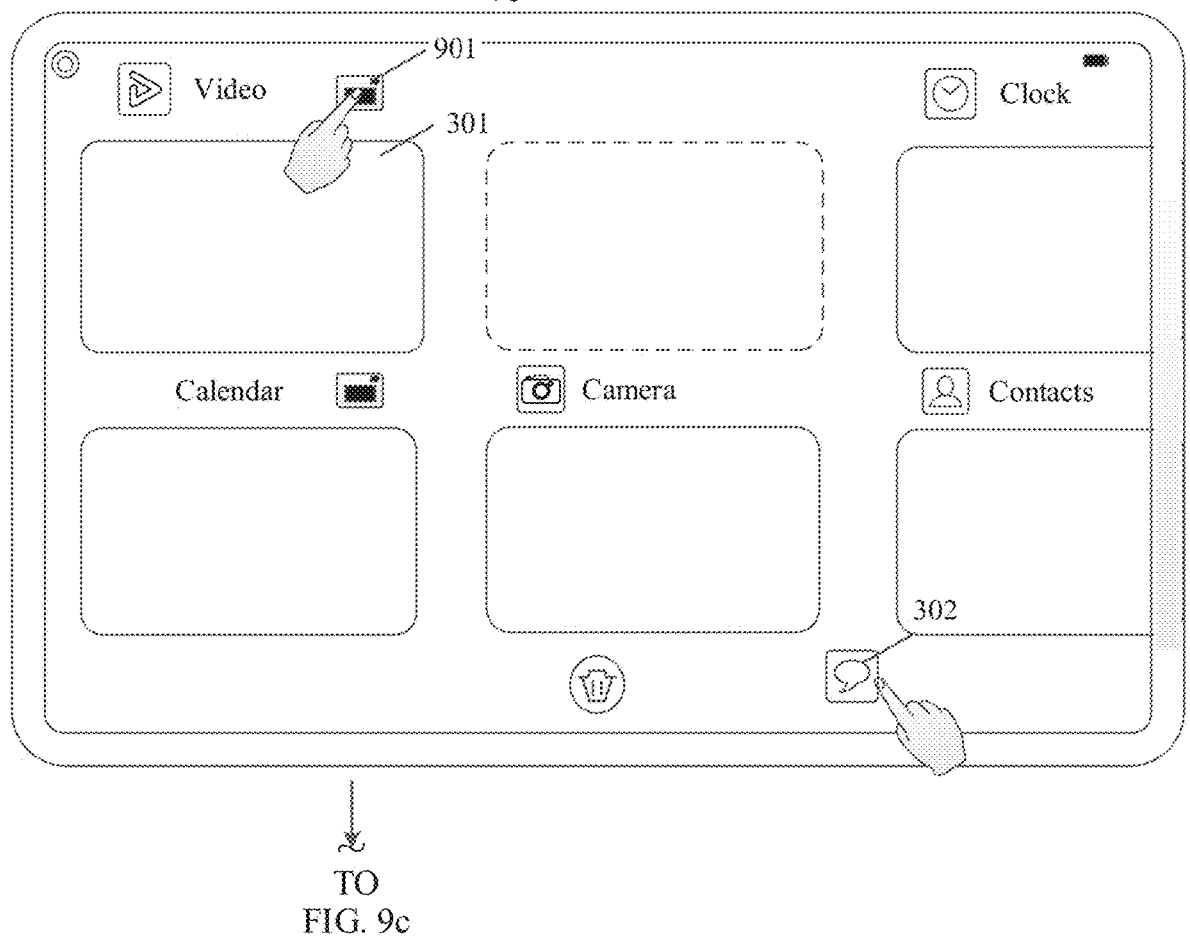
Figure 9C:
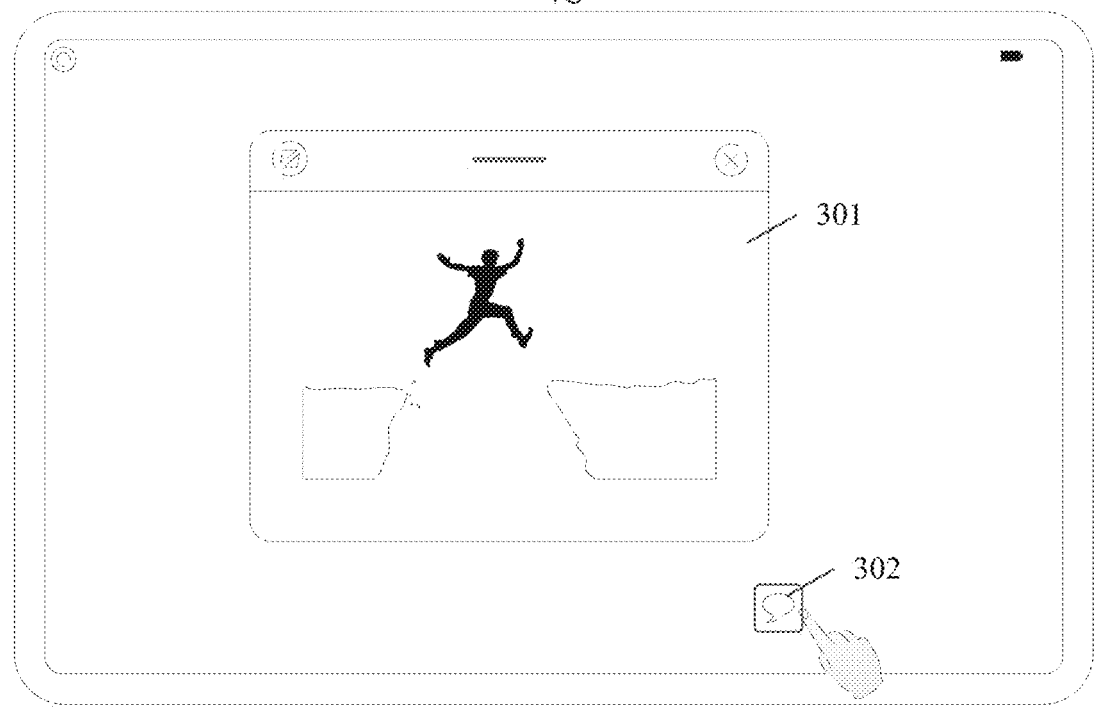

In an interface shown in FIG. 9b, when the tablet receives an operation that the user continues to touch and hold Messages 302 and the user triggers a floating window control 901 corresponding to Video 301, the tablet may display an interface shown in FIG. 9c. The interface may include a floating window corresponding to Video 301, and the interface may further include the icon corresponding to display 302.

Figure 9D:
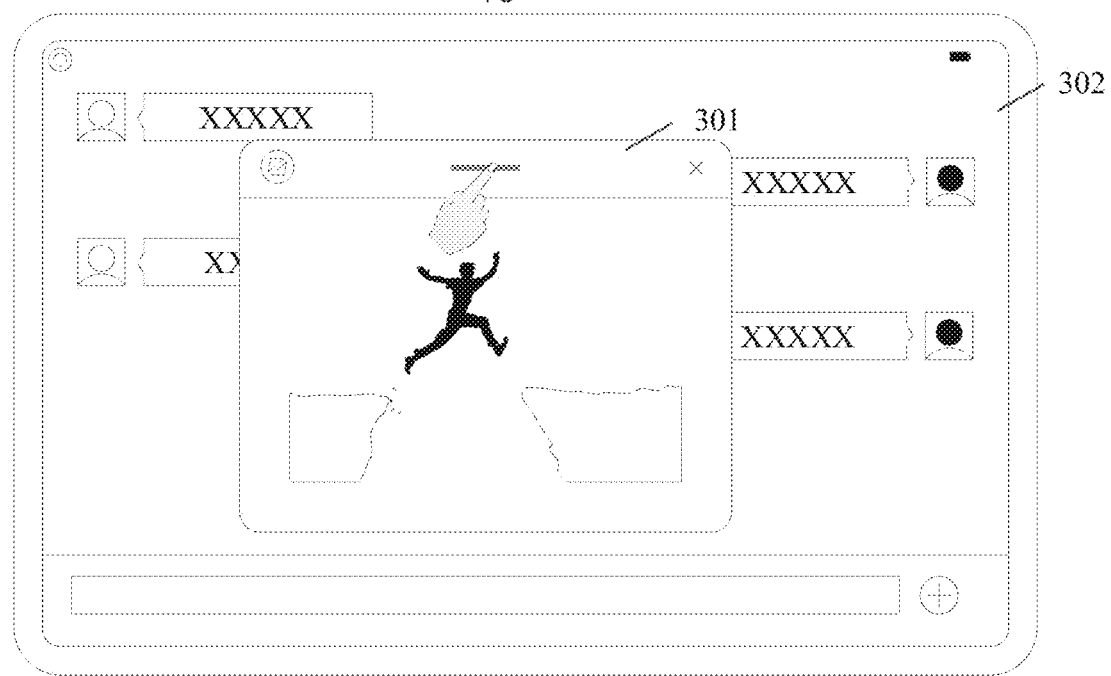

In the interface shown in FIG. 9c, when the tablet receives an operation that the user releases Messages 302, the tablet may display an interface shown in FIG. 9d. The interface may include a full-screen display interface corresponding to Messages 302 and the floating window corresponding to Video 301.

Figure 9E:
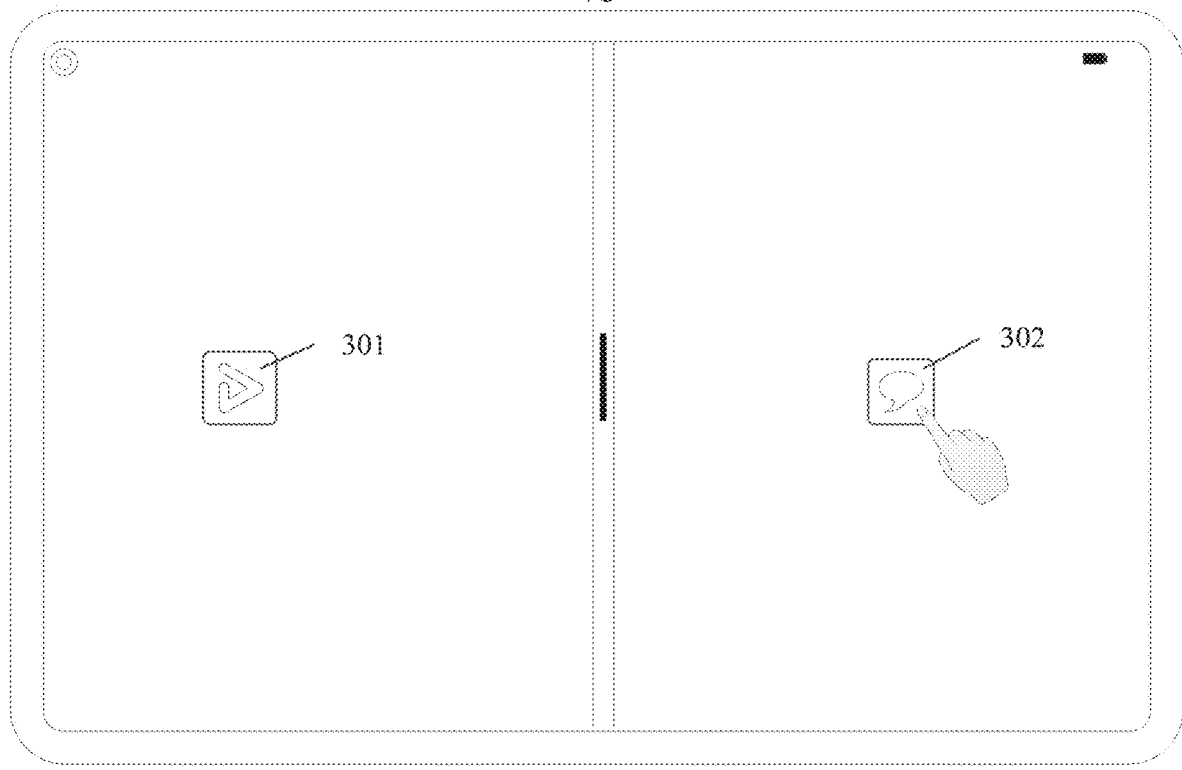
Figure 9F:
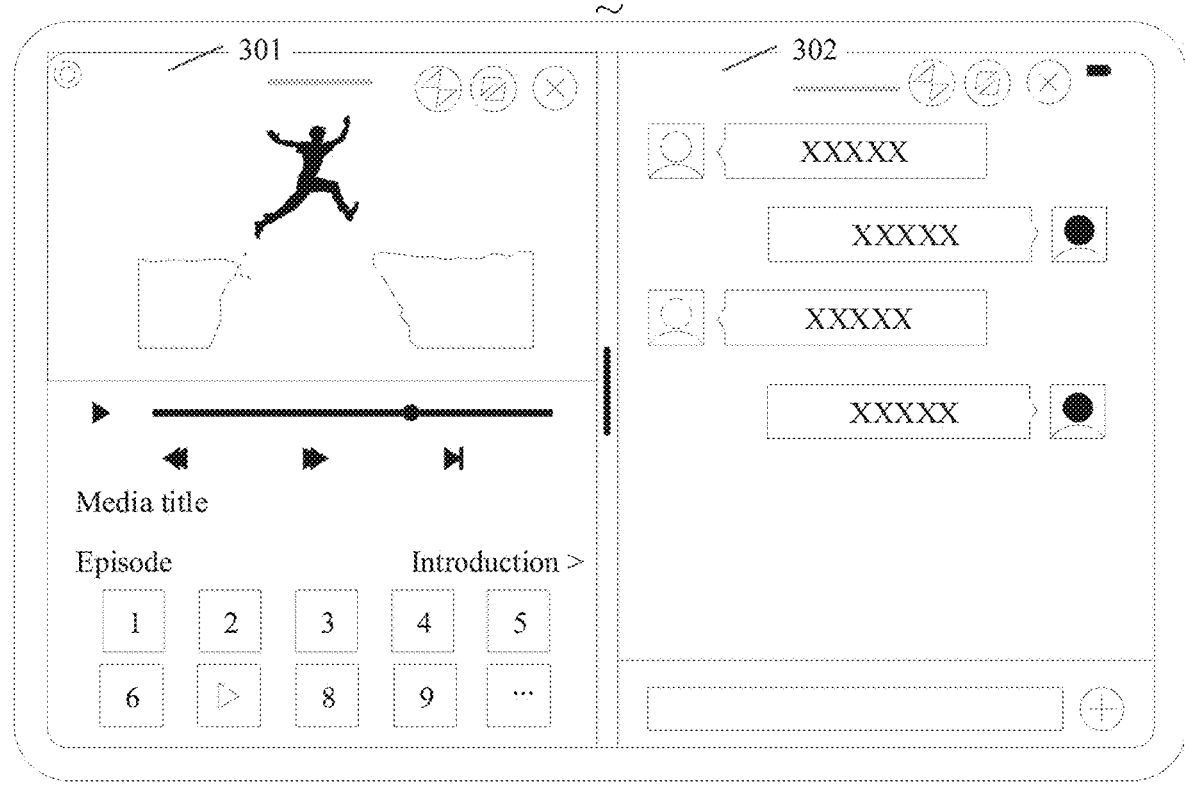

Further, in the interface shown in FIG. 9d, when the tablet receives an operation that the user drags the floating window corresponding to Video 301 to a split-screen region such as a left split-screen region on the tablet, the tablet may transitorily display an interface shown in FIG. 9e. In the interface, the icon corresponding to Video 301 and the icon corresponding to Messages 302 may be displayed in a left-right split-screen manner. Then, the tablet may jump to an interface shown in FIG. 9f. The interface shown in FIG. 9e is the same as the interface shown in FIG. 4b, and the interface shown in FIG. 9f is the same as the interface shown in FIG. 4c. Details are not described herein again.

Based on this, in a background multi-task scenario, the terminal device can implement quick screen splitting for applications when the user triggers thumbnails of the applications and floating windows of the applications a plurality of times by using two fingers, so that flexibility of screen splitting for applications is improved.

FIG. 3a and FIG. 3b to FIG. 9a to FIG. 9f each show a process of implementing split-screen display in a background multi-task scenario. The following describes a process of implementing split-screen display in a home screen scenario (for example, an embodiment corresponding to FIG. 10a to FIG. 10f).

For example, FIG. 10a to FIG. 10f are a schematic diagram of an interface of implementing split-screen display in a home screen scenario according to an embodiment of this application.

Figure 10A:
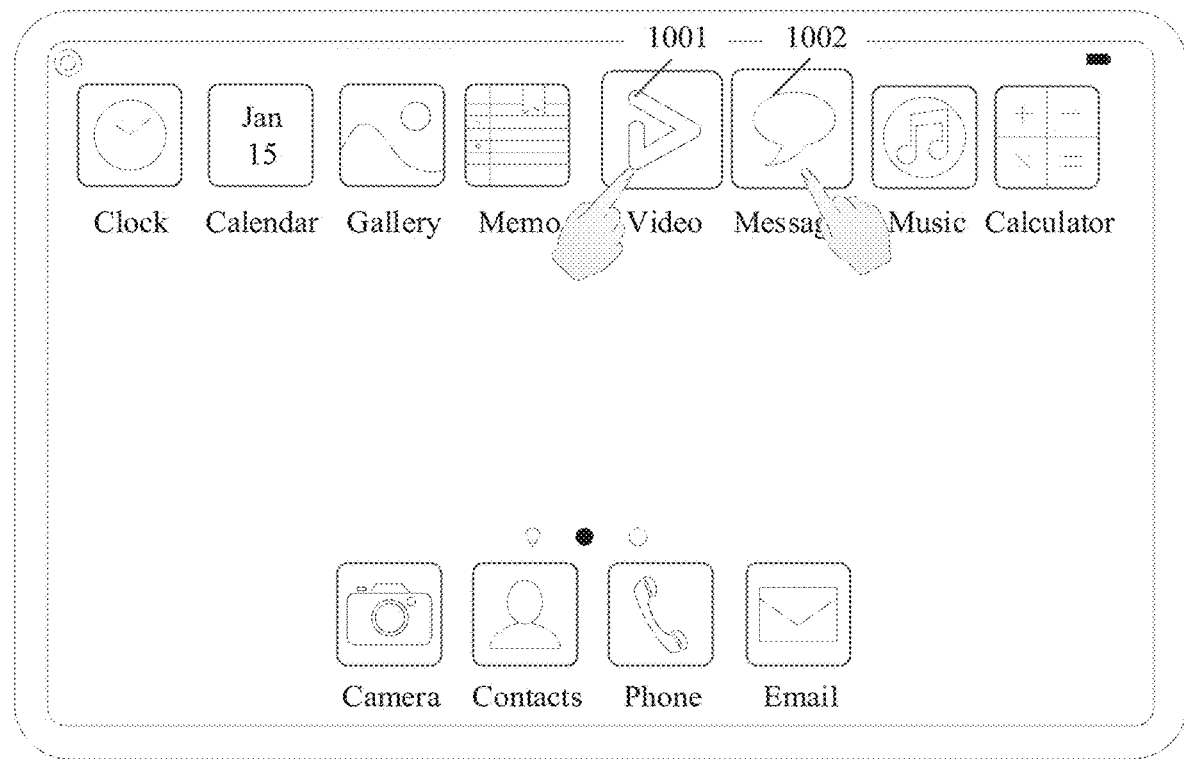
FIG. 10a to FIG. 10f are a schematic diagram of an interface of implementing split-screen display in a home screen scenario according to an embodiment of this application.

In an implementation, in an interface shown in FIG. 10a, when a tablet receives an operation that a user touches and holds Messages 1002, Messages 1002 may be in an active state. On the basis that Video 1001 is in the active state, when the tablet receives an operation that the user touches and holds Video 1001 and drags Video 1001 to the middle of the tablet (or taps Video 1001) when the user continues to touch and hold Messages 1002, the tablet may display an interface shown in FIG. 10b. The interface may display an interface corresponding to Video 1001 in full screen, and the interface may further include an icon corresponding to Messages 1002.

Figure 10B:
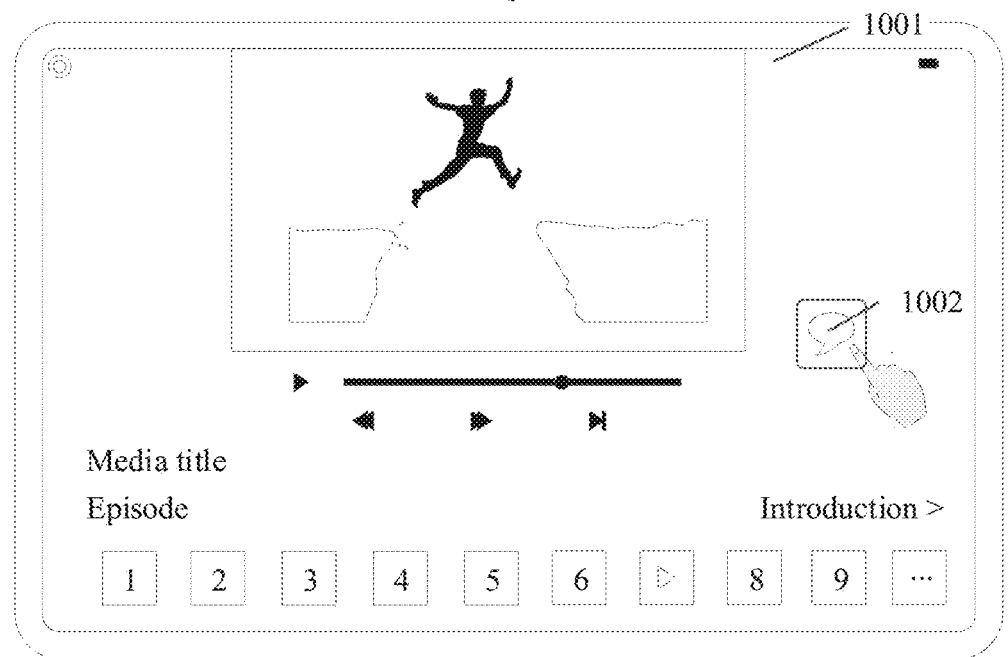
Figure 10C:
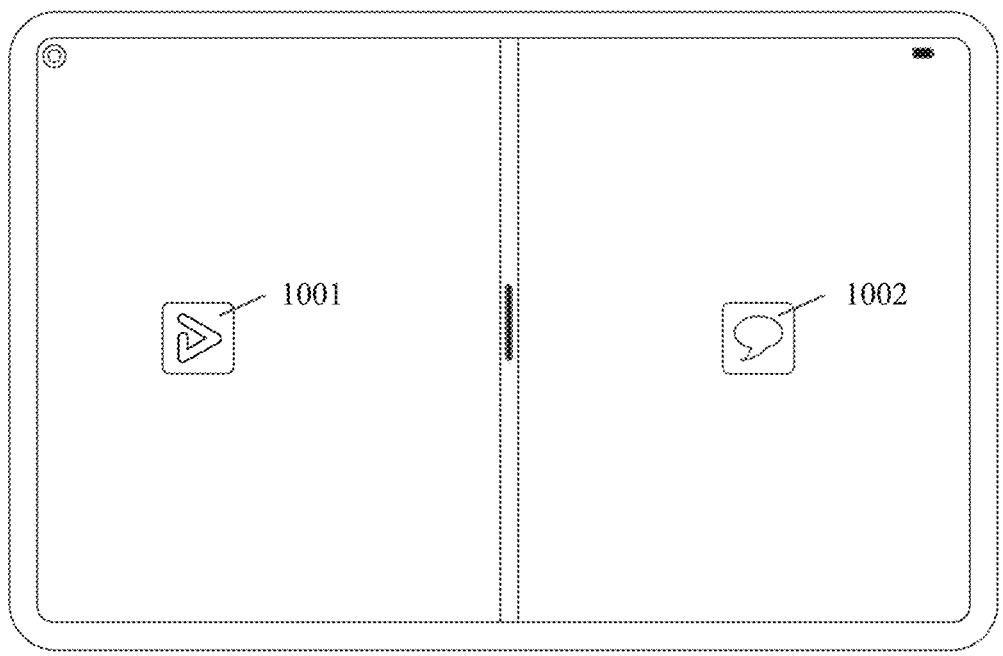
Figure 10D:
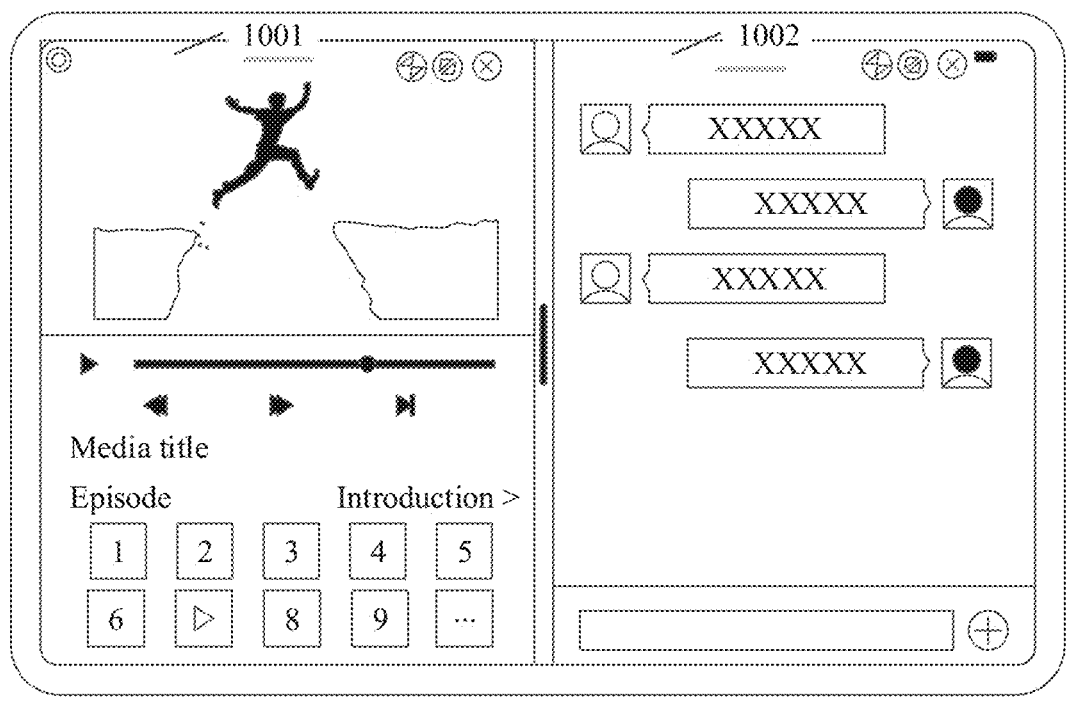

In the interface shown in FIG. 10b, when the tablet receives an operation that the user drags Messages 1002 to a split-screen region such as a right split-screen region on the tablet, the tablet may transitorily display an interface shown in FIG. 10c. In the interface, an icon corresponding to Video 1001 and the icon corresponding to Messages 1002 may be displayed in a left-right split-screen manner. Then, the tablet may jump to an interface shown in FIG. 10d. The interface shown in FIG. 10d includes a split-screen interface corresponding to Video 1001 and a split-screen interface corresponding to Messages 1002 that are displayed in a left-right split-screen manner. The interface shown in FIG. 10c is the same as the interface shown in FIG. 4b, and the interface shown in FIG. 10d is the same as the interface shown in FIG. 4c. Details are not described herein again.

In a possible implementation, in the interface shown in FIG. 10a, when the user touches and holds Messages 1002 to enable Messages 1002 to be in the active state, the user may alternatively implement split-screen display by further triggering an application in a split-screen task bar, or the user may implement split-screen display by triggering an application in a background multi-task interface. A specific operation process is not described herein.

In another implementation, in an interface shown in FIG. 10a, when a tablet receives an operation that a user touches and holds Video 1001 and Messages 1002, both Video 1001 and Messages 1002 may be in an active state of waiting for screen splitting. The user may simultaneously trigger Video 1001 and Messages 1002, to enable Video 1001 and Messages 1002 to be in the active state. Alternatively, the user may trigger Messages 1002 (or Video 1001) within a first time threshold after triggering Video 1001 (or Messages 1002), to enable Video 1001 and Messages 1002 to be in the active state.

Figure 10E:
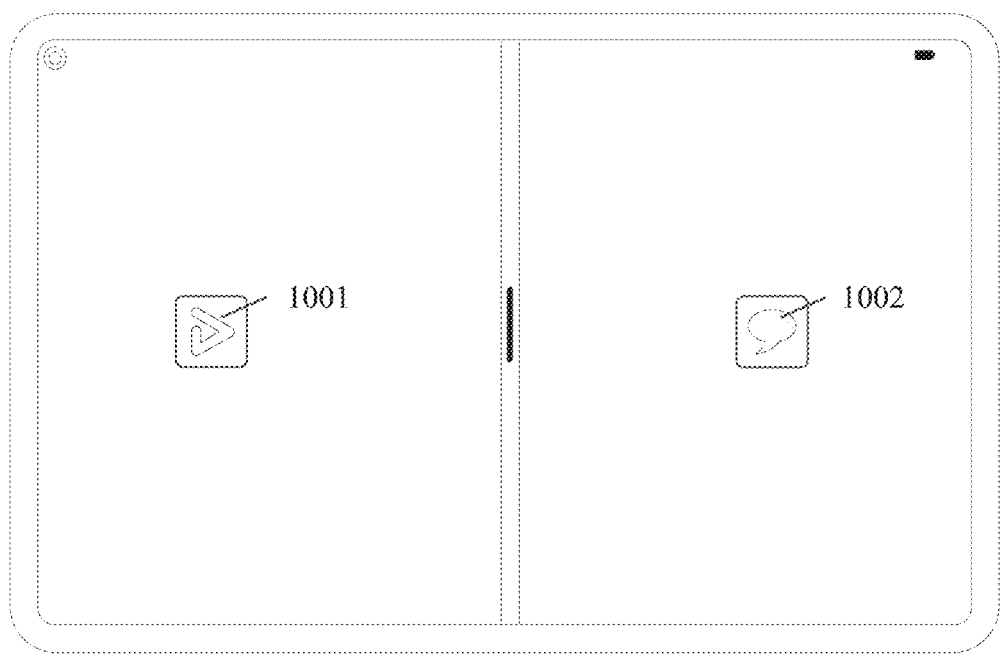
Figure 10F:
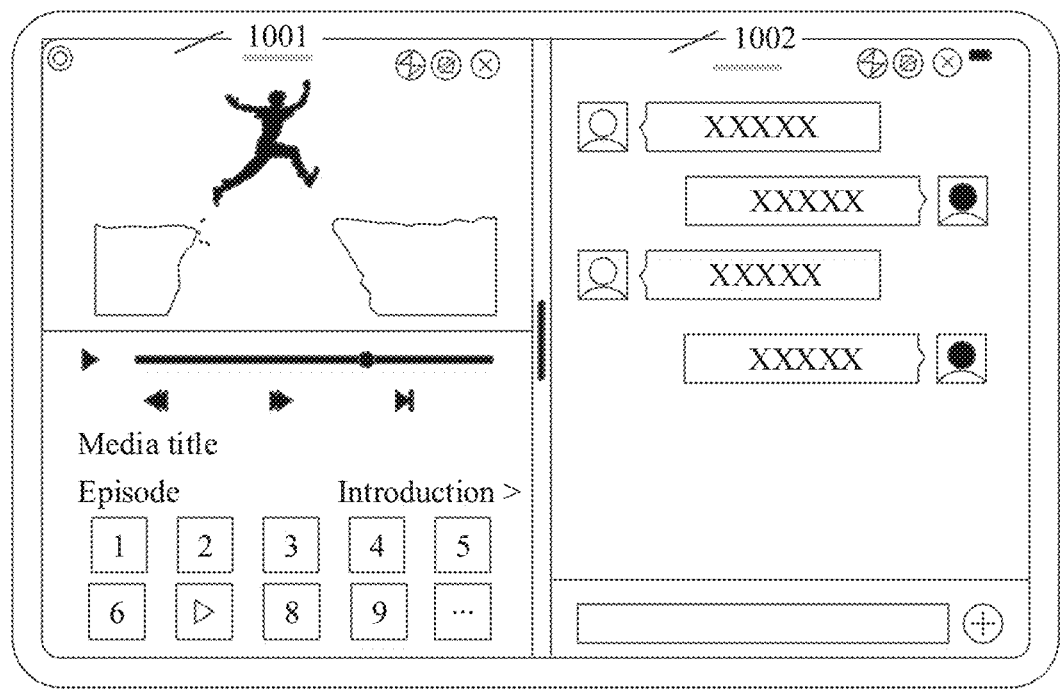

Further, in the interface shown in FIG. 10a, when the tablet receives an operation that the user releases Video 1001 and Messages 1002, the tablet may transitorily display an interface shown in FIG. 10e. In the interface, an icon corresponding to Video 1001 and an icon corresponding to Messages 1002 may be displayed in a left-right split-screen manner. Then, the tablet may jump to an interface shown in FIG. 10f. The interface shown in FIG. 10f includes a split-screen interface corresponding to Video 1001 and a split-screen interface corresponding to Messages 1002 that are displayed in a left-right split-screen manner. The interface shown in FIG. 10e is the same as the interface shown in FIG. 4b, and the interface shown in FIG. 10f is the same as the interface shown in FIG. 4c. Details are not described herein again.

In a possible implementation, in the interface shown in FIG. 10a, in a case in which Video 1001 and Messages 1002 are in the active state, when the tablet receives an operation that the user continues to touch and hold Video 1001 and drags Video 1001 to a left split-screen region on the tablet, and the user continues to touch and hold Messages 1002 and drags Messages 1002 to a right split-screen region on the tablet, the tablet may also transitorily display the interface shown in FIG. 10e. In the interface, the icon corresponding to Video 1001 and the icon corresponding to Messages 1002 may be displayed in a left-right split-screen manner. Then, the tablet may jump to the interface shown in FIG. 10f.

In a possible implementation, in the interface shown in FIG. 10a, in a case in which Video 1001 and Messages 1002 are in the active state, when the tablet receives an operation that the user continues to touch and hold Video 1001 and slides Video 1001 leftward, and the user continues to touch and hold Messages 1002 and slides Messages 1002 rightward, the tablet may also transitorily display the interface shown in FIG. 10e. In the interface, the icon corresponding to Video 1001 and the icon corresponding to Messages 1002 may be displayed in a left-right split-screen manner. Then, the tablet may jump to the interface shown in FIG. 10f.

Based on this, in a home screen state, the terminal device can implement quick screen splitting for a plurality of applications based on triggering, for example, simultaneous triggering or successive triggering, performed by the user for the applications.

On the basis of implementing split-screen display in the embodiments corresponding to FIG. 6a to FIG. 6f to FIG. 9a to FIG. 9f, in a possible implementation, as shown in FIG. 11a to FIG. 11d and FIG. 12a to FIG. 12e, when the terminal device has implemented split-screen display of a plurality of applications (for example, split-screen display is implemented for an application A and an application B), the terminal device may form split-screen display different from that of the application A and the application B based on an end location of dragging an application C by the user. For example, when the user drags the application C to a split-screen region in which the application A is located, the tablet may replace the application A in a split-screen state with the application C. When the user drags the application C to a split-screen region in which the application B is located, the tablet may replace the application B in a split-screen state with the application C. When the user drags the application C to a corresponding region for triggering a floating window, the tablet may display a floating window of the application C, and the floating window of the application C covers the application A and the application B in a split-screen state. Alternatively, when the user drags the application C to a corresponding region for triggering cancellation of screen splitting, the tablet may cancel split-screen display of the application C. In the embodiments corresponding to FIG. 11a to FIG. 11d and FIG. 12a to FIG. 12e, an example in which a terminal device is a tablet is used for description. This example does not constitute a limitation on embodiments of this application.

For example, FIG. 11a to FIG. 11d are a schematic diagram of an interface of opening a split-screen application in a background multi-task scenario according to an embodiment of this application.

Figure 11A:
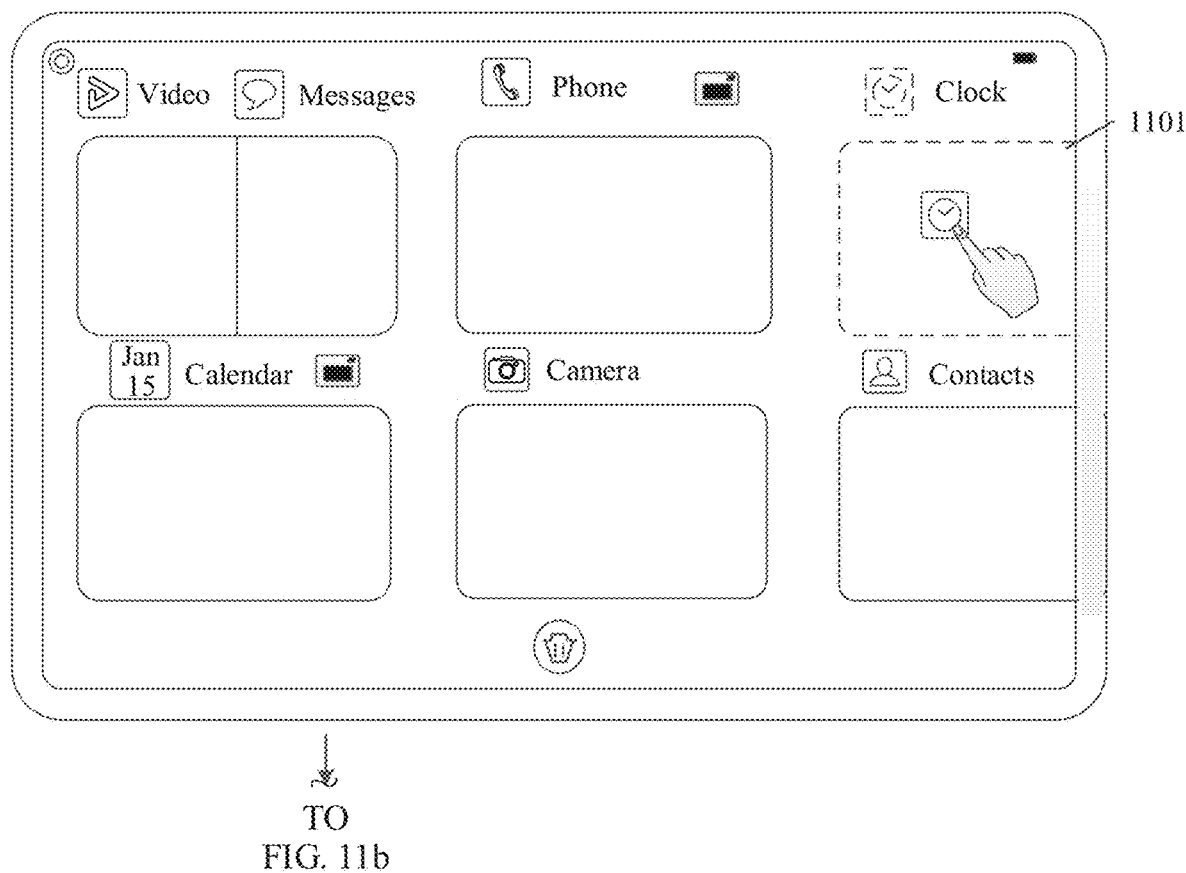
FIG. 11a to FIG. 11d are a schematic diagram of an interface of opening a split-screen application in a background multi-task scenario according to an embodiment of this application.

When the tablet receives a corresponding operation that the user opens a background multi-task interface, the tablet may display an interface shown in FIG. 11a. The interface may include at least one or more of the following: for example, Phone, Clock, Calendar, Camera, Contacts, or Video and Messages displayed in a split-screen state. The interface further includes an application cleanup control.

In the interface shown in FIG. 11a, when the tablet receives an operation that the user touches and holds a thumbnail corresponding to Clock 1101 (or an icon corresponding to Clock 1101), Clock 1101 may be in an active state.

Figure 11B:
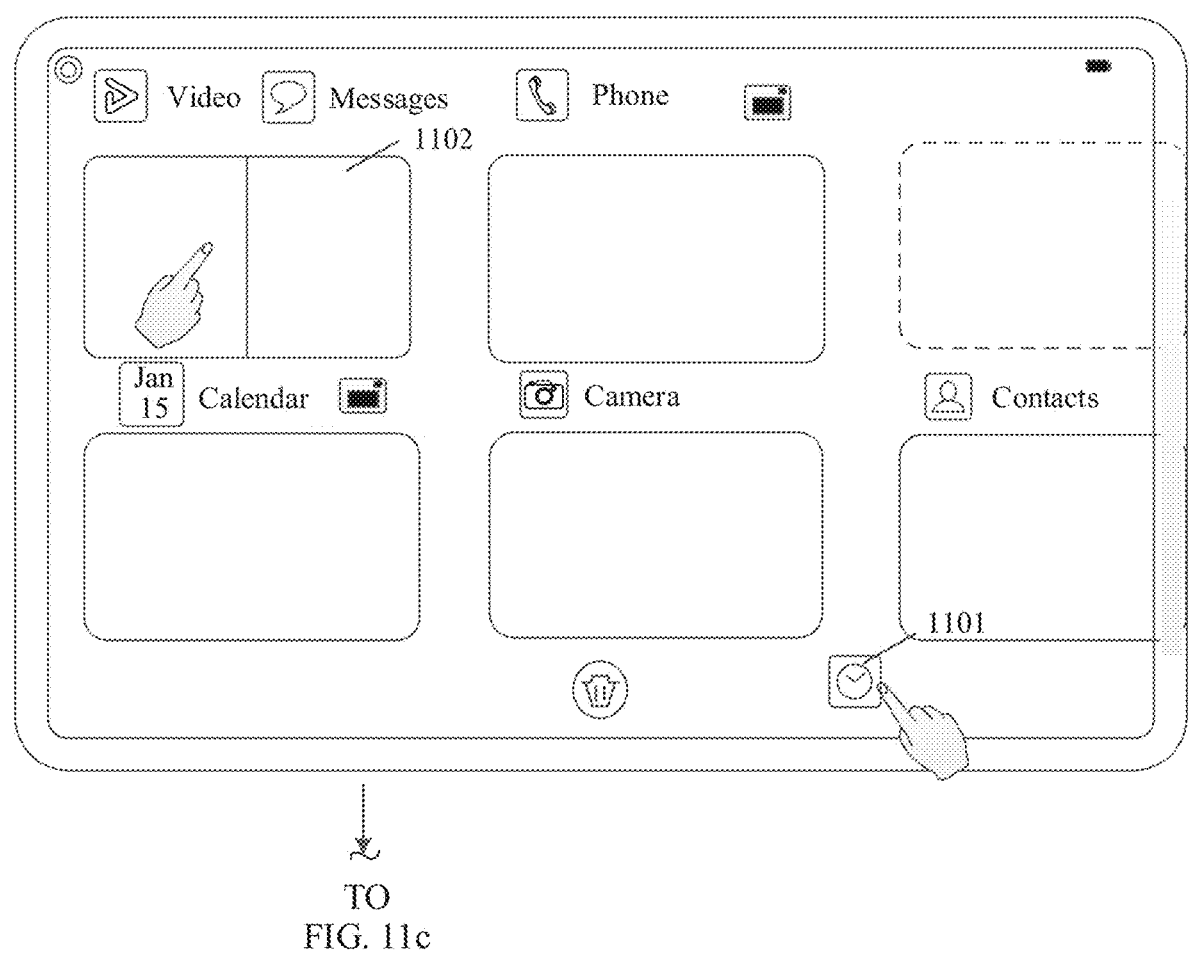
Figure 11C:
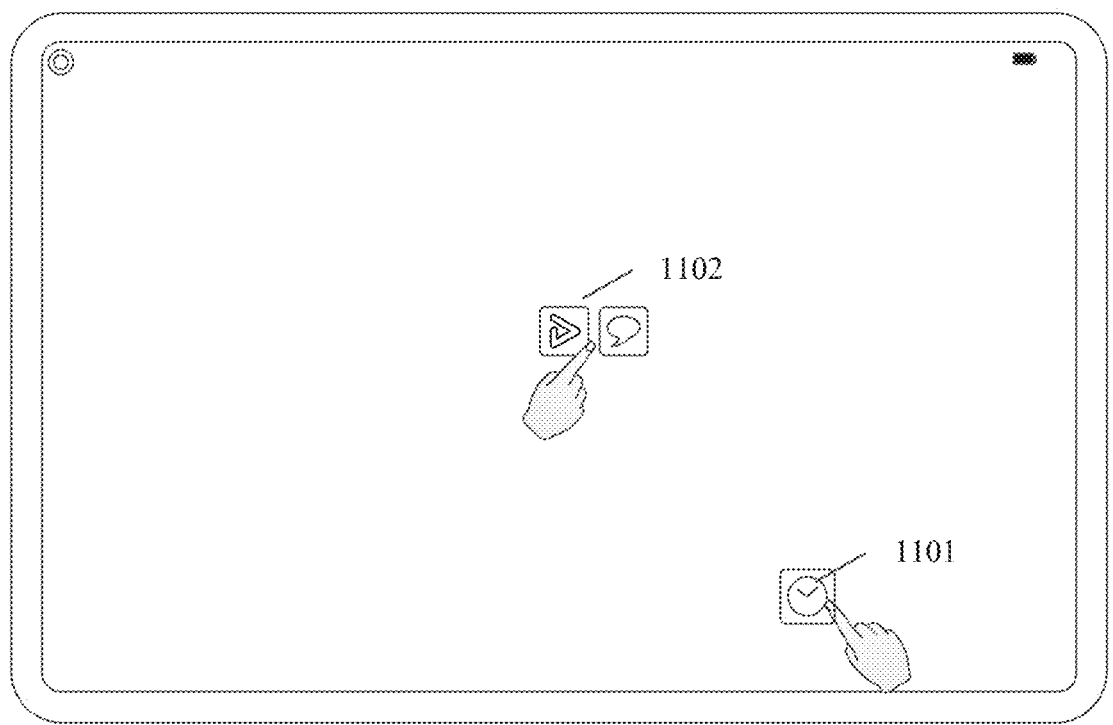
Figure 11D:
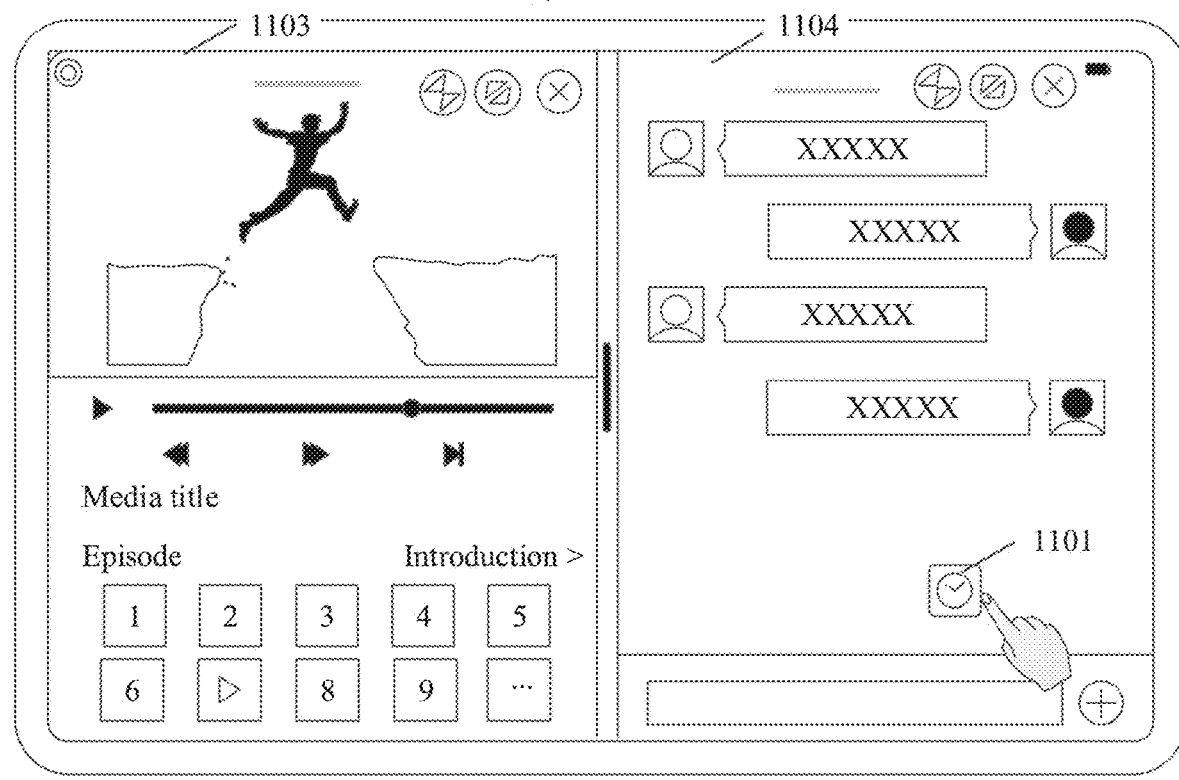

In an interface shown in FIG. 11b, when the tablet receives an operation that the user touches and holds split-screen thumbnails corresponding to Video and Messages 1102 displayed in the split-screen state (or icons corresponding to Video and WeChat) and drags Video and WeChat 1102 displayed in the split-screen state to the middle of the tablet (or taps Video and WeChat 1102 displayed in the split-screen state) when the user continues to touch and hold Clock 1101, the tablet may transitorily display an interface shown in FIG. 11c. In the interface, the icons corresponding to Video and WeChat and the icon corresponding to Clock 1101 may be displayed in a left-right split-screen manner. Then, the tablet may jump to an interface shown in FIG. 11d. In the interface, a split-screen interface corresponding to Video 1103 and a split-screen interface corresponding to Messages 1104 may be displayed in a left-right split-screen manner. The interface may further include the icon corresponding to Clock 1101.

For example, FIG. 12a to FIG. 12e are a schematic diagram of an interface of split-screen display for three applications according to an embodiment of this application.

Figure 12A:
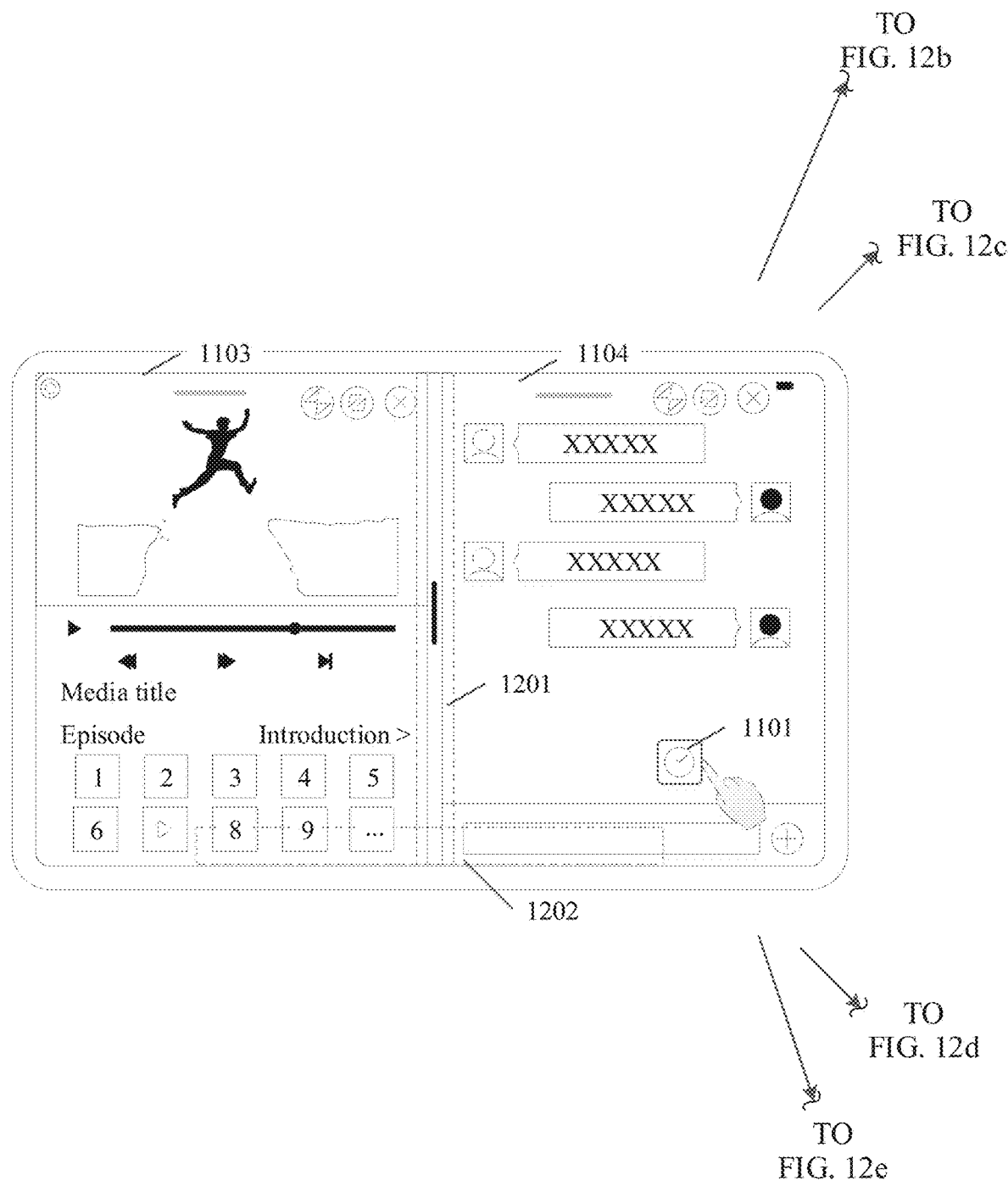
FIG. 12a to FIG. 12e are a schematic diagram of an interface of split-screen display for three applications according to an embodiment of this application.
Figure 12B:
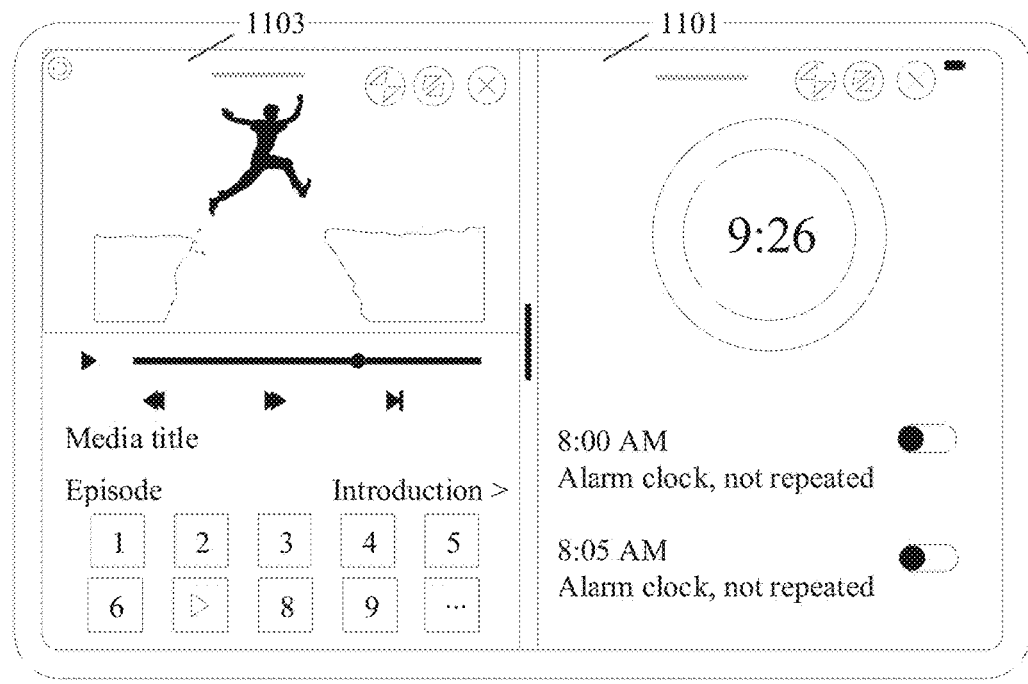

In an implementation, in an interface shown in FIG. 12a, when the tablet receives an operation that the user touches and holds Clock 1101 and drags Clock 1101 to a split-screen region such as a right split-screen region corresponding to Messages 1104 on the tablet, the tablet may display an interface shown in FIG. 12b. The interface may include a split-screen region corresponding to Video 1103 and a split-screen region corresponding to Clock 1101 that are displayed in a left-right split-screen manner.

It may be understood that, in the interface shown in FIG. 12a, when the user drags Clock 1101 to the split-screen region corresponding to Messages 1104, the split-screen interface corresponding to Messages 1104 may be replaced with Clock 1101.

Figure 12C:
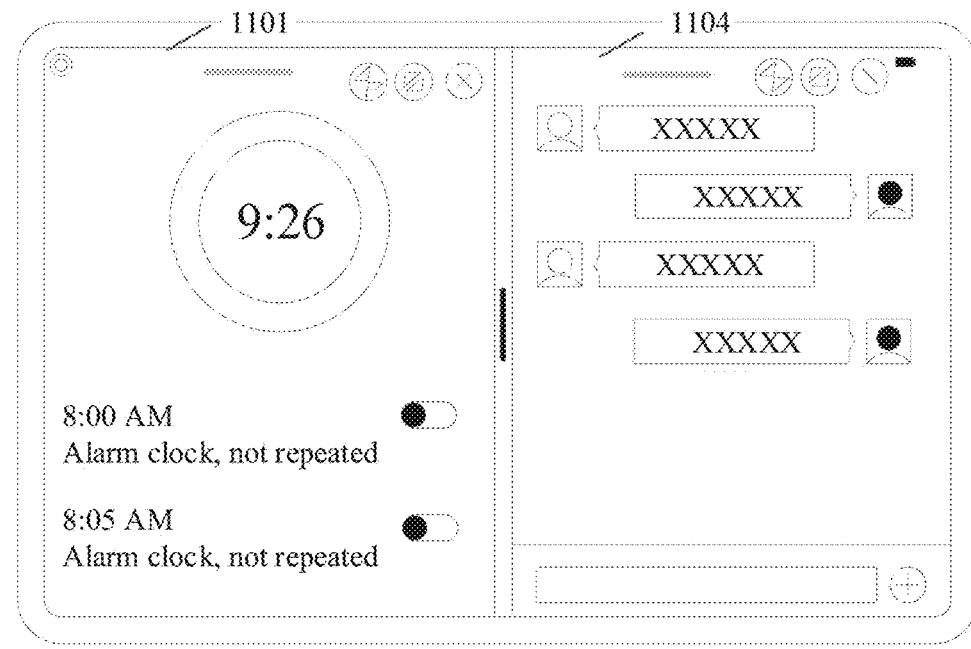

In another implementation, in an interface shown in FIG. 12a, when the tablet receives an operation that the user touches and holds Clock 1101 and drags Clock 1101 to a split-screen region such as a left split-screen region corresponding to Video 1103 on the tablet, the tablet may display an interface shown in FIG. 12c. The interface may include a split-screen region corresponding to Clock 1101 and a split-screen region corresponding to Messages 1104 that are displayed in a left-right split-screen manner.

It may be understood that, in the interface shown in FIG. 12a, when the user drags Clock 1101 to the split-screen region corresponding to Video 1103, the split-screen interface corresponding to Video 1103 may be replaced with Clock 1101.

Figure 12D:
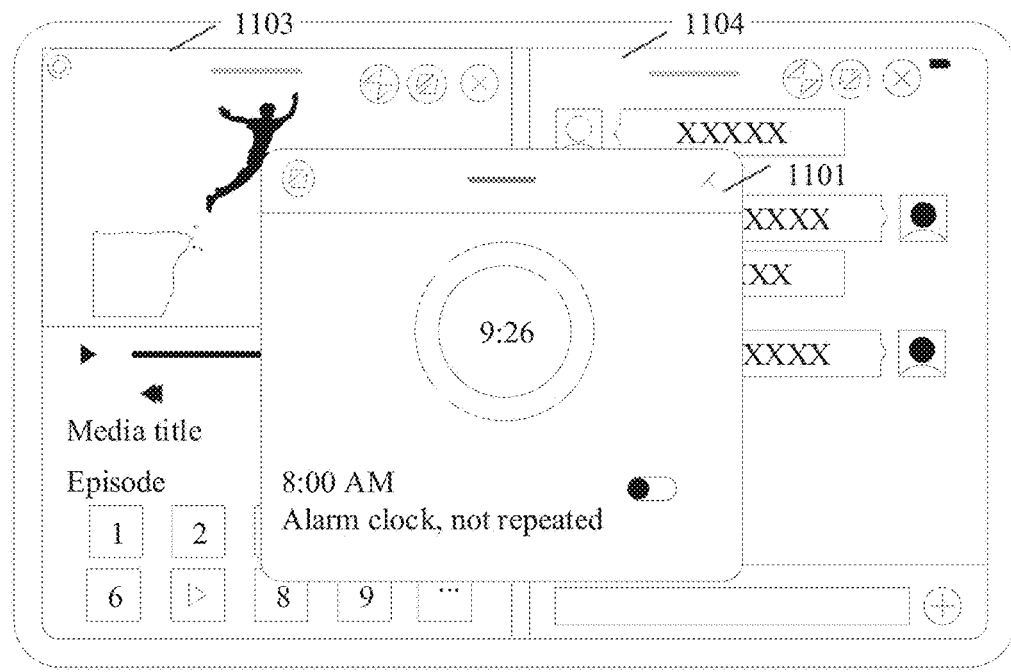

In still another implementation, in an interface shown in FIG. 12a, when the tablet receives an operation that the user touches and holds Clock 1101 and drags Clock 1101 to the middle of the tablet, for example, a dashed-line region 1201 in the middle of the tablet, the tablet may display an interface shown in FIG. 12d. The interface may include a split-screen region corresponding to Video 1103 and a split-screen region corresponding to Messages 1104 that are displayed in a left-right split-screen manner, and the interface may further display a floating window corresponding to Clock 1101.

It may be understood that, in the interface shown in FIG. 12a, when the user drags Clock 1101 to the dashed-line region 1201 used to trigger floating-window display, the tablet may display the floating window corresponding to Clock 1101. In this embodiment of this application, no limitation is imposed on a region, a quantity, or a size of the dashed-line region used to trigger floating-window display.

In a possible implementation, in the interface shown in FIG. 12a, when the tablet receives the operation that the user touches and holds Clock 1101 and drags Clock 1101 to the dashed-line region 1201, the tablet may transitorily display a floating window in a gray or transparent state that corresponds to Clock 1101. Then, when the tablet receives an operation that the user releases Clock 1101, the tablet may display the interface shown in FIG. 12*d*.

Figure 12E:
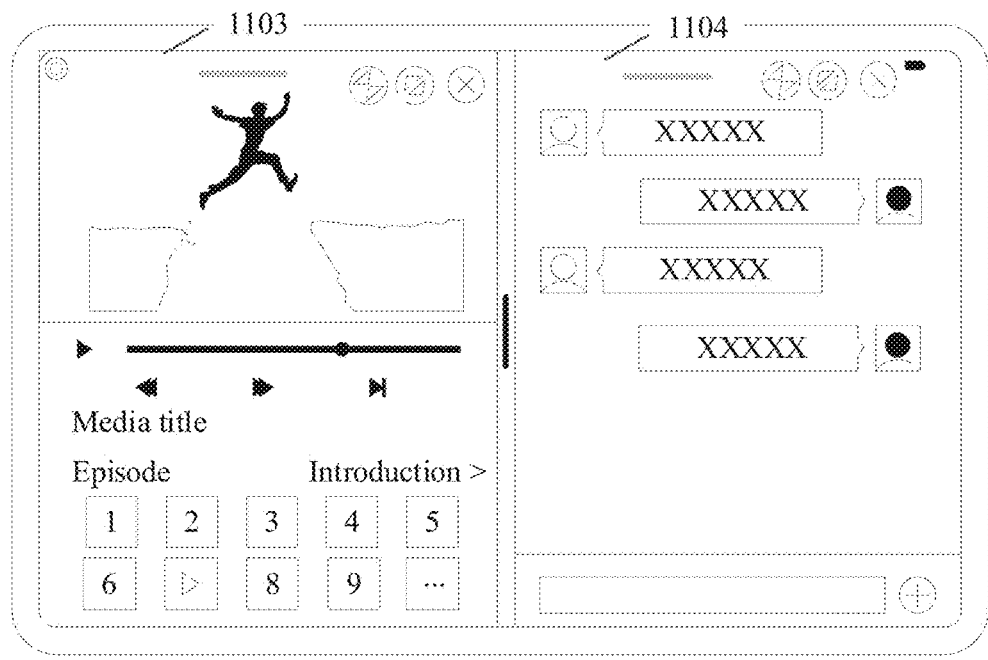

In yet another implementation, in an interface shown in FIG. 12*a*, when the tablet receives an operation that the user touches and holds Clock 1101 and drags Clock 1101 to the bottom edge of the tablet, for example, a dashed-line region 1202 on the tablet, the tablet may display an interface shown in FIG. 12*e*. The interface may include a split-screen region corresponding to Video 1103 and a split-screen region corresponding to Messages 1104 that are displayed in a left-right split-screen manner.

It may be understood that, in the interface shown in FIG. 12*a*, when the user drags Clock 1101 to the dashed-line region 1202 used to cancel split-screen display of an application, the tablet may cancel split-screen display of Clock 1101. In this embodiment of this application, no limitation is imposed on a region, a quantity, or a size of the dashed-line region used to cancel split-screen display of an application.

In a possible implementation, in the interface shown in FIG. 12*a*, when the tablet receives the operation that the user touches and holds Clock 1101 and drags Clock 1101 to the dashed-line region 1202, the interface on the tablet may be in a gray (or darkened) state or the like, or a character (or an icon) of canceling screen splitting is displayed in the dashed-line region 1202. Then, when the tablet receives an operation that the user releases Clock 1101, the tablet may display the interface shown in FIG. 12*e*.

Based on this, when split-screen display has been implemented for the application A and the application B, based on a trigger of the user for the application C, the terminal device may replace any application in the split-screen display interface with the application C, or open a floating window of the application C, or cancel split-screen display of the application C. This provides diversified split-screen display methods.

In summary, in the split-screen display method in the embodiments corresponding to FIG. 11*a* to FIG. 11*d* and FIG. 12*a* to FIG. 12*e*, it may be understood that, on the basis that the user triggers split-screen display of two applications in another scenario such as a home screen scenario, a corresponding split-screen display interface may also be displayed by triggering a third application in the foregoing split-screen display method.

On the basis of implementing split-screen display in the embodiments corresponding to FIG. 6*a* to FIG. 6*f* to FIG. 9*a* to FIG. 9*f* (or FIG. 10*a* to FIG. 10*0*, in a possible implementation, as shown in FIG. 13*a* to FIG. 13*e*, when the application A is in a full-screen displayed state, the terminal device may form different split-screen states based on an end location of dragging the application B by the user. For example, the application B and the application A may form split-screen at different locations, for example, the application B is located on a left side of the application A or the application B is located on a right side of the application A; or the application B forms a floating window that covers the application A; or split-screen of the application B is cancelled.

For example, FIG. 13*a* to FIG. 13*e* are a schematic diagram of an interface of forming different split-screen states based on an end location of dragging an application by a user according to an embodiment of this application. In the embodiment corresponding to FIG. 13*a* to FIG. 13*e*, an example in which a terminal device is a tablet is used for description. This example does not constitute a limitation on embodiments of this application.

Figure 13A:
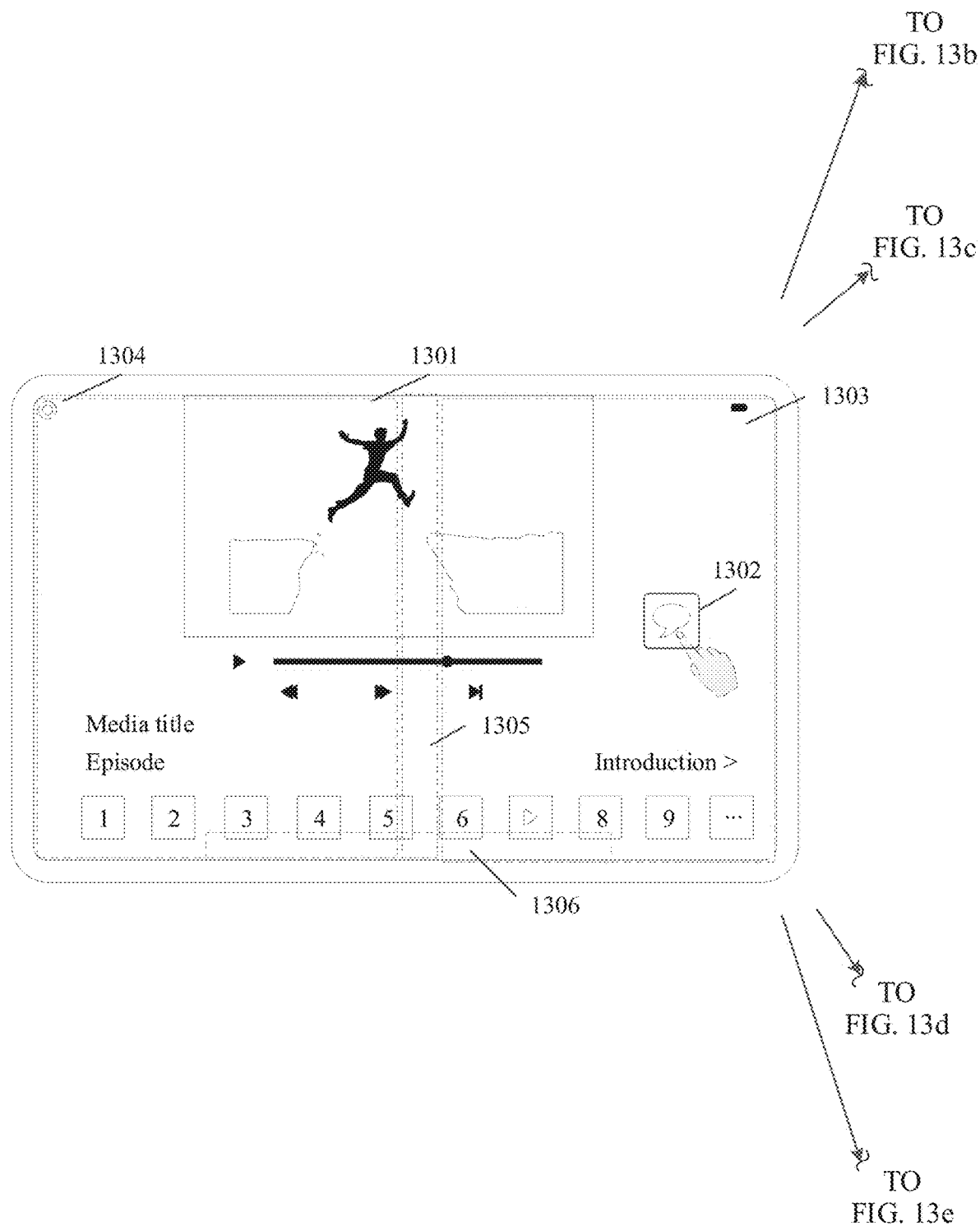
FIG. 13a to FIG. 13e are a schematic diagram of an interface of forming different split-screen states based on an end location of dragging an application by a user according to an embodiment of this application.

When the tablet receives an operation that a user touches and holds Messages 1302 and triggers full-screen display of Video 1301, the tablet may display an interface shown in FIG. 13*a*. The interface may include an interface corresponding to Video 1301 displayed in full screen and an icon corresponding to Messages 1302.

Figure 13B:
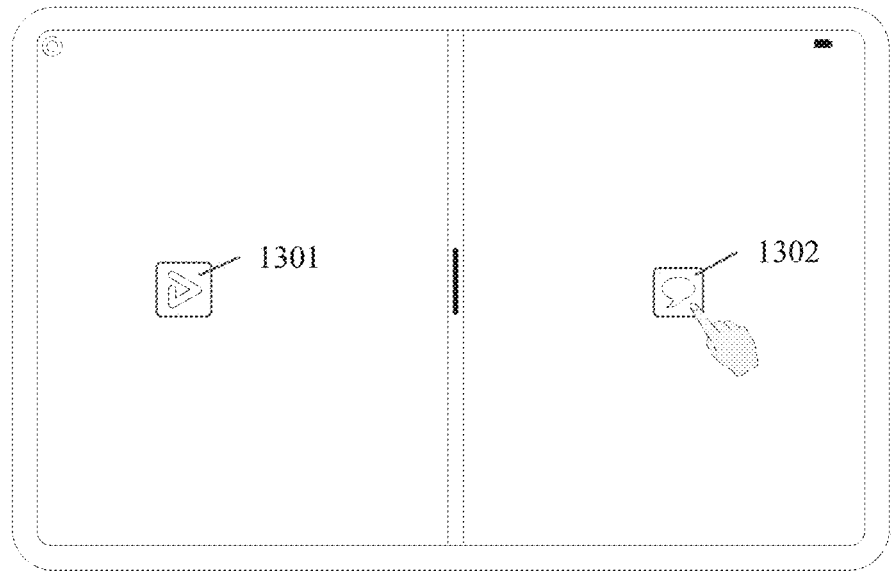

In an implementation, in the interface shown in FIG. 13*a*, when the tablet receives an operation that the user touches and holds Messages 1302 and drags Messages 1302 to a split-screen region such as a right dashed-line region 1303 on the tablet, the tablet may display an interface shown in FIG. 13*b*. The interface may include a split-screen region corresponding to Video 1301 and a split-screen region corresponding to Messages 1302 that are displayed in a left-right split-screen manner.

It may be understood that, in the interface shown in FIG. 13*a*, when the user drags Messages 1302 to the dashed-line region 1303, Messages 1302 may occupy a location of the dashed-line region 1303, and Video 1301 may be displayed at a location of a dashed-line region 1304.

Figure 13C:
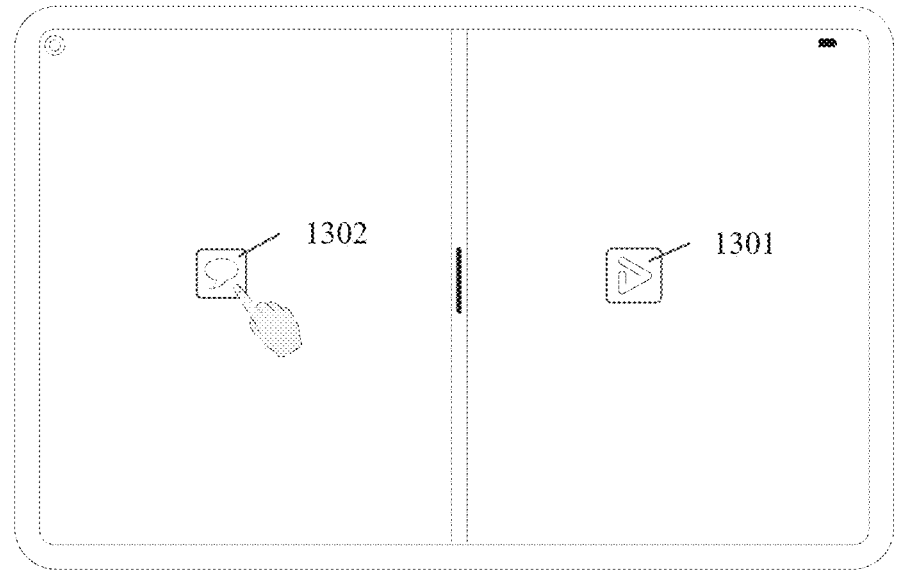

In another implementation, in the interface shown in FIG. 13*a*, when the tablet receives an operation that the user touches and holds Messages 1302 and drags Messages 1302 to a split-screen region such as a left dashed-line region 1304 on the tablet, the tablet may display an interface shown in FIG. 13*c*. The interface may include a split-screen region corresponding to Messages 1302 and a split-screen region corresponding to Video 1301 that are displayed in a left-right split-screen manner.

It may be understood that, in the interface shown in FIG. 13*a*, when the user drags Messages 1302 to the dashed-line region 1304, Messages 1302 may occupy a location of the dashed-line region 1304, and Video 1301 may be displayed at a location of a dashed-line region 1303.

Figure 13D:
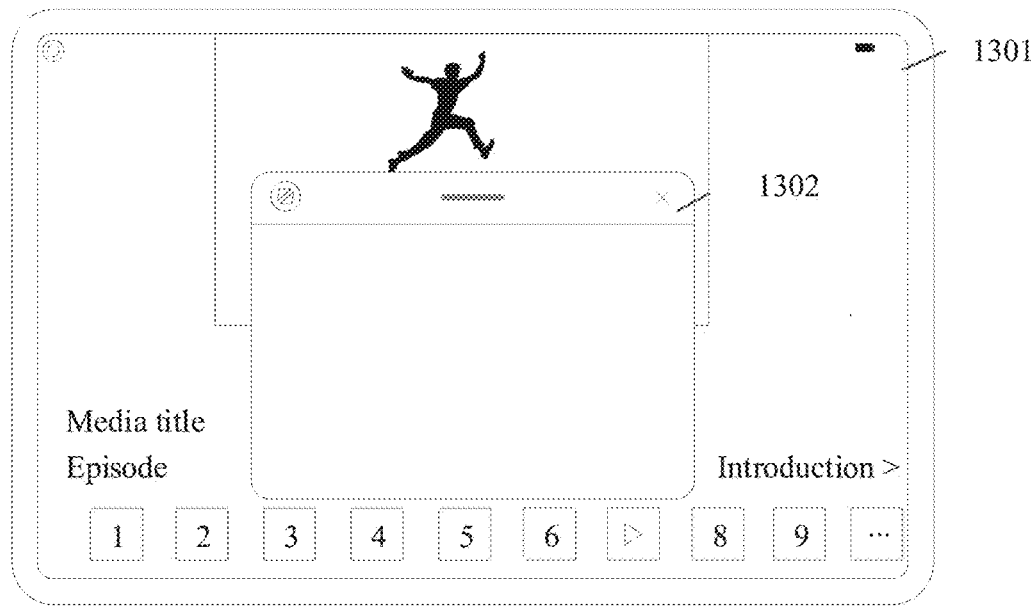

In still another implementation, in the interface shown in FIG. 13*a*, when the tablet receives an operation that the user touches and holds Messages 1302 and drags Messages 1302 to the middle of the tablet, for example, a dashed-line region 1305 in the middle of the tablet, the tablet may display an interface shown in FIG. 13*d*. The interface may include an interface corresponding to Video 1301 displayed in full screen and a floating window corresponding to Messages 1302.

Figure 13E:
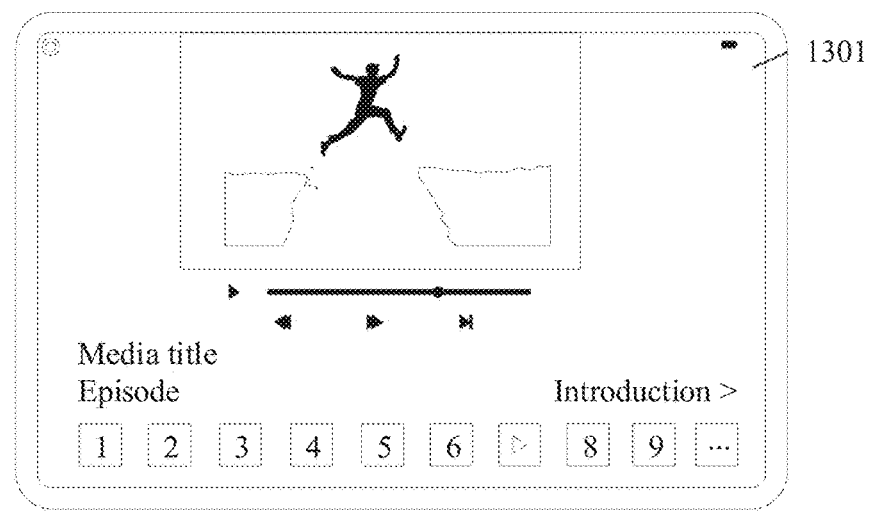

In yet another implementation, in the interface shown in FIG. 13*a*, when the tablet receives an operation that the user touches and holds Messages 1302 and drags Messages 1302 to the bottom edge of the tablet, for example, a dashed-line region 1306 on the tablet, the tablet may display an interface shown in FIG. 13*e*. The interface may include an interface corresponding to Video 1301 displayed in full screen.

It may be understood that, in the interface shown in FIG. 13*a*, when the user drags Messages 1302 to the dashed-line region 1306 used to cancel split-screen display of an application operated by the user, the tablet may cancel split-screen display of Messages 1302.

Based on this, when the application A is displayed in full screen, based on a trigger of the user for the application B, the terminal device may display the application B in a split-screen region on one side of the tablet in a split-screen manner, or open a floating window of the application B, or cancel split-screen display of the application B. This provides diversified split-screen display methods.

Figure 14A:
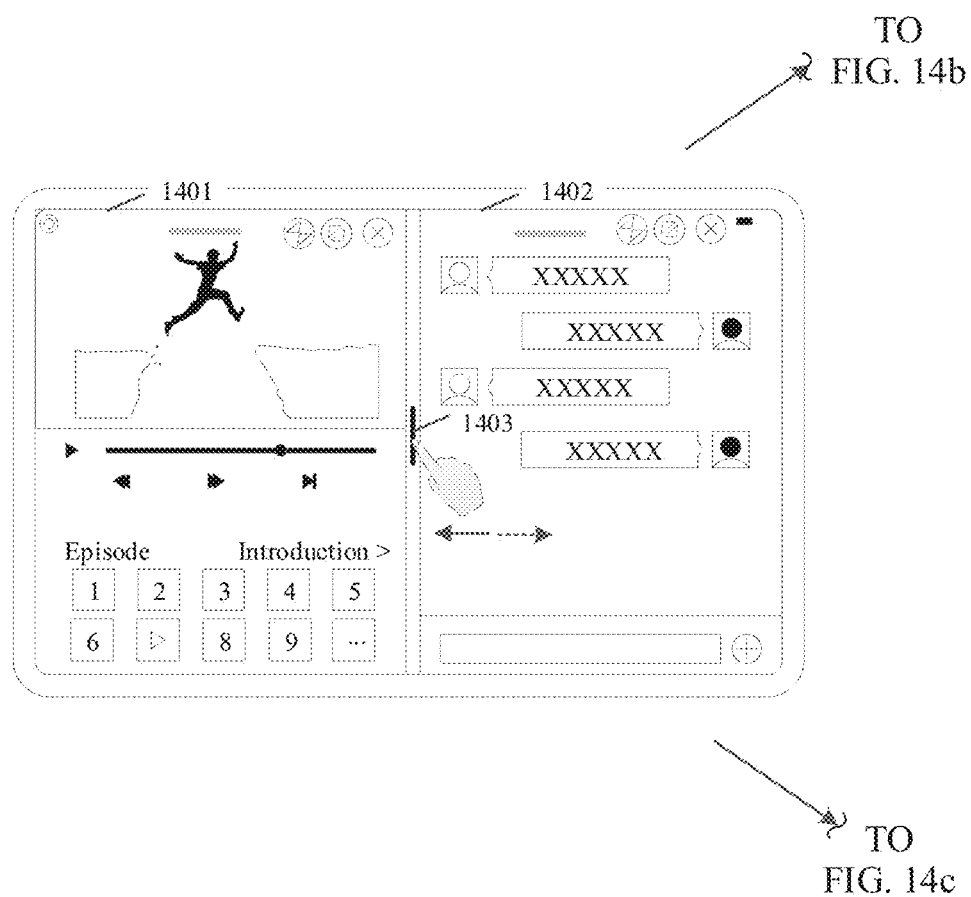
FIG. 14a to FIG. 14c are a schematic diagram of an interface of changing a split-screen interface size according to an embodiment of this application.
Figure 14B:
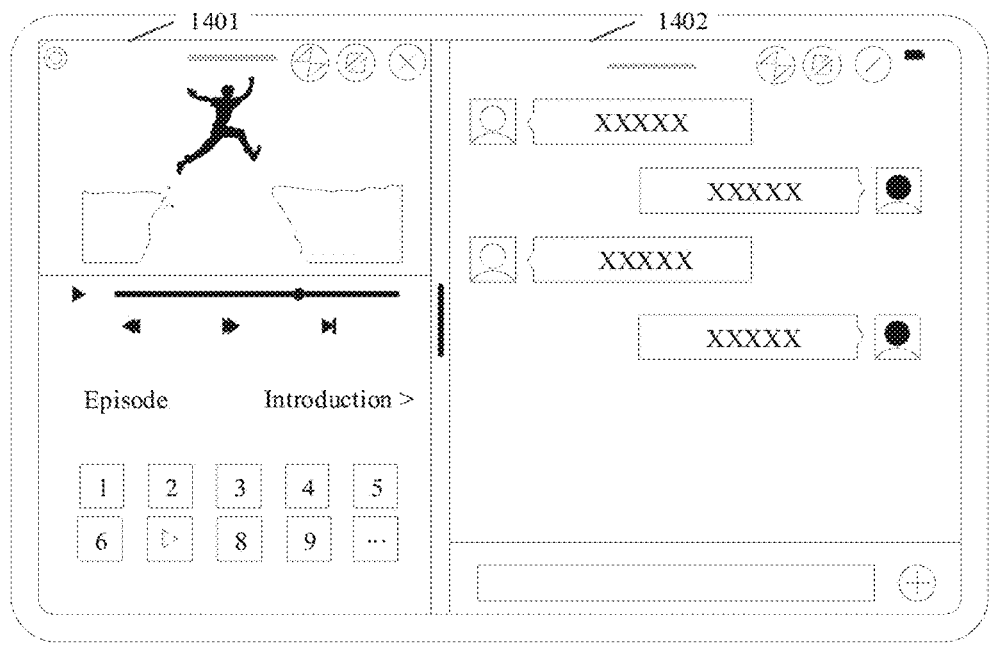
Figure 14C:
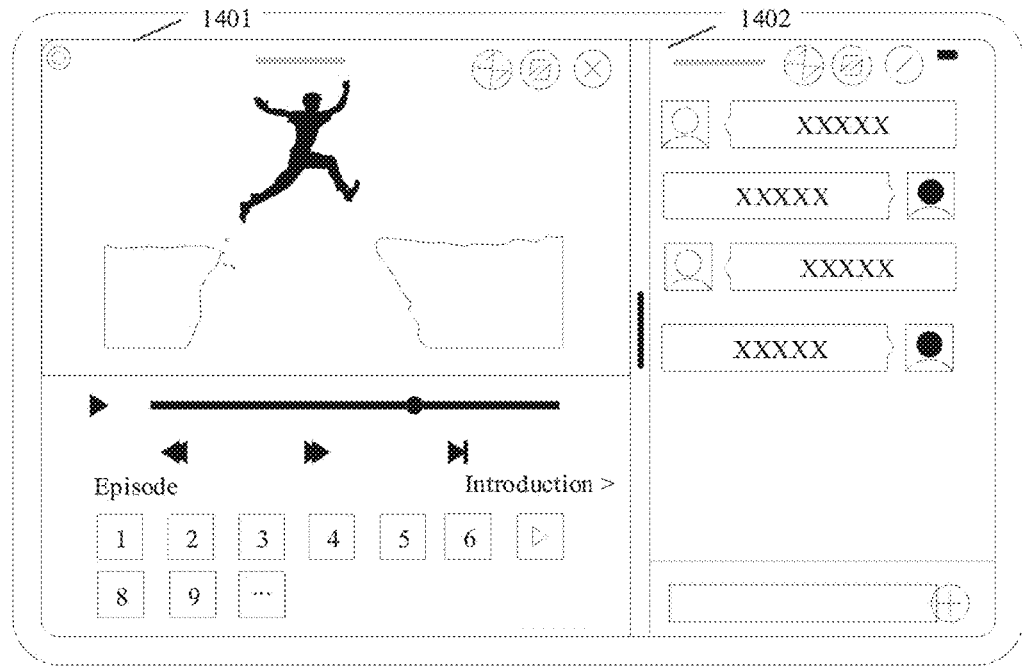

In a possible implementation, on the basis of implementing split-screen display in the embodiments corresponding to FIG. 3*a* and FIG. 3*b* to FIG. 9*a* to FIG. 9*f* (or FIG. 10*a* to FIG. 10*f*), as shown in FIG. 14*a* to FIG. 14*c*, when the application A and the application B are displayed in a split-screen manner, the terminal device may change a size of a split-screen display interface based on a slide operation performed by the user on a control located between the application A and the application B.

For example, FIG. 14a to FIG. 14c are a schematic diagram of an interface of changing a split-screen interface size according to an embodiment of this application. In the embodiment corresponding to FIG. 14a to FIG. 14c, an example in which a terminal device is a tablet is used for description. This example does not constitute a limitation on embodiments of this application.

When the tablet receives an operation performed by the user for split-screen display of Video 1401 and Messages 1402, the tablet may display an interface shown in FIG. 14a. A split-screen interface corresponding to Video 1401 and a split-screen region corresponding to Messages 1402 may be displayed in the interface in a left-right split-screen manner. There may be a slide bar 1403 between the split-screen interface corresponding to Video 1401 and the split-screen region corresponding to Messages 1402.

In an implementation, in the interface shown in FIG. 14a, when the tablet receives an operation that the user triggers the slide bar 1403 and slides leftward, the tablet may display an interface shown in FIG. 14b. The interface may include a split-screen region corresponding to Video 1401 with a smaller interface and a split-screen region corresponding to Messages 1402 with a larger interface.

In another implementation, in the interface shown in FIG. 14a, when the tablet receives an operation that the user triggers the slide bar 1403 and slides rightward, the tablet may display an interface shown in FIG. 14c. The interface may include a split-screen region corresponding to Video 1401 with a larger interface and a split-screen region corresponding to Messages 1402 with a smaller interface.

Based on this, the terminal device may change a size of the split-screen display interface based on a slide operation performed by the user, to improve flexibility of split-screen display.

It may be understood that the interface provided in embodiments of this application is merely an example, and does not constitute a further limitation on embodiments of this application.

Based on the content described in the foregoing embodiments, to better understand embodiments of this application, the following specifically describes the split-screen display method.

Figure 15:
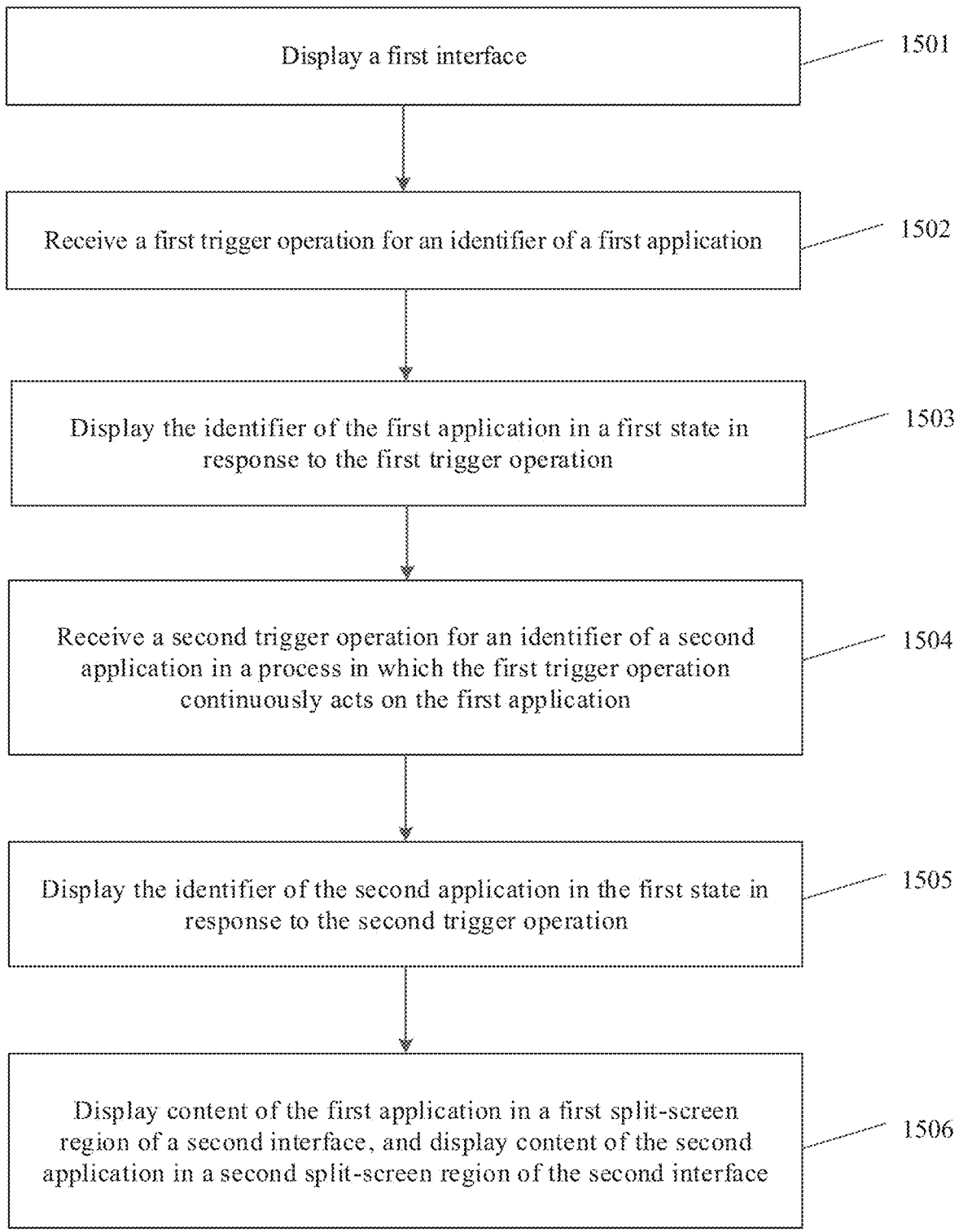
FIG. 15 is a schematic flowchart of a split-screen display method according to an embodiment of this application.

For example, FIG. 15 is a schematic flowchart of a split-screen display method according to an embodiment of this application. As shown in FIG. 15, there may be the following specific steps.

S1501. Display a first interface, where the first interface includes an identifier of a first application and an identifier of a second application.

The first interface may be an interface shown in FIG. 4a (or FIG. 5a). The first application may be understood as a message application, and the second application may be understood as a video application. The identifier of the first application may be understood as an icon (or a thumbnail) of the first application. The identifier of the second application may be understood as an icon (or a thumbnail) of the second application.

S1502. Receive a first trigger operation for the identifier of the first application.

The first trigger operation may be understood as an activation operation for the message application. For example, the first trigger operation may be a touch and hold operation.

S1503. Display the identifier of the first application in a first state in response to the first trigger operation.

The first state may be understood as an active state, and the active state may be understood as a reduced state of description of the first application.

S1504. Receive a second trigger operation for the identifier of the second application in a process in which the first trigger operation continuously acts on the first application, where a difference between a start time of receiving the second trigger operation and a start time of receiving the first trigger operation is less than a first time threshold.

The second trigger operation may be understood as an activation operation for the video application. For example, the second trigger operation may be a touch and hold operation.

S1505. Display the identifier of the second application in the first state in response to the second trigger operation.

S1506. Display content of the first application in a first split-screen region of a second interface, and display content of the second application in a second split-screen region of the second interface.

The second interface may be an interface shown in FIG. 4b (or FIG. 5b), the first split-screen region may be a region corresponding to the message application, and the second split-screen region may be a region corresponding to the video application.

Based on the split-screen display method in S1501 to S1506, in a possible implementation, S1506 may include:

S1506. When receiving a trigger operation for the identifier of the first application in the first state and/or a trigger operation for the identifier of the second application in the first state, display the content of the first application in the first split-screen region of the second interface, and display the content of the second application in the second split-screen region of the second interface.

The trigger operation for the identifier of the first application (or the second application) in the first state may be understood as a drag operation (in the embodiment corresponding to FIG. 4a to FIG. 4c) or a slide operation (in the embodiment corresponding to FIG. 5a to FIG. 5c).

Based on the split-screen display method in S1501 to S1506, in a possible implementation, S1506 may include: receiving a third trigger operation for moving the identifier of the first application in the first state to the first split-screen region, where the third trigger operation is a trigger operation following the first trigger operation; and/or receiving a fourth trigger operation for moving the identifier of the second application in the first state to the second split-screen region, where the fourth trigger operation is a trigger operation following the second trigger operation.

In the embodiment corresponding to FIG. 4a to FIG. 4c, the third trigger operation may be understood as an operation of dragging a message application to a split-screen region, and the fourth trigger operation may be understood as an operation of dragging a video application to a split-screen region.

Based on the split-screen display method in S1501 to S1506, in a possible implementation, S1506 may include: receiving a fifth trigger operation for sliding the identifier of the first application in the first state in a first direction, where the fifth trigger operation is a trigger operation following the first trigger operation; and/or receiving a sixth trigger operation for sliding the identifier of the second application in the first state in a second direction, where the sixth trigger operation is a trigger operation following the second trigger operation.

In the embodiment corresponding to FIG. 5a to FIG. 5c, the fifth trigger operation may be understood as an operation of sliding a message application leftward (or rightward), and the fourth trigger operation may be understood as an operation of sliding a video application rightward (or leftward).

Based on the split-screen display method in S1501 to S1506, in a possible implementation, before S1506, the method may further include: displaying a third interface, where the third interface includes the content of the second application and the identifier of the first application; and receiving, in the third interface, a trigger operation for moving the identifier of the first application to the first split-screen region.

The third interface may be an interface shown in FIG. 6d, and the content of the second application may be understood as full-screen display content of a message application.

Based on the split-screen display method in S1501 to S1506, in a possible implementation, before S1506, the method may further include: displaying the identifier of the first application in the first split-screen region, and displaying the identifier of the second application in the second split-screen region.

In an interface shown in FIG. 6e, the identifier of the first application may be an icon of a message application, and the identifier of the second application may be an icon of a video application.

Based on the split-screen display method in S1501 to S1506, in a possible implementation, S1501 may include: receiving a trigger operation for opening a background running application; and displaying the first interface in response to the trigger operation for opening the background running application.

In the embodiment corresponding to FIG. 4a to FIG. 4c, the trigger operation for opening the background running application may be understood as an operation of sliding upward from a bottom edge of a screen.

Based on the split-screen display method in S1501 to S1506, in a possible implementation, the identifier of the first application includes at least one of the following: an icon of the first application, a thumbnail of the first application, and a control for displaying the first application in a floating window; and the identifier of the second application includes at least one of the following: an icon of the second application, a thumbnail of the second application, and a control for displaying the second application in a floating window.

Based on the split-screen display method in S1501 to S1506, in a possible implementation, an identifier of an application in the first state is displayed in a floating manner, a highlighted manner, or a reduced manner.

Based on the split-screen display method in S1501 to S1506, in a possible implementation, the first split-screen region further displays one or more of the following: a control for minimizing displayed content in the first split-screen region, a control for triggering full-screen display of displayed content in the first split-screen region, or a control for triggering closing of displayed content in the first split-screen region; and the second split-screen region further displays one or more of the following: a control for minimizing displayed content in the second split-screen region, a control for triggering full-screen display of displayed content in the second split-screen region, or a control for triggering closing of displayed content in the second split-screen region.

Figure 16:
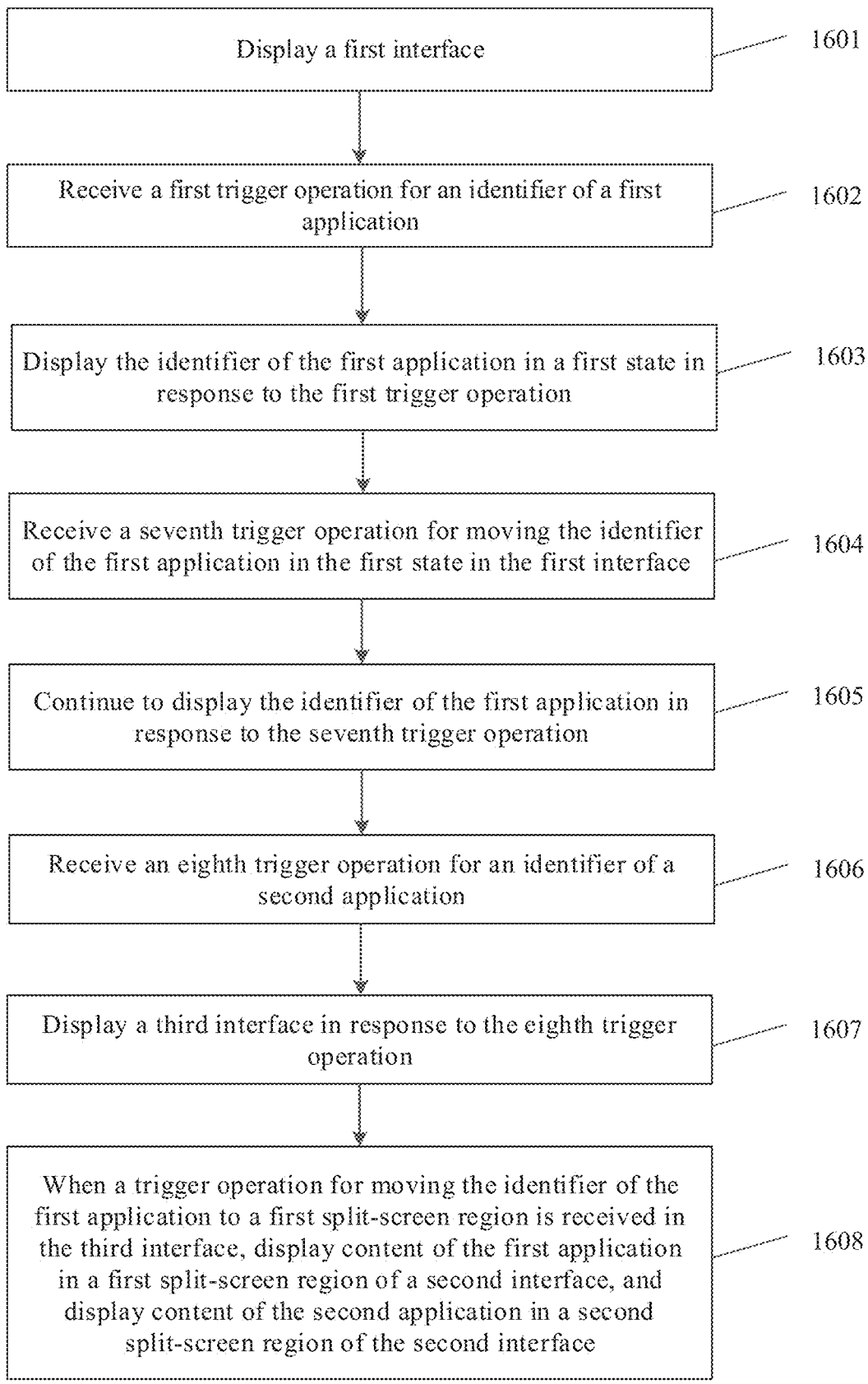
FIG. 16 is a schematic flowchart of another split-screen display method according to an embodiment of this application.

For example, FIG. 16 is a schematic flowchart of another split-screen display method according to an embodiment of this application. As shown in FIG. 16, there may be the following specific steps.

S1601. Display a first interface, where the first interface includes an identifier of a first application.

S1602. Receive a first trigger operation for the identifier of the first application.

S1603. Display the identifier of the first application in a first state in response to the first trigger operation.

S1604. Receive a seventh trigger operation for moving the identifier of the first application in the first state in the first interface, where the seventh trigger operation is a trigger operation following the first trigger operation.

In an interface shown in FIG. 6b (or FIG. 7b or FIG. 8b), the seventh trigger operation may be an operation of continuing to touch and hold.

S1605. Continue to display the identifier of the first application in response to the seventh trigger operation.

S1606. Receive an eighth trigger operation for an identifier of a second application.

The eighth trigger operation may be understood as an operation of tapping the identifier of the second application, or an operation of dragging the identifier of the second application to a region corresponding to full-screen display.

S1607. Display a third interface in response to the eighth trigger operation, where the third interface includes content of the second application and the identifier of the first application.

The third interface may be an interface shown in FIG. 6d (or FIG. 7d or FIG. 8d), or an interface shown in FIG. 13a.

S1608. When a trigger operation for moving the identifier of the first application to a first split-screen region is received in the third interface, displaying content of the first application in a first split-screen region of a second interface, and displaying the content of the second application in a second split-screen region of the second interface.

Alternatively, when a trigger operation for moving the identifier of the first application to a first region is received in the third interface, the content of the second application is displayed in full screen in a fourth interface, and content of the first application is displayed in a floating window in the fourth interface, where a region occupied by the floating window in the third interface is smaller than a full-screen region of the third interface, and the first region is located between a first split-screen region and a second split-screen region. The fourth interface may be an interface shown in FIG. 13a, and the first region may be a dashed-line region 1305 in the middle of a tablet.

Alternatively, when a trigger operation for moving the identifier of the first application to a second region is received in the third interface, the content of the second application is displayed in full screen in a fourth interface, and the first application is exited, where the second region is located at the bottom of a first split-screen region and/or the bottom of a second split-screen region. In an interface shown in FIG. 13a, the second region may be understood as a dashed-line region 1306 used to cancel split-screen display of an application operated by the user.

Based on the split-screen display method in S1601 to S1608, in a possible implementation, S1606 may include S16061: Receive the eighth trigger operation for the identifier of the second application in a third region of the first interface.

The third region may be a region in which a fixing bar 601 shown in FIG. 6b is located.

Based on the split-screen display method in S1601 to S1608, in a possible implementation, before S16061, the method may further include: receiving a slide operation in the third region, where the slide operation is used to update an identifier of an application displayed in the third region, and the seventh trigger operation is interrupted in a process of receiving the slide operation in the third region; and receiving, in the third region, a ninth trigger operation for moving the identifier of the first application out of the third region, where the ninth trigger operation continuously acts on the identifier of the first application.

In an interface shown in FIG. 6b, the ninth trigger operation may be understood as an operation of removing a message application from a fixing bar 601.

Based on the split-screen display method in S1601 to S1608, in a possible implementation, S1606 may include: receiving the eighth trigger operation for the identifier of the second application in a fifth interface, where the fifth interface further includes the identifier of the second application. In an interface shown in FIG. 7c, the fifth interface may be understood as a home screen.

Based on the split-screen display method in S1601 to S1608, in a possible implementation, S1606 may include: receiving the eighth trigger operation for the identifier of the second application in a split-screen task bar in a fifth interface, where the fifth interface further includes the identifier of the second application. In an interface shown in FIG. 8b, the fifth interface may be an interface that includes the split-screen task bar.

Based on the split-screen display method in S1601 to S1608, in a possible implementation, the identifier of the second application is thumbnail identifiers of a plurality of applications for which screen splitting is performed, and specific display in the third interface includes: displaying, in a split-screen manner, content of the plurality of applications for which screen splitting is performed and displaying the identifier of the first application in a floating manner.

The third interface may be an interface shown in FIG. 13d.

Figure 17:
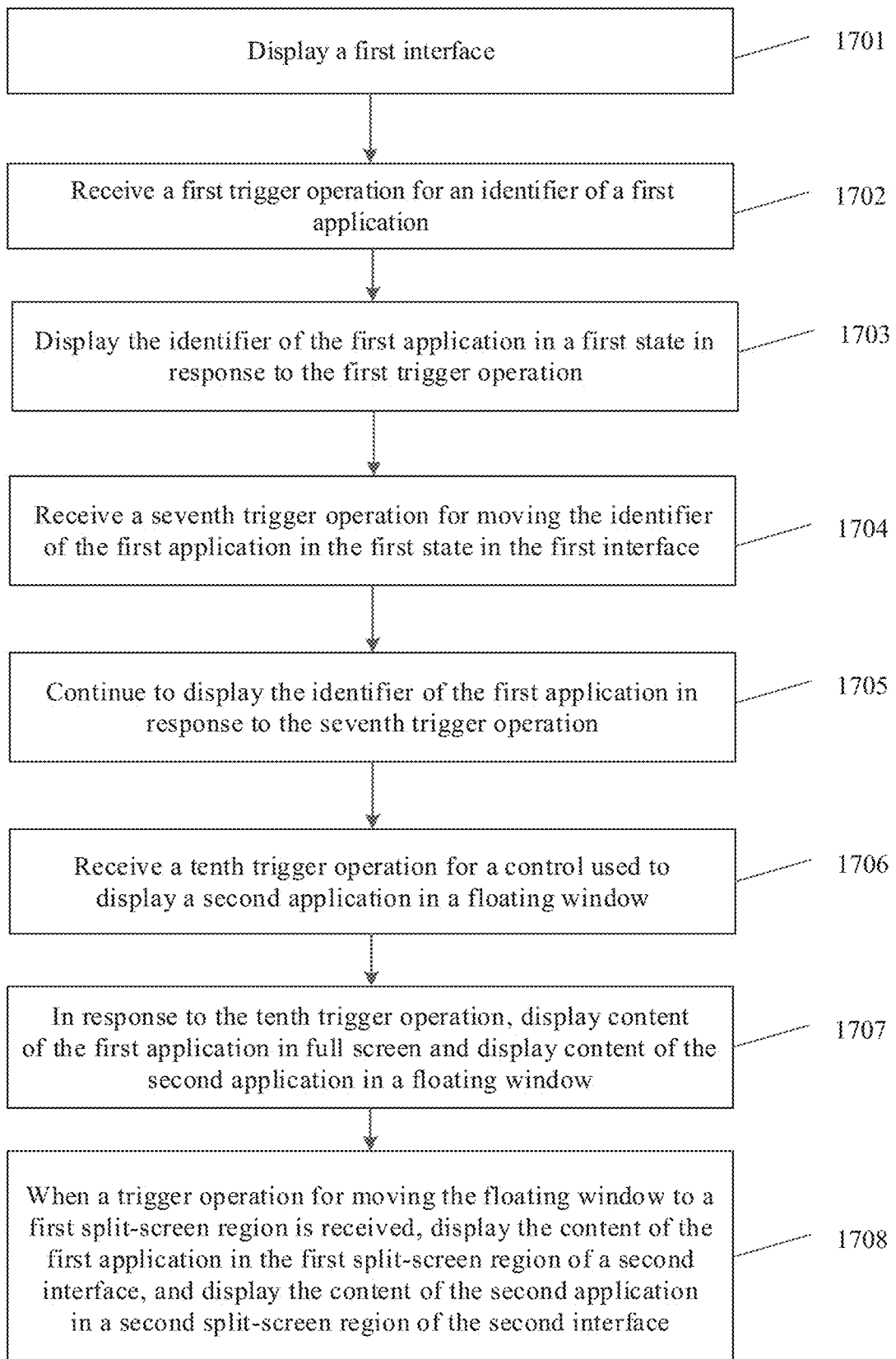
FIG. 17 is a schematic flowchart of still another split-screen display method according to an embodiment of this application.

For example, FIG. 17 is a schematic flowchart of still another split-screen display method according to an embodiment of this application. As shown in FIG. 17, the method may include the following steps.

S1701. Display a first interface, where the first interface includes an identifier of a first application.

S1702. Receive a first trigger operation for the identifier of the first application.

S1703. Display the identifier of the first application in a first state in response to the first trigger operation.

S1704. Receive a seventh trigger operation for moving the identifier of the first application in the first state in the first interface, where the seventh trigger operation is a trigger operation following the first trigger operation.

S1705. Continue to display the identifier of the first application in response to the seventh trigger operation.

S1706. Receive a tenth trigger operation for a control used to display a second application in a floating window.

In an interface shown in FIG. 9b, the control used to display the second application in a floating window may be understood as a floating window control 901 corresponding to a video application.

S1707. In response to the tenth trigger operation, display content of the first application in full screen and display content of the second application in a floating window.

In an interface shown in FIG. 9d, content corresponding to a message application may be displayed in full screen and content corresponding to a video application may be displayed in a floating window.

S1708. When a trigger operation for moving the floating window to a first split-screen region is received, display the content of the first application in the first split-screen region of a second interface, and display the content of the second application in a second split-screen region of the second interface.

An interface shown in FIG. 9f may be displayed when the terminal device receives a trigger operation for dragging a floating window of the video application to a left split-screen region on the terminal device.

Figure 18:
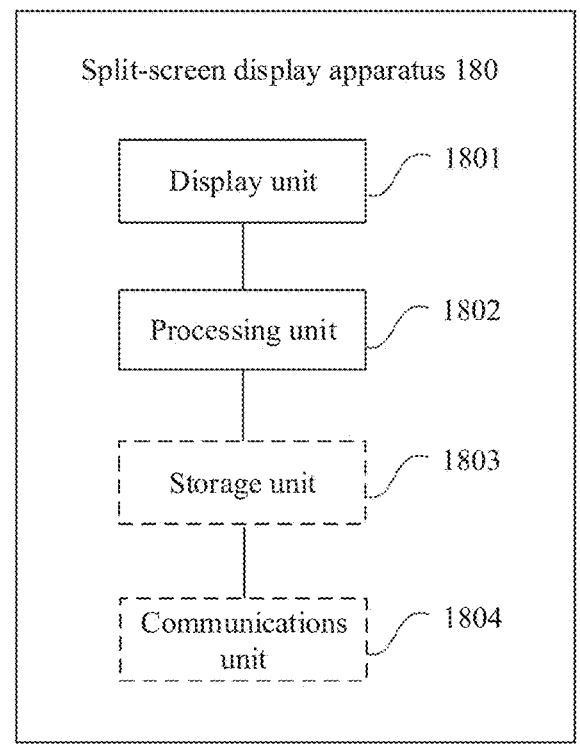
FIG. 18 is a schematic diagram of a structure of a split-screen display apparatus according to an embodiment of this application.

The foregoing describes the method provided in embodiments of this application with reference to FIG. 3a and FIG. 3b to FIG. 17. The following describes an apparatus for performing the method in embodiments of this application. FIG. 18 is a schematic diagram of a structure of a split-screen display apparatus according to an embodiment of this application. The split-screen display apparatus may be a terminal device in embodiments of this application, or may be a chip or a chip system in a terminal device.

As shown in FIG. 18, the split-screen display apparatus 180 may be used in a communications device, a circuit, a hardware component, or a chip. The split-screen display apparatus includes a display unit 1801, a processing unit 1802, and the like. The display unit 1801 is configured to support a display step performed in the split-screen display method. The processing unit 1802 is configured to support the split-screen display apparatus in performing an information processing step.

The processing unit 1802 may be integrated with the display unit 1801, and communication may occur between the processing unit 1802 and the display unit 1801.

In a possible implementation, the split-screen display apparatus may further include a storage unit 1803. The storage unit 1803 may include one or more memories, and the memory may be a component configured to store a program or data in one or more devices or circuits.

The storage unit 1803 may exist independently, and is connected to the processing unit 1802 by using a communications bus. The storage unit 1803 may alternatively be integrated with the processing unit 1802.

In an example in which the split-screen display apparatus may be a chip or a chip system of a terminal device in embodiments of this application, the storage unit 1803 may store computer executable instructions of a method performed by the terminal device, so that the processing unit 1802 performs the method performed by the terminal device in the foregoing embodiment. The storage unit 1803 may be a register, a cache, a random access memory (RAM), or the like, and the storage unit 1803 may be integrated with the processing unit 1802. The storage unit 1803 may be a read-only memory (ROM) or another type of static storage device that can store static information and instructions, and the storage unit 1803 may be independent of the processing unit 1802.

In a possible implementation, the split-screen display apparatus may further include a communications unit 1804. The communications unit 1804 is configured to support interaction between the split-screen display apparatus and another device. For example, when the split-screen display apparatus is a terminal device, the communications unit 1804 may be a communications interface or an interface circuit. When the split-screen display apparatus is a chip or a chip system in a terminal device, the communications unit

1804 may be a communications interface. For example, the communications interface may be an input/output interface, a pin, a circuit, or the like.

The apparatus in this embodiment may be correspondingly configured to perform the steps performed in the foregoing method embodiments. Implementation principles and technical effects are similar, and details are not described herein again.

Figure 19:
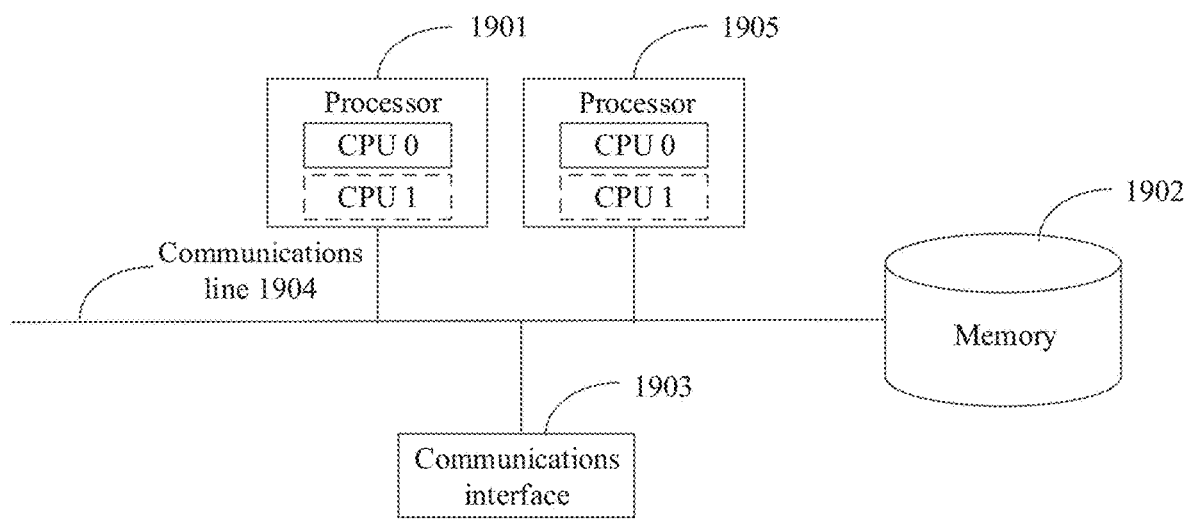
FIG. 19 is a schematic diagram of a hardware structure of a control device according to an embodiment of this application.

FIG. 19 is a schematic diagram of a hardware structure of a control device according to an embodiment of this application. As shown in FIG. 19, the control device includes a processor 1901, a communications line 1904, and at least one communications interface (a communications interface 1903 is used as an example for description in FIG. 19).

The processor 1901 may be a general-purpose central processing unit (CPU), a microprocessor, an application-specific integrated circuit (ASIC), or one or more integrated circuits configured to control program execution in the solutions of this application.

The communications line 1904 may include a circuit for transmitting information between the foregoing components.

The communications interface 1903 is configured to communicate with another device or a communications network such as the Ethernet or a wireless local area network (WLAN) by using any apparatus in a type of a transceiver.

Optionally, the control device may further include a memory 1902.

The memory 1902 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another optical disk storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communications line 1904. The memory may alternatively be integrated with the processor.

The memory 1902 is configured to store computer executable instructions for performing the solutions in this application, and the processor 1901 controls execution. The processor 1901 is configured to execute the computer executable instructions stored in the memory 1902, to implement a method provided in embodiments of this application.

Optionally, the computer executable instructions in this embodiment of this application may also be referred to as application program code. This is not specifically limited in this embodiment of this application.

In specific implementation, in an embodiment, the processor 1901 may include one or more CPUs, for example, a CPU 0 and a CPU 1 in FIG. 19.

In specific implementation, in an embodiment, the control device may include a plurality of processors, for example, the processor 1901 and a processor 1905 in FIG. 19. Each of these processors may be a single-core (single-CPU) processor, or may be a multi-core (multi-CPU) processor. The processor herein may refer to one or more devices, circuits, and/or processing cores configured to process data (for example, computer program instructions).

Figure 20:
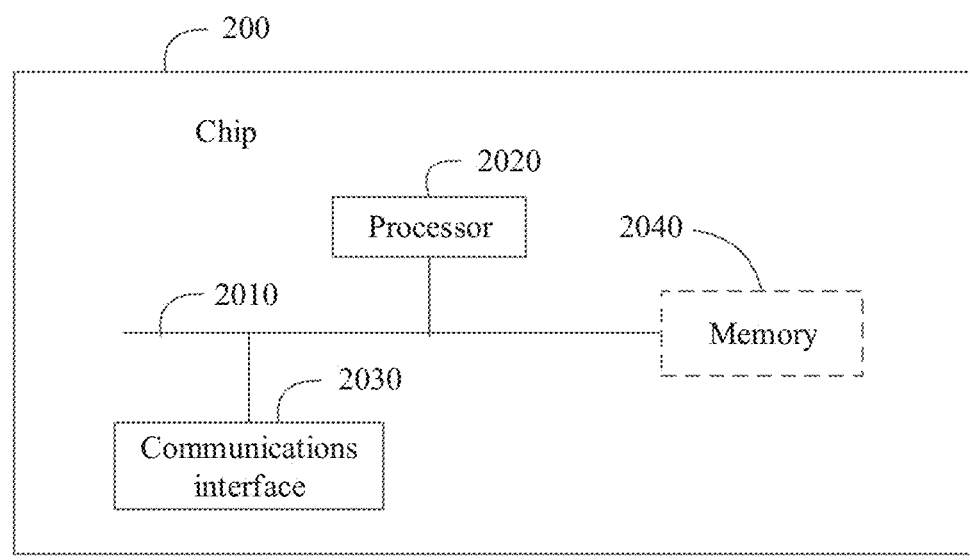
FIG. 20 is a schematic diagram of a structure of a chip according to an embodiment of this application.

For example, FIG. 20 is a schematic diagram of a structure of a chip according to an embodiment of this application. The chip 200 includes one or more (including two) processors 2020 and a communications interface 2030.

In some implementations, a memory 2040 stores the following element: an executable module or a data structure, a subset thereof, or an extension set thereof.

In this embodiment of this application, the memory 2040 may include a read-only memory and a random access memory, and provides instructions and data for the processor 2020. A part of the memory 2040 may further include a non-volatile random access memory (NVRAM).

In this embodiment of this application, the memory 2040, the communications interface 2030, and the processor 2020 are coupled together by using a bus system 2010. In addition to a data bus, the bus system 2010 may further include a power bus, a control bus, a status signal bus, and the like. For ease of description, various buses are marked as the bus system 2010 in FIG. 20.

The method described in embodiments of this application may be applied to the processor 2020, or implemented by the processor 2020. The processor 2020 may be an integrated circuit chip, and has a signal processing capability. In an implementation process, steps of the foregoing method may be completed by using an integrated logic circuit of hardware in the processor 2020 or an instruction in a form of software. The processor 2020 may be a general-purpose processor (for example, a microprocessor or a conventional processor), a digital signal processor (DSP), an application-specific integrated circuit (ASIC), a field-programmable gate array (FPGA) or another programmable logic device, a discrete gate, a transistor logic device, or a discrete hardware component. The processor 2020 may implement or perform the methods, steps, and logical block diagrams disclosed in embodiments of the present disclosure.

The steps of the methods disclosed with reference to embodiments of this application may be directly performed by a hardware decoding processor, or performed by a combination of hardware and software modules in the decoding processor. The software module may be located in a mature storage medium in the art such as a random access memory, a read-only memory, a programmable read-only memory, or an electrically erasable programmable read-only memory (EEPROM). The storage medium is located in the memory 2040. The processor 2020 reads information in the memory 2040, and completes the steps of the foregoing methods in combination with hardware of the processor 2020.

In the foregoing embodiment, the instructions stored in the memory for execution by the processor may be implemented in a form of a computer program product. The computer program product may be written in the memory in advance, or may be downloaded and installed in the memory in a form of software.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. For example, the usable medium may include a magnetic medium (for example, a floppy disk, a hard disk, or a magnetic tape), an optical medium (for example, a digital versatile disc (DVD)), or a semiconductor medium (for example, a solid state disk (SSD)).

An embodiment of this application further provides a computer-readable storage medium. All or some of the methods described in the foregoing embodiments may be implemented by software, hardware, firmware, or any combination thereof. The computer-readable medium may include a computer storage medium and a communications medium, and may further include any medium that can transmit a computer program from one place to another. The storage medium may be any target medium accessible by a computer.

In a possible design, the computer-readable medium may include a compact disc read-only memory (CD-ROM), a RAM, a ROM, an EEPROM, or another optical disk memory. The computer-readable medium may include a magnetic disk memory or another magnetic disk storage device. In addition, any connection line may be appropriately referred to as a computer-readable medium. For example, if a coaxial cable, an optical fiber cable, a twisted pair, a DSL, or a wireless technology (such as infrared, radio, and microwave) is used to transmit software from a website, a server, or another remote source, the coaxial cable, the optical fiber cable, the twisted pair, the DSL, or the wireless technology such as infrared, radio, and microwave is included in the definition of media. As used herein, a magnetic disk and an optical disk include an optical disc (CD), a laser disc, an optical disk, a digital versatile disc (DVD), a floppy disk, and a Blu-ray disc. The magnetic disk usually reproduces data in a magnetic manner, and the optical disk reproduces data optically by using a laser.

The foregoing combination should also be included in the scope of the computer-readable medium. The foregoing descriptions are merely specific implementations of the present disclosure. However, the protection scope of the present disclosure is not limited thereto. Any change or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A split-screen display method, comprising:
   displaying a first interface, wherein the first interface comprises an identifier of a first application;
   receiving a first trigger operation for the identifier of the first application;
   displaying the identifier of the first application in a first state in response to the first trigger operation;
   receiving a seventh trigger operation for moving the identifier of the first application in the first state in the first interface, wherein the seventh trigger operation is a trigger operation following the first trigger operation;
   continuing to display the identifier of the first application in response to the seventh trigger operation;
   receiving an eighth trigger operation for an identifier of a second application in a third region of the first interface;
   displaying a third interface in response to the eighth trigger operation, wherein the third interface comprises content of the second application and the identifier of the first application; and
   based on a trigger operation for moving the identifier of the first application to a first split-screen region being received in the third interface, displaying content of the first application in a first split-screen region of a second interface, and displaying the content of the second application in a second split-screen region of the second interface; or
   based on a trigger operation for moving the identifier of the first application to a first region being received in the third interface, displaying the content of the second application in full screen in a fourth interface, and displaying content of the first application in a floating window in the fourth interface, wherein a region occupied by the floating window in the third interface is smaller than a full-screen region of the third interface, and the first region is located between the first split-screen region and the second split-screen region; or
   based on a trigger operation for moving the identifier of the first application to a second region being received in the third interface, displaying the content of the second application in full screen in a fourth interface, and exiting the first application, wherein the second region is located at the bottom of the first split-screen region and/or the bottom of the second split-screen region;
   wherein before the receiving the eighth trigger operation for the identifier of the second application in the third region of the first interface, the method further comprises:
       receiving a slide operation in the third region, wherein the slide operation is used to update an identifier of an application displayed in the third region, and the seventh trigger operation is interrupted in a process of receiving the slide operation in the third region; and
       receiving, in the third region, a ninth trigger operation for moving the identifier of the first application out of the third region, wherein the ninth trigger operation continuously acts on the identifier of the first application.

2. The method according to claim 1,
   wherein the identifier of the second application comprises thumbnail identifiers of a plurality of applications for which screen splitting is performed; and
   wherein displaying the third interface comprises: displaying, in a split-screen manner, content of the plurality of applications for which screen splitting is performed and displaying the identifier of the first application in a floating manner.

3. A split-screen display method, comprising:
   receiving a trigger operation for opening a background running application;
   displaying a first interface in response to the trigger operation for opening the background running application, wherein the first interface comprises an identifier of a first application;
   receiving a first trigger operation for the identifier of the first application;
   displaying the identifier of the first application in a first state in response to the first trigger operation;
   receiving a seventh trigger operation for moving the identifier of the first application in the first state in the first interface, wherein the seventh trigger operation is a trigger operation following the first trigger operation;

continuing to display the identifier of the first application in response to the seventh trigger operation;

receiving a tenth trigger operation for a control used to display a second application in a floating window;

in response to the tenth trigger operation, displaying content of the first application in full screen and displaying content of the second application in a floating window; and based on a trigger operation for moving the floating window to a first split-screen region being received, displaying the content of the second application in the first split-screen region of a second interface, and displaying the content of the first application in a second split-screen region of the second interface;

wherein before the displaying the content of the second application in the first split-screen region of the second interface, and displaying the content of the first application in the second split-screen region of the second interface, the method further comprises:

displaying an identifier of the second application in the first split-screen region, and displaying the identifier of the first application in the second split-screen region.

4. The method according to claim 3, wherein the identifier of the first application comprises at least one of the following: an icon of the first application or a thumbnail of the first application.

5. The method according to claim 3, wherein an identifier of an application in the first state is displayed in a floating manner, a highlighted manner, or a reduced manner.

6. The method according to claim 3, wherein the first split-screen region further displays one or more of the following:
a control for minimizing displayed content in the first split-screen region,
a control for triggering full-screen display of displayed content in the first split-screen region, or
a control for triggering closing of displayed content in the first split-screen region; and wherein the second split-screen region further displays one or more of the following:
a control for minimizing displayed content in the second split-screen region,
a control for triggering full-screen display of displayed content in the second split-screen region, or
a control for triggering closing of displayed content in the second split-screen region.

7. An electronic device, comprising:

a memory storing a computer program; and a processor configured to execute the computer program that is stored in the memory to cause the electronic device to perform operations comprising:

receiving a trigger operation for opening a background running application;

displaying a first interface in response to the trigger operation for opening the background running application, wherein the first interface comprises an identifier of a first application;

receiving a first trigger operation for the identifier of the first application;

displaying the identifier of the first application in a first state in response to the first trigger operation;

receiving a seventh trigger operation for moving the identifier of the first application in the first state in the first interface, wherein the seventh trigger operation is a trigger operation following the first trigger operation;

continuing to display the identifier of the first application in response to the seventh trigger operation;

receiving a tenth trigger operation for a control used to display a second application in a floating window;

in response to the tenth trigger operation, displaying content of the first application in full screen and displaying content of the second application in a floating window; and based on a trigger operation for moving the floating window to a first split-screen region being received, displaying the content of the second application in the first split-screen region of a second interface, and displaying the content of the first application in a second split-screen region of the second interface;

wherein before the displaying the content of the second application in the first split-screen region of the second interface, and displaying the content of the first application in the second split-screen region of the second interface, the operations further comprise:

displaying an identifier of the second application in the first split-screen region, and displaying the identifier of the first application in the second split-screen region.

8. The electronic device according to claim 7, wherein the identifier of the first application comprises at least one of the following: an icon of the first application or a thumbnail of the first application.

9. The electronic device according to claim 7, wherein an identifier of an application in the first state is displayed in a floating manner, a highlighted manner, or a reduced manner.

10. The electronic device according to claim 7, wherein the first split-screen region further displays one or more of the following:
a control for minimizing displayed content in the first split-screen region,
a control for triggering full-screen display of displayed content in the first split-screen region, or
a control for triggering closing of displayed content in the first split-screen region; and wherein the second split-screen region further displays one or more of the following:
a control for minimizing displayed content in the second split-screen region,
a control for triggering full-screen display of displayed content in the second split-screen region, or
a control for triggering closing of displayed content in the second split-screen region.

\* \* \* \* \*